US005809180A

United States Patent [19]
Kimura et al.

[11] Patent Number: 5,809,180
[45] Date of Patent: Sep. 15, 1998

[54] DATA CONVERSION SYSTEM FOR LINE-NARROWING A PATTERN

[75] Inventors: Masayuki Kimura; Hirotomo Aso, both of Sendai; Yutaka Katsuyama, Machida; Kenji Suzuki, Shiogama; Hisayoshi Hayasaka, Sendai; Yoshiyuki Sakurai, Watari-Machi, all of Japan

[73] Assignee: Fujitsu Limited, Kawasaki, Japan

[21] Appl. No.: 820,987

[22] Filed: Mar. 19, 1997

Related U.S. Application Data

[63] Continuation of Ser. No. 473,923, Jun. 7, 1995, abandoned, which is a continuation of Ser. No. 152,889, Nov. 16, 1993, abandoned, which is a continuation of Ser. No. 917,671, Jul. 21, 1992, abandoned, which is a continuation of Ser. No. 642,986, Jan. 18, 1991, abandoned.

[30] Foreign Application Priority Data

| Jan. 19, 1990 | [JP] | Japan | 2-008418 |
| Jan. 19, 1990 | [JP] | Japan | 2-008419 |
| Feb. 26, 1990 | [JP] | Japan | 2-042640 |

[51] Int. Cl.⁶ .................................................. G06K 9/00
[52] U.S. Cl. ........................ 382/288; 382/304; 382/308
[58] Field of Search .................................. 382/302–304, 382/308, 258, 259, 288

[56] References Cited

U.S. PATENT DOCUMENTS

| 4,003,024 | 1/1977 | Riganati et al. | 382/49 |
| 4,034,344 | 7/1977 | Saraga et al. | 340/146.3 |
| 4,174,514 | 11/1979 | Sternberg | 340/146.3 |
| 4,215,401 | 7/1980 | Holsztynski et al. | 382/49 |
| 4,484,349 | 11/1984 | McCubbrey | 382/49 |
| 4,541,114 | 9/1985 | Rutenbar et al. | 382/49 |
| 4,574,357 | 3/1986 | Pastor et al. | 382/55 |
| 4,665,556 | 5/1987 | Fukushima et al. | 382/49 |
| 4,850,027 | 7/1989 | Kimmel | 382/49 |
| 4,908,751 | 3/1990 | Smith | 382/49 |
| 4,918,742 | 4/1990 | Simonds | 382/49 |
| 4,979,221 | 12/1990 | Perryman et al. | 382/48 |
| 5,136,662 | 8/1992 | Maruyama et al. | 382/304 |
| 5,163,100 | 11/1992 | Mathieu et al. | 382/304 |

OTHER PUBLICATIONS

Pattern Recognition, vol. 22, No. 4, Aug. 1989, Oxford, GB, pp. 387–396; XP000046521 N.G. Bourbakis, "A Parallel–Symmetric Thinning Algorithm".

Patent Abstracts of Japan, vol. 9, No. 327, Dec. 21, 1985.

IEEE Transactions on Computers, vol. C–22, No. 12, Dec. 1973, New York, US, pp. 1075–1087; B. Kruse, "A Parallel Picture Processing Machine".

*Primary Examiner*—Christopher S. Kelley
*Attorney, Agent, or Firm*—Nikaido, Marmelstein, Murray & Oram LLP

[57] ABSTRACT

This invention relates to a data conversion system utilizing a cell comprising: a shift register supplied with a plurality of data for sequentially shifting the data; a memory, supplied with data in a certain area of the shift register as addresses, storing data for outputting a predetermined value when data in the certain area are in a pattern to determine the value of the center dot of the area, or for outputting an instruction signal for determining the value of the center dot according to dot data outside of the certain area when data in the certain area are not in a pattern to determine the value of the center dot of the area; and an operation unit for selecting and outputting said predetermined value from said memory when no instruction signal is supplied from the memory and for outputting the value of the center dot by determining it from data outside the certain area per the instruction signal.

18 Claims, 54 Drawing Sheets

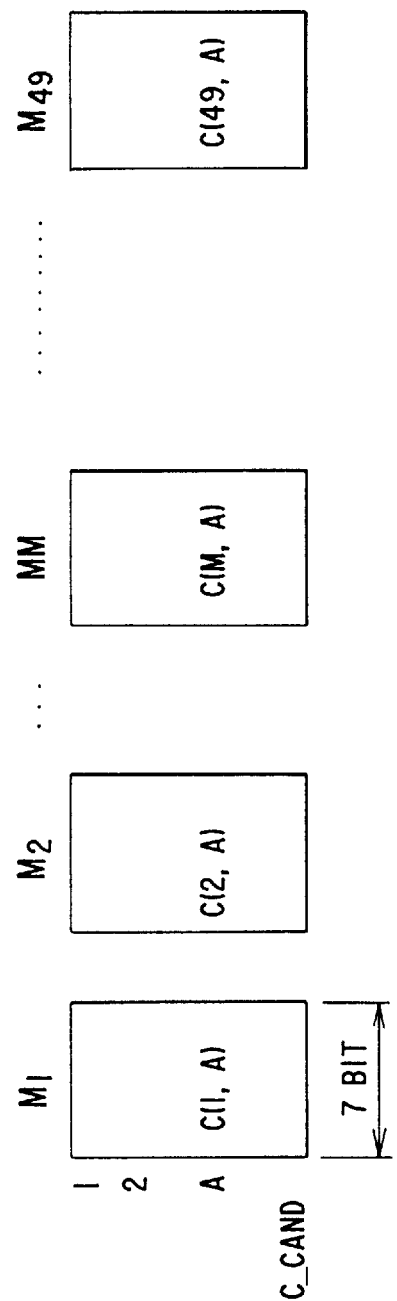

```
for i = 1 to M {
    for j = 1 to M {
        r_den[i] = if img[i][j-1] == 0 and img[i][j] == 1
                            then r_den[i] + 1
                   else r_den[i] ;
        r_acc[i] = if r_den[i] == 0 and r_acc[i-1] == 0 then 0
                   else r_den[i] x b + r_acc[i-1] + 1;
        r_max[i] = if r_den[i] == 0 then r_max[i-1]
                   else r_acc[i] ;
        c_den[j] = if img[i-1][j] == 0 and img[i][j] == 1
                            then c_den[j] + 1
                   else c_den[j] ;
        c_acc[j] = if c_den[j] == 0 and c_acc[j-1] == 0 then 0
                   else c_den[j] x b + c_acc[j-1] + 1;
        c_max[j] = if c_den[j] == 0 then c_max[j-1]
                   else c_acc[j] ;
    }
}
```

Fig.12

```
for i = 1 to D {
    for t = 1 to M {
        o_img[i] = if F[t-1]x D < i x H and i x H ≤ F[t] x D
                            then i_img[t]
                   else o_img[i] ;
    }
}
```

Fig.13

```
for i = 1 to M {
    for j = 1 to M {
        r_den [i] = if img [i] [j] == 1 then r_den [i] + 1
                    else r_den [i] ;
        c_den [j] = if img [i] [j] == 1 then c_den [j] + 1
                    else c_den [j] ;
    }
}
```

Fig.19

B: IN VERTICAL DIRECTION

A: IN HORIZONTAL DIRECTION

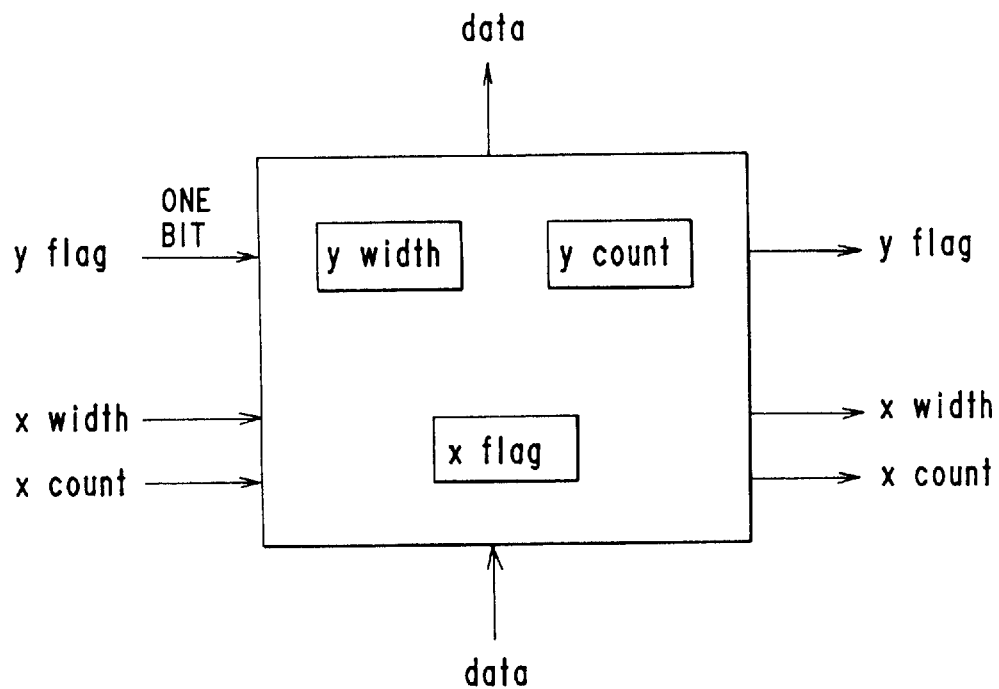

IN HORIZONTAL DIRECTION
   x flag = if data == 1 then 1
            else x flag
   x count = if x count > 0 then x count + 1
             else if x flag == 1 or data == 1 then 1
             else x count
   x width = if x flag == 1 or data == 1 then x count + 1
             else x width
IN VERTICAL DIRECTION
   y flag = if data == 1 then 1
            else y flag
   y count = if y count > 0 then y count + 1
             else if y flag == 1 or data == 1 then 1
             else y count
   y width = if y flag == 1 or data == 1 then y count + 1
             else y width

Fig.26

IN HORIZONTAL DIRECTION
   x flag = if data == 0 then 0
         else 1
   x count = if data == 1 and x flag == 0 then x count + x stack + 1
         else x count + x stack
   x stack = if data == 1 and x flag == 0 then x stack + 1
         else x stack IN VERTICAL DIRECTION
   y flag = if data == 0 then 0
         else 1
   y count = if data == 1 and y flag == 0 then y count + y stack + 1
         else y count + y stack
   y stack = if data == 1 and y flag == 0 then y stack + 1
         else y stack

Fig.34

CONVERSION TABLE II( I)　　II( I)*I) (D=64)　　　　　　　　ΣW(W-100)　　J

SET---100

| II( 1) | 0 |
|---|---|
| II( 2) | 0 |
| II( 3) | 0 |
| II( 4) | 1 |
| II( 5) | 2 |

1　　0　　COMPARISON (INEFFECTIVE RESULT)　100　　1
2　　0　　COMPARISON (INEFFECTIVE RESULT)　100　　1
3　　0　　COMPARISON (INEFFECTIVE RESULT)　100　　1
4　　64　COMPARISON (INEFFECTIVE RESULT)　100　　1
5　　128　COMPARISON (INEFFECTIVE RESULT)　100　　1

SET---200　　2

| II( 5) | 2 |
|---|---|
| II( 6) | 3 |
| II( 7) | 4 |

5　　128　COMPARISON (INEFFECTIVE RESULT)　200　　2
6　　192　COMPARISON (INEFFECTIVE RESULT)　200　　2
7　　256　COMPARISON (INEFFECTIVE RESULT)　200　　2

SET---300　　3

| II( 7) | 4 |
|---|---|
| II( 8) | 5 |

7　　256　COMPARISON (INEFFECTIVE RESULT)　300　　3
8　　320　COMPARISON (INEFFECTIVE RESULT)　300　　3

SET---400　　4

| II( 8) | 5 |
|---|---|
|  |  |

8　　320　COMPARISON (INEFFECTIVE RESULT)　400　　4

(SIMILARLY PERFORMED UNTIL SET J=64 HAS EFFECTIVE RESULT)

Fig.53

| DATA (DX) OUTPUT | | | | | ADDRESS (AX) INPUT | | | | | | | | |
|---|---|---|---|---|---|---|---|---|---|---|---|---|---|
| | | | | | A2B,A8B,A6B | | | A3B,A4B,A5B | | | A1B,A0B,A7B | | |
| VERTICAL | 0 | 1 | 0 | | * | 1 | * | * | 1 | * | * | * | * |
| HORIZONTAL | 1 | 1 | 1 | | * | 1 | 1 | * | 0 | * | * | * | * |
| 45° | 1 | 1 | 0 | | * | 1 | 0 | * | 0 | 1 | * | * | * |
| 135° | 0 | 1 | 1 | | * | 1 | 0 | * | 0 | 0 | * | * | 1 |
| VERTICAL | 0 | 1 | 0 | | * | 1 | 0 | * | 0 | 0 | * | 1 | 0 |
| HORIZONTAL | 1 | 1 | 1 | | 1 | 1 | 0 | * | 0 | 0 | * | 0 | 0 |
| 45° | 1 | 1 | 0 | | 0 | 1 | 0 | * | 0 | 0 | 1 | 0 | 0 |
| 135° | 0 | 1 | 1 | | 0 | 1 | 0 | 1 | 0 | 0 | 0 | 0 | 0 |
| | 1 | 0 | 0 | | 0 | 1 | 0 | 0 | 0 | 0 | 0 | 0 | 0 |
| NO PICTURE ELEMENT | 0 | 0 | 0 | | * | 0 | * | * | * | * | * | * | * |
| WITHIN BLOCK | 1 | 0 | 1 | | 1 | 1 | 1 | * | 1 | * | * | 1 | * |
| OTHER X | 0 | 0 | 1 | | * | 1 | * | 1 | * | 1 | 1 | * | 1 |

Fig.54

| OUTPUT | A2B,A8B,A6B | A3B,A4B,A5B | A1B,A0B,A7B |
|---|---|---|---|
| 0  0  0 | 0  1  0 | 0  0  0 | 0  0  0 |
| 0 | 1  1  0 | 0  0  0 | 0  0  0 |
| 0 | 0  1  1 | 0  0  0 | 0  0  0 |
| 0 | 0  1  0 | 1  0  0 | 0  0  0 |
| 0 | 0  1  0 | 0  1  0 | 0  0  0 |
| 0 | 0  1  0 | 0  0  1 | 0  0  0 |
| 0 | 0  1  0 | 0  0  0 | 1  0  0 |
| 0 | 0  1  0 | 0  0  0 | 0  1  0 |
| 0 | 0  1  0 | 0  0  0 | 0  0  1 |
| 1 | *  1  * | *  *  * | *  *  * |

DATA CONVERSION SYSTEM FOR LINE-NARROWING A PATTERN

This application is a continuation of application Ser. No. 08/473,923 filed Jun. 7, 1995, now abandoned, which in turn is a continuation of application Ser. No. 08/152,889, filed Nov. 16, 1993, now abandoned, which in turn is a continuation of application Ser. No. 07/917,671, filed Jul. 21, 1992, now abandoned, which in turn is a continuation of application Ser. No. 07/642,986, filed Jan. 18, 1991, now abandoned.

TECHNICAL FIELD OF THE INVENTION

This invention pertains to a data conversion system for a pattern recognition device, and more particularly to a data conversion system for line-narrowing a pattern, for extracting its features. A data conversion system according to the invention is used in a systolic array for fine-line character stroke information by a systolic array structure.

BACKGROUND OF THE INVENTION

A CPU conventionally performs a line-narrowing process in one-dot units, which has the disadvantage of taking relatively long time. A system for reading inputted data with high dot number per unit area, with a high degree of accuracy takes a particularly long time.

If there is a limitation that only lines under a certain width are read, a predetermined number of line-narrowing processings need to be performed. However, if the inputted data are recognized in character units, a disadvantage arises that unnecessary line-narrowing (once a line-narrowing is achieved, no changes are produced by repeating line-narrowing) still needs to be executed, thus consuming even more time.

This invention aims at providing a data conversion system for expediting a pattern recognition first by parallel processing in a pipeline in a processing unit, second by eliminating unnecessary line-narrowing processings, and third by parallel processings in a pipeline with a systolic array for line-narrowing.

DESCRIPTION OF THE PRIOR ART

As a result of advances in computer technology, reading devices for receiving image data, extracting characters from received image data and recognizing respective characters in sentences of the read documents are put into practical uses. These reading devices divide dot data read by an image scanner or similar device into predetermined areas, and compare the character within each divided area with pre-registered characters, and outputs the most similar character as the result.

These predetermined data are generally stored in a dictionary memory which stories featuring data of the respectively defined characters. When a character to be recognized is inputted, the inputted character is similarly featured, so that the distance, i.e. the difference, from the predetermined featuring data stored in the dictionary memory is obtained. The character with the least distance is outputted as the recognition result.

In a recognition other than the pre-treatment, too, all the processing is performed in one-dot units. For instance, a character in a divided area is extracted as a recognized character, a 3*3 dot window is provided for obtaining the featuring data of the character from the 3*3 dot data. As in the pre-treatment, the 3*3 dot window is read in one-dot units by the CPU. When a memory can be accessed in 8-bit units, the neighboring 3 bits of data (e.g. 8 dots in a row) are read out in a single access, and then data in the next row are accessed, so that the newly read dots in the 3*3 dot window are sequentially processed.

When featuring data in the dot window are all obtained, the dictionary memory is sequentially accessed in character units by the featuring data, so that the distance from the featuring data is obtained. By comparing the distances from the featuring data for the respective characters, the character of the nearest distance (with the least difference) is outputted as the recognition result, or alternatively, the top-ranked three (3) or five (5) characters are outputted as candidate characters.

There are various methods for obtaining the featuring data. One is to recognize an inputted character by extracting its feature from the vector direction of a single narrowed line of one-dot width. This method compares the vector direction, i.e. the feature vector, of the inputted character with that of the character stored beforehand by equating the sizes of the inputted data through an advance normalization.

This method for line-narrowing requires a line-narrowing circuit. However, conventionally the line-narrowing circuit judges whether or not the dots around the center dot of e.g. 3*3 dots of the extracted character area are black or white, and determines whether or not to make the center dot white.

That is, for line-narrowing of one-dot width, eight (8) dots around the center dots are read dot by dot and their states (of white or black) determine the state of the center dot.

For this determination, a plurality of dots around (in a total of eight directions from) the center dot need to be read dot by dot, thus a problem exists that a relatively long time is required to call up the plurality of dots to judge one dot.

To reiterate, since a long time is required for line-narrowing, recognition processing in character recognition take a long time.

SUMMARY OF THE INVENTION

The first principle enables parallel pipeline processing to narrow lines sequentially at a high speed, line-narrowing in a pattern recognition device, as well as a pattern recognition is expedited.

The second principle uses a conversion window, e.g. of 3*3 dots, conversion data such as stroking data corresponding to the center cell are obtained faster, each time image data are inputted in dot-row units or in dot-column units.

The third principle sequentially supplies character data in dot-column units in parallel, so that the center dot of a mask comprising e.g. 3*3+2 dots is judged to be white or black according to the surrounding dots, it saves unnecessary conversion processing in line-narrowing, by converting a series of character data, e.g. in a 64*64 dot unit, thereby data conversion such as line-narrowing is expedited.

BRIEF DESCRIPTION OF THE DRAWINGS

FIG. 2B shows a configuration of an association dictionary;

FIG. 12 illustrates creations of conversion functions in the normalization module using the first principle of this invention;

FIG. 13 shows a loop program for a normalization by the normalization module using the first principle in this invention;

FIG. 19 shows an algorithm for a histogram calculation in the normalization module using the first principle of this invention;

FIG. 26 shows in detail the configuration of a linear histogram computing cell of the row-histogram module and the column-histogram module using the second principle of this invention, which utilizes a systolic array;

FIG. 34 explains the operations of the normalization part in the normalization module using the third principle of this invention;

FIG. 53 is a stroking table representing shift register values and an output in the stroking module in its embodiment of this invention using an array; and FIG. 54 is a noise reduction table in the stroking module in its embodiment of this invention using an array.

DESCRIPTION OF THE PREFERRED EMBODIMENTS

Figure 1A:
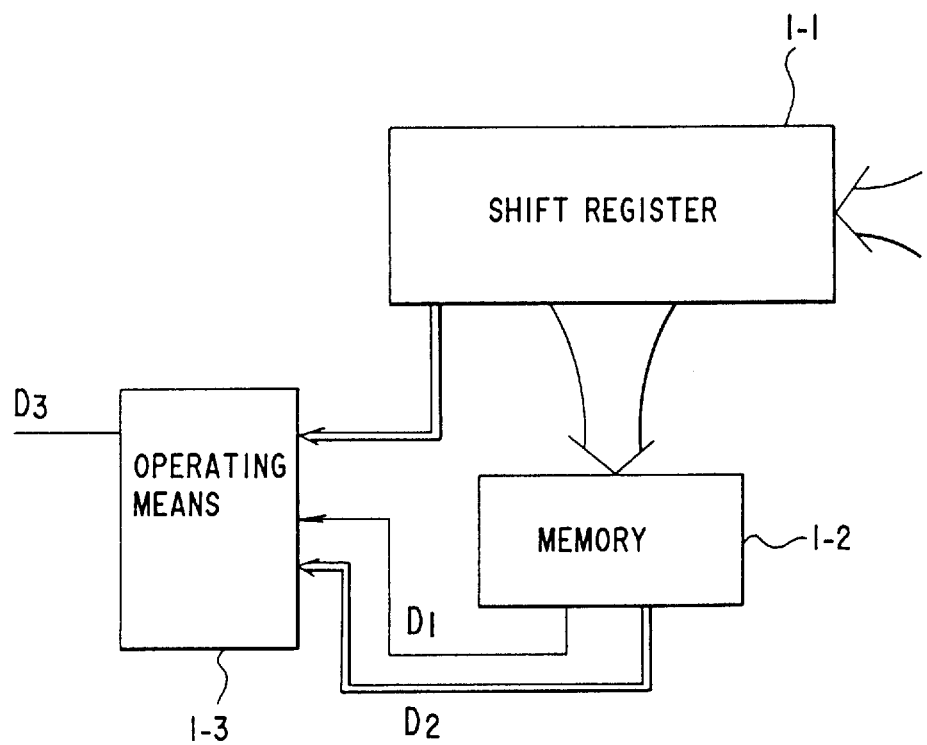
FIG. 1A is a block diagram illustrating a first principle of this invention.

FIG. 1A is a block diagram illustrating a first principle of this invention.

A part of image data is supplied to a shift register 1-1, which sequentially shifts the inputted data.

Data for a certain area among the data shifted at the shift register 1-1 are supplied to a memory 1-2 as addresses. When the data is in a pattern for determining the center value of the certain area, the memory 1-2 outputs predetermined data. Memory 1-2 outputs one bit indicating the center dot value in accordance with the pattern stored in the shift register; the pattern is input to the memory as an address. When the data is not in such a pattern, the memory 1-2 stores data for instructing data other than that of the certain area in the shift register 1-1 to determine the center value.

An operation means 1-3 selects and outputs data D1 when no instruction signal D2 is supplied from the memory 1-2, or determines and outputs output data D3 according to the data values of the certain area instructed by the instruction signal D2, when the instruction signal D2 is supplied.

A systolic array is a parallel system in which inter-cell communication is possible only between a cell and a neighboring cell is configured by providing a plurality of cells, with each cell comprising the shift register 1-1, the memory 1-2 and the operation means 1-3 in this invention. Mutually neighboring data among data supplied to each cell composing the systolic array are alternatively supplied to the shift register 1-1. For instance, at least three bits of dot data in one dot row are supplied to the shift register 1-1. Data further neighboring can additionally be supplied.

When such dot data are supplied to the input terminal of the systolic array comprising the cells in one-dot units, the respective cells sequentially shift the inputted dot data and supply the corresponding data in the certain area to the memory 1-2.

The memory 1-2 stores in advance data for outputting the center dot corresponding to the dot data in advance. The memory 1-2 stores data for determining the center dot to be either 0 (for white) or 1 (for black) per the state of eight (8) dots surrounding the center dot, e.g. in line-narrowing. Further, where the eight (8) surrounding dots cannot determine the center dot to be either 0 (for white) or 1 (for black), the memory 1-2 stores data for instructing dot data other than the eight (8) dots to determine the center value depending on whether the dot data of outside cells are 0 (for white) or 1 (for black).

To reiterate, the memory 1-2 outputs a bit which indicates the center dot value by referencing the surrounding eight dots or their further outside dots.

When the memory 1-2 outputs the instruction signal D2 for making the center dot white or black, the operation means 1-3 outputs the value of either 0 or 1. Upon receiving a signal instructing it to reference the outside dots, the operation means 1-3 determines the center dot to be white or black by taking the data of the outside dots into consideration.

Since the plurality of cells configure the systolic array, the data D3 outputted from the operation means 1-3 are supplied to the corresponding cell in the next stage, as well as the cells neighboring the corresponding cell and their neighboring cells.

When line-narrowing data are stored in the memory 1-2, the above actions enable the cell to output data after line-narrowing. Since the cells configure the systolic array, a thick part of a character can be narrowed sequentially in one-dot units, by providing the plurality of cells, a fine-line character of only one-dot width is finally obtained.

Figure 1B:
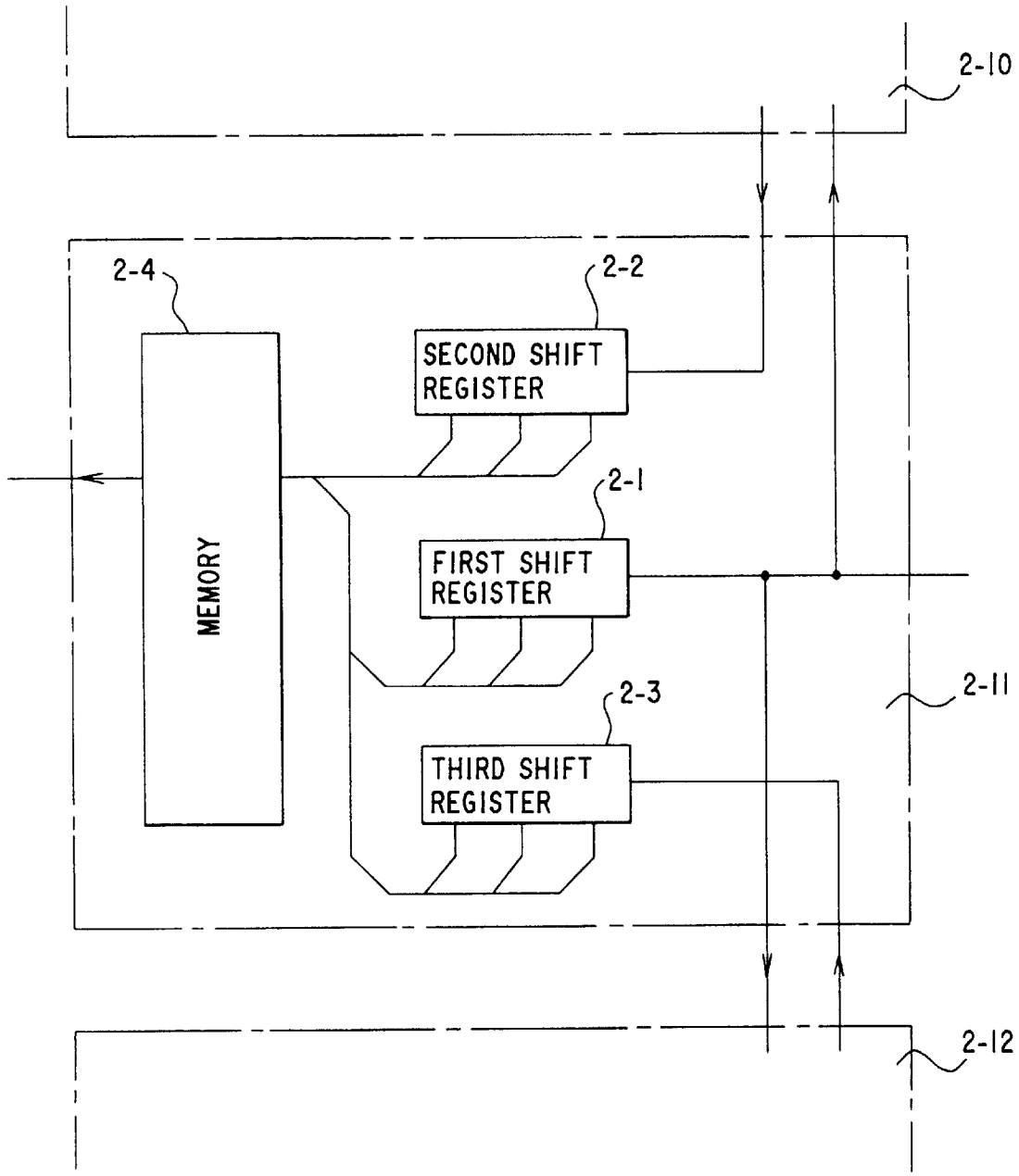
FIG. 1B is a block diagram illustrating a second principle of this invention.

FIG. 1B is a block diagram illustrating a second principle of this invention.

The second principle aims at a data conversion in parallel processings by supplying data to be recognized to respective cells 2-10, 2-11 and 2-12 in one-dot units.

A first shift register 2-1 comprising n stages is for supplying inputted data to the neighboring cells 2-10 and 2-12 on both sides and sequentially shifting the inputted data.

A second shift register 2-2 comprising n stages and supplied with data from the neighboring cell 2-10 is for sequentially shifting the supplied data.

A third shift register 2-3 comprising n stages and supplied with data from the neighboring cell 2-12 opposite to the second shift register 2-2 is for sequentially shifting the supplied data.

A memory 2-4, comprising e.g. a ROM or a RAM, receives 3*n bits of data shifted by the shift registers 2-1, 2-2 and 2-3 at its address terminal and outputs conversion data corresponding to the 3*n bits of data.

Data to be converted are supplied to respective cells 2-10, 2-11 and 2-12 in bit units. The number of those cells corresponds to the number of dots inputted simultaneously. The respective cells adds data inputted to the neighboring cells on both sides. For instance, the second shift register 2-2 is supplied with data from the neighboring cell 2-10 and sequentially shifts the data; and the third shift register 2-3 is supplied with data from the neighboring cell 2-12 opposite to the cell 2-10 and sequentially shifts the data.

The first, second and third shift registers 2-1, 2-2 and 2-3 each comprising e.g. three stages, sequentially shift their respective inputted data, and store 3*3 dots if the inputted data are of image data.

The memory 2-4 stores in advance data converted in correspondence with the 3*n dots of the respective inputted data. Since the 3*n bits of dot data stored in the first, second and third shift registers 2-1, 2-2 and 2-3 are supplied as addresses, the memory 2-4 outputs conversion data corresponding to the inputted data.

If the converted data stored in the memory 2-4 are stroking data, second shift data of the first shift register 2-1 represents a predetermined color.

When at least either a first shift datum of the second shift register 2-1 or a third shift datum of the third shift register 2-3 represents the predetermined color, the memory 2-4 outputs a code representing a first direction.

When at least either a third shift datum of the second shift register 2-2 or a first shift datum of the third shift register 2-3 represents the predetermined color, the memory 2-4 outputs a code representing a second direction.

When at least either a first shift datum or a third shift datum of the first shift register 2-1 represents the predetermined color, the memory 2-4 outputs a code representing a third direction.

When at least either a second shift datum of the second shift register 2-2 or a second shift datum of the third shift register 2-3 represents the predetermined color, the memory 2-4 outputs a code representing a fourth direction.

For instance, data in the first row of a character area are supplied in one-dot units, and 0 and 1 represent white and black, respectively. The value of the center (the second shift datum of the first shift register 2-1) of 3*3 dots is 1.

When the second shift datum of the second shift register 2-2 or the second shift datum of the third shift register 2-3 is 1, the memory 2-4 outputs a code representing e.g. a horizontal direction as the fourth direction.

When the second shift datum of the second shift register 2-2 or the second shift datum of the third shift register 2-3 is 1, the memory 2-4 outputs a code representing e.g. a vertical direction as the third direction.

When at least either the third shift datum of the second shift register 2-2 or the first shift datum of the third shift register 2-3 is 1, the memory 2-4 outputs a code representing e.g. a 45-degree slash direction as the second direction.

When at least either the first shift datum of the second shift register 2-1 or the third shift datum of the third shift register 2-3 is 1, the memory 2-4 outputs a code representing e.g. a 135-degree back-slash direction as the first direction.

Because each time data of 3*3 dots are sequentially supplied to the memory 2-4 in dot-row units or in dot-column units they are converted in one-dot units, the conversion processing is fast.

Figure 1C:
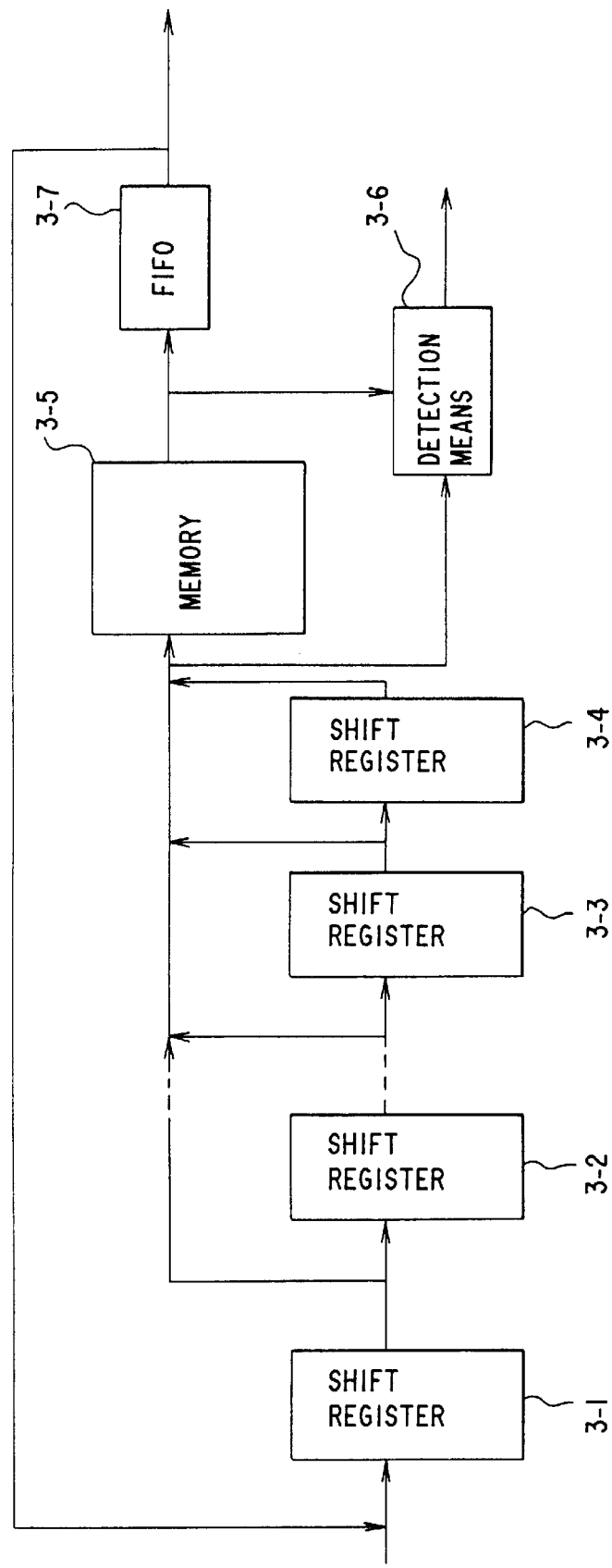
FIG. 1C is a block diagram illustrating a third principle of this invention.

FIG. 1C is a block diagram illustrating a third principle of this invention.

Shift registers 3-1 through 3-4 each comprising a plurality of stages sequentially shift supplied data of N bits to the next registers. That is, the shift register 3-1 is supplied with N bits of data. The shift register 3-2 is supplied with data shifted by the shift register 3-1. The shift register 3-3 is supplied with data shifted by the shift register 3-2. The shift register 3-4 is supplied with data shifted by the shift register 3-3.

A memory 3-5 receives data stored in the shift registers 3-1 through 3-4 as its addresses and outputs previously stored data e.g. conversion data used in line-narrowing for the N bits of sequentially inputted data.

A FIFO 3-7 memorizes data outputted from the memory 3-5 and supplies the data previously stored in the memory 3-5 to the first stage of the shift register 3-1 comprising the plurality of stages.

A detection means 3-6 detects by comparing a part of data supplied to the addresses of the memory 3-5 with the output from the memory 3-5, whether or not data shifted by the shift registers 3-1 through 3-4 and the FIFO 3-7 change while they are circulated in a loop.

The respective shift registers 3-1 through 3-4 comprise a plurality of stages and have inputs and outputs of N bits, the shift registers 3-1 through 3-4 together form a shift register of N bits with a plurality of stages. For example, those shift registers may have data of three (3) bits with four (4) stages.

Among the data of 3 bits with 4 stages, 3*3+2 bits of shift data are supplied to the addresses of the memory 3-5 which stores conversion data of the center dot corresponding to the data supplied to the addresses. This data is stored in advance e.g. for determining whether the center dot of the 3*3+2 dots is white or black. The output from the memory 3-5 that stores a series of image data converted by the shift registers 3-1 through 3-4 and the FIFO 3-7 is supplied to the FIFO 3-7. After the series of image data is completely inputted, data once converted is sequentially outputted from the FIFO 3-7 again to the shift register 3-1. For instance, when a line-narrowing circuit is formed, data to the FIFO 3-7 is supplied to the shift register of the next stage.

When this series of actions are performed sequentially, the detection means 3-6 judges whether or not any of the series of image data supplied to the memory 3-5 change from the data outputted from the memory 3-5. If the detection means 3-6 does not detect a non-conformance during the loop (in which the series of data are circulated for conversions), since conversions are terminated, the result is outputted. Since a termination of conversions is detected by a single non-conversion processing, an unnecessary processing step is prevented.

The following is a detailed description of this invention based on the illustration in the drawing.

Figure 2A:
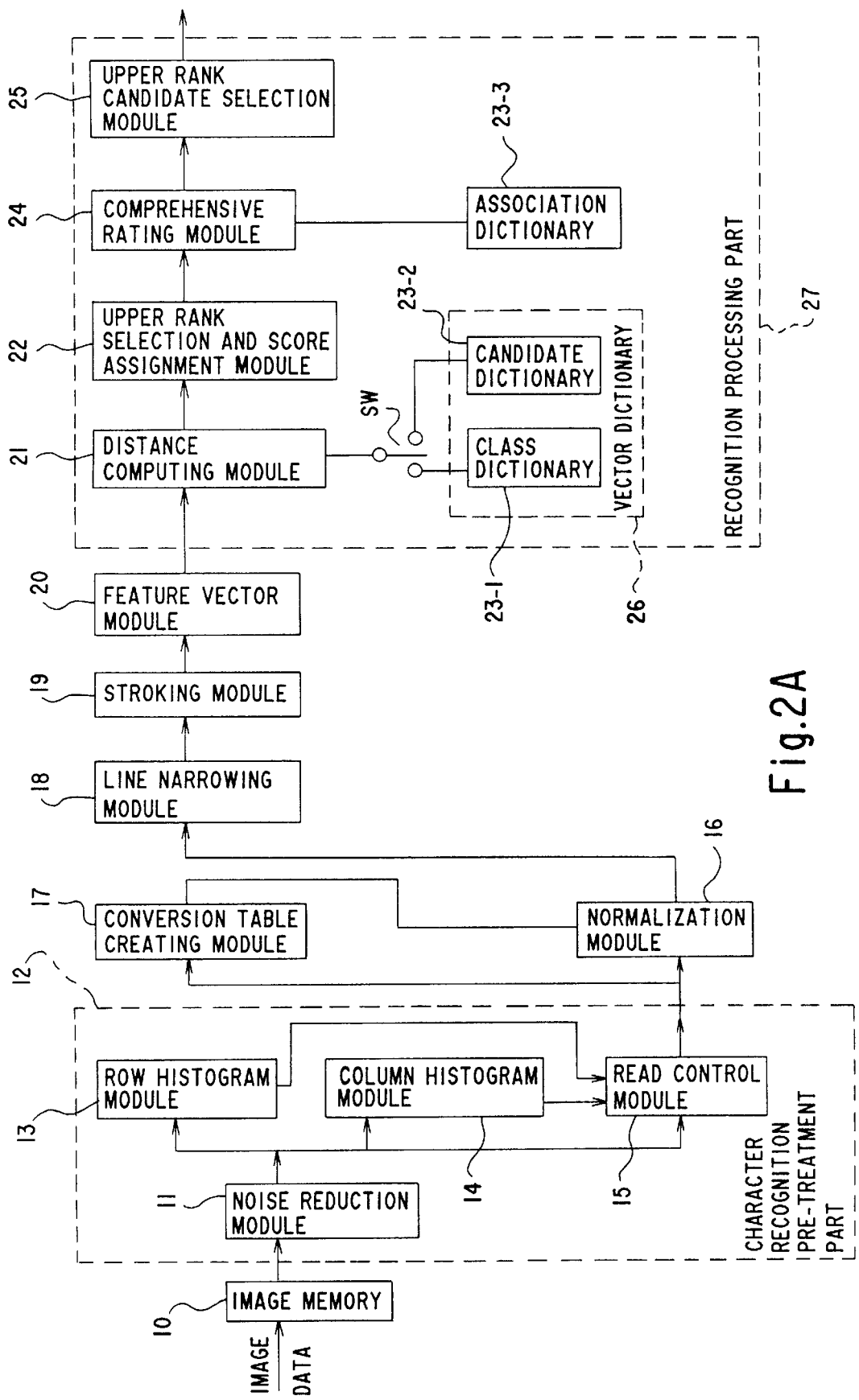
FIG. 2A shows a system configuration of a character-recognizing device using an image data normalization circuit of this invention.

FIG. 2A shows a system configuration of a character-recognizing device using an image data normalization circuit of this invention.

Information read by an image scanner or similar device is stored in an image memory 10 as image data. The image memory 10 has memory capacity for a page read by the image scanner. Each dot of the read information is stored as two-value data of either white or black, i.e. 0 or 1.

Image data stored in the image memory 10 are supplied to a noise reduction module 11, where noise generated during reading time is eliminated. The eliminated noise is irrelevant to the character information. As an example, the noise reduction module 11 treats as white a black dot in a center of a three-by-three mask pattern in which only the dot in the center is black and the eight surrounding dots are white. Although the configuration of this invention provides the noise reduction module 11 to operate in a character recognition pre-treatment part 12, it could be set to operate at some other time, such as when the read image data are stored in character units in a normalization module 16, which will be described later. Alternatively, it could be at a time of line-narrowing or stroking.

The image data which have undergone a noise elimination through the noise reduction module 11 are supplied to a row-histogram module 13, a column-histogram module 14 and a read control module 15.

The row-histogram module 13 projects the read information, such as the content of the form read by the image scanner described earlier, in the row direction and finds the number of dots in each dot row. That is, it finds the number of black dots in each dot row (in the horizontal direction).

As in the row-histogram module 13 described earlier, the column-histogram module 14, projects the read information in the column direction and finds the number of dots in each dot unit column.

The row-histogram module 13 sequentially counts the number of black dots (for each dot row) in data sequentially read in one dot unit in the row direction from the image memory 10 (similarly to a dot reading by a raster scan) and supplied through the noise reduction module 11. That is, the row-histogram module 13 sequentially finds the number of black dots in each row. The numbers of black dots in respective rows form a row histogram.

The column-histogram module 14 has counters each corresponding to a black dot position in a dot row, and increments the counter corresponding to the black dot position when a dot in a row is sequentially supplied.

By performing these operations for one page, the row-histogram module 13 and the column-histogram module 14 respectively obtain a row histogram and a column histogram each representing the numbers of dots in row positions and column positions. The result is supplied to the read control module 15.

The read control module 15 sequentially obtains the row position and the column position from the row histogram and the column histogram, respectively. These positions can be found, for instance, by a cycle of the row histogram or the column histogram.

The read control module 15 finds the row and column positions and performs the following additional procedures. Image data, such as information read by an image scanner, can have an obliqueness due to a paper position. To cope with this, the read control module 15 sequentially changes the angle wherewith a histogram is obtained, so that an adjusted angle is obtained. Then, the image data supplied from the noise reduction module 11 are reinputted to obtain the final histogram, so that row data for one cycle period corresponding to the obliqueness are read from the point whence the row histogram (having a maximum value) obtained from the adjusted obliqueness changes from zero to a positive number (or from a positive number to zero) and stored in a row buffer provided in the read control module 15.

Further, the read control module 15 again obtains a column histogram in a row from the row data stored in the row buffer and cuts out data of one character area to be outputted to a normalization module 16 and a conversion table creation module 17 from the point whence the column histogram changes from zero to a positive number The conversion table creation module 17 is for obtaining conversion data for enabling the normalization module 16 to normalize a character. The conversion table creation module 17 projects the data of one character area extracted by the read control module 15 in the column and row directions, thereby incrementing the respective counters in the column and row directions by the dot row unit and by the dot column unit from the column and row with a black dot, to obtain the final counter value in one character area.

The normalization module 16 magnifies the size of one character area from the size when the character in the character area is originally extracted, per the final counter values in the row and column directions of the dots in the extracted character, to the full sized character which may, for example, comprise sixty-four (64) by sixty-four (64) dots.

For example, if the conversion table creation module 17 has forty-eight (48) dots in both the column and row directions, the normalization module 16 converts a forty-eight (48) by forty-eight (48) dot character to a sixty-four (64) by sixty-four (64) dot character, where row and column dot data of particular positions are repeatedly used as the same data in magnifying the character.

In case of a contraction, row and column dot data of particular positions are repeatedly read which are contracted as the same row and column dot data by "OR" additions.

After the normalization module 16 magnifies a character to a full sized character, such as of sixty-four (64) by sixty-four (64) dots, a line-narrowing module 18 narrows the width of the character by using a mask of eleven (11) dots comprising a center dot and the eight (8) other dots in the surrounding three (3) by three (3) area as well as the second left dot and the second up dots from the center dot. Alternatively a mask used in narrowing could be of nine (9) dots in the three (3) by three (3) dot area around the center dot.

The width of a line around a dot of a character can be narrowed by a control of the earlier described mask whereby a center dot of a predetermined pattern is set to zero. By repeating the narrowing procedures with masks, lines of a character are set to a width of one dot.

The narrowed line character of sixty-four (64) by sixty-four (64) dots, obtained by the line-narrowing module 18 is supplied to a stroking module 19 for stroking. The stroking module 19 expresses a dot by a total of four kinds of strokes wherein there is a black dot above or below; right or left; right above or left below; and left above or right below an objective dot, such as a center dot. If the objective dot belongs to plural kinds of strokes among the four (4) kinds described above, a prioritization, such as the vertical direction first, the horizontal direction second, etc., for deciding the kind of stroke the objective dot belongs to. When the objective dot is white or the center dot value is zero (0), the stroke is not considered to exist.

Since the stroking module 19 has five (5) cases wherein a stroke exists in any of four (4) directions, i.e. vertical, horizontal, slash, and back-slash directions, or does not exist, the state of each dot is expressed as a three (3) bit value. The resultant three (3) by sixty-four (64) by sixty-four (64) bits of information are supplied to a feature vector module 20.

The feature vector module 20 divides the stroking information obtained at the earlier described stroking module 19 both horizontally and vertically in eight (8) dot units. A vector module area of a total of two hundred fifty-six (256) dots, a sixteen (16) by sixteen (16) pattern, comprises one of the divided areas, the area below it, the area to its right, and the area to its lower right, each having 64 dots. The feature vector module 20 counts whether or not any of the four kinds of strokes in the vertical, horizontal, slash and back-slash directions exists. Although a feature vector is obtained in a vector module area comprising sixteen (16) by sixteen (16) dots, since a vector module area is vertically or horizontally shifted by eight (8) dots, there are seven (7) feature vector areas in both the row and column directions. Therefore, each character has a total of forty-nine (49) vector module areas for feature vectors, these vector modules area being in a seven (7) by seven (7) pattern.

When the feature vector module 20 counts the number of strokes in each of the four directions for the respective vector module areas described earlier, the feature vector module 20 weights each dot representing a directional stroke, such that a center part of a vector module area comprising sixteen (16) by sixteen (16) dots has a higher weight in obtaining a feature vector. The weight reduces with distance from the center. For instance, a dot representing a directional stroke in the center area comprising four (4) by four (4) dots has a weight of four (4); a dot representing a directional stroke in the surrounding harrow area comprising eight (8) by eight (8) dots, excluding the four (4) by four (4) dot area at the center, has a weight of three (3); a dot representing a directional stroke in the outer surrounding harrow area comprising twelve (12) by twelve (12) dots, excluding the eight (8) by eight (8) dot area at the center, has a weight of two (2); and a dot representing a directional stroke in the outermost harrow area comprising sixteen (16) by sixteen (16) dots, excluding the twelve (12) by twelve (12) dot area at the center, has a weight of one (1).

Since the feature vectors set characters to be recognized to the same size, the same characters (of different writings) have approximately the same feature vector. That is, each character has its specific feature vector. However, since there are very similar characters, an embodiment of this invention uses standard patterns of feature vectors for classification in each vector module area for a feature vector, such that a distance is found between a supplied unknown input and twenty (20) classes of standard patterns in each vector module area, in order to improve operation processing speed and recognition rate. That is, the distance is found between the feature vector of the character to be read in each vector module area obtained from the feature vector module 20 and the feature vector of a standard pattern in the vector module area. Each vector module area is classified into classes 1 through 20, and the order of the classes having class distances in respective vector modules is found from the smallest to the fifth-smallest.

A distance computing module 21 calculates the distances by using a class dictionary 23-1 (storing standard patterns in class units) in a vector dictionary 26. A candidate dictionary 23-2 is used to calculate the distances for respective candidate characters. (At this time a switch SW selects the candidate dictionary 23-2.)

An upper rank selection and score assignment module 22 determines the five (5) top-ranked classes described earlier and the scores of the corresponding classes in the respective vector module areas. That is, the upper rank selection and score assignment module 22 determines the scores given to the respective classes of the first to fifth ranks from the distances obtained by the distance computing module 21, i.e. the scores of the respective candidate characters. For instance, five (5) points are given to the candidate character having the smallest distance, and decremental points of four (4) through one (1) are given to respective classes having the second smallest to the fifth smallest distances. These procedures are performed for all forty-nine (49) vector module areas. The processing result of the upper rank selection and score assignment module 22 is supplied to a comprehensive rating module 24.

The comprehensive rating module 24 is for calculating the degree of conformance between an input objective, i.e. an inputted character, and its candidate character, and operates in three modes comprising an association conformance mode rated by a score, and a one hundred percent conformance mode and an individual conformance mode each rated by a distance.

The association conformance mode is for calculating the score of a candidate character from the vector module area corresponding to the candidate character stored in an association dictionary 23-3 and a class belonging to the vector module area.

FIG. 2B shows the configuration of an association dictionary.

As shown in FIG. 2B, the association dictionary 23-3 stores the identifications for the classes to which the candidate characters belong in the respective vector module areas by using the identifications for the candidate characters in the respective vector module areas as the addresses. The association dictionary 23-3 stores only these data obtained by clustering sets of feature vectors corresponding to the identifications for the vector module areas of the respective candidate characters by their (weighted) distances. The class dictionary 23-1 of the same structure corresponding to the association dictionary 23-3 is created concurrently in the distance computing module 21.

When at least two kinds of dictionaries are stored in one memory, the one to be used is designated at a dictionary reference starting point. (By comprehensively rating each of the dictionaries divided by identifications for the candidate characters in parallel, they can be referenced at higher speeds.)

The association dictionary 23-3 is a table describing the identifications "K" for the classes wherein a candidate character "a" belongs to a vector module area "m". By expressing this relation by, $$C(m,a)=K$$

for a candidate character "a" (=1 through c_cand), the association dictionary 23-3 is obtained as $$V(a)=\text{SIGMA}(m=1 \text{ through c\_mask}) \, P(m,C(m,a))$$

where P(m,K) represents a score, and V(a) represents a comprehensive rating value for the candidate character "a".

The one hundred percent conformance mode and the individual conformance mode in the comprehensive rating module 24 are for calculating comprehensive rating value V(a) for each candidate character "a". The one hundred percent conformance mode sets a=1 through c_cand; the individual conformance mode sets J=1 through c_kind and a=b(j); and a distance is expressed as d(m,a), in obtaining V(a) which is a (weighted) distance of the feature vector between the candidate character "a" and the input object.

$$V(a)=\text{SIGMA}(m=1 \text{ through c\_mask}) \, d(m,a)$$

The upper-rank candidate selection module 25 selects and outputs a plurality of characters, e.g. five (5) top-ranked characters that become the recognition results of the read image data.

The operations described earlier are performed in a pipeline processing. For instance, one page of the image memory 10 for storing image data are read in a pipeline processing, divided into rows by the read control module 15 and outputted to the normalization module 16 in a unit of one character, so that the line-narrowing, stroking, feature vector making and recognition processing described earlier are performed.

As described above, the upper-rank candidate selection module 25 is for selecting the five (5) top-ranked characters by ranking the candidate characters per the comprehensive rating value V(a).

The inputs are $$(a', V(a)\tfrac{1}{2}a', a=1 \text{ through c\_cand revised})$$

for an association one hundred percent conformance mode; and $$(j, V(a)\tfrac{1}{2}j=1 \text{ through c\_kind}, a=b(j))$$

The descending/ascending order of the comprehensive rating value V(a) of the individual conformance mode is sequentially from the biggest for character association; and sequentially from the smallest for others.

Its outputs are identifications for the candidate characters arrayed in a sorting result of the inputs (or the inputting order) and their comprehensive rating values V(a).

Figure 3:
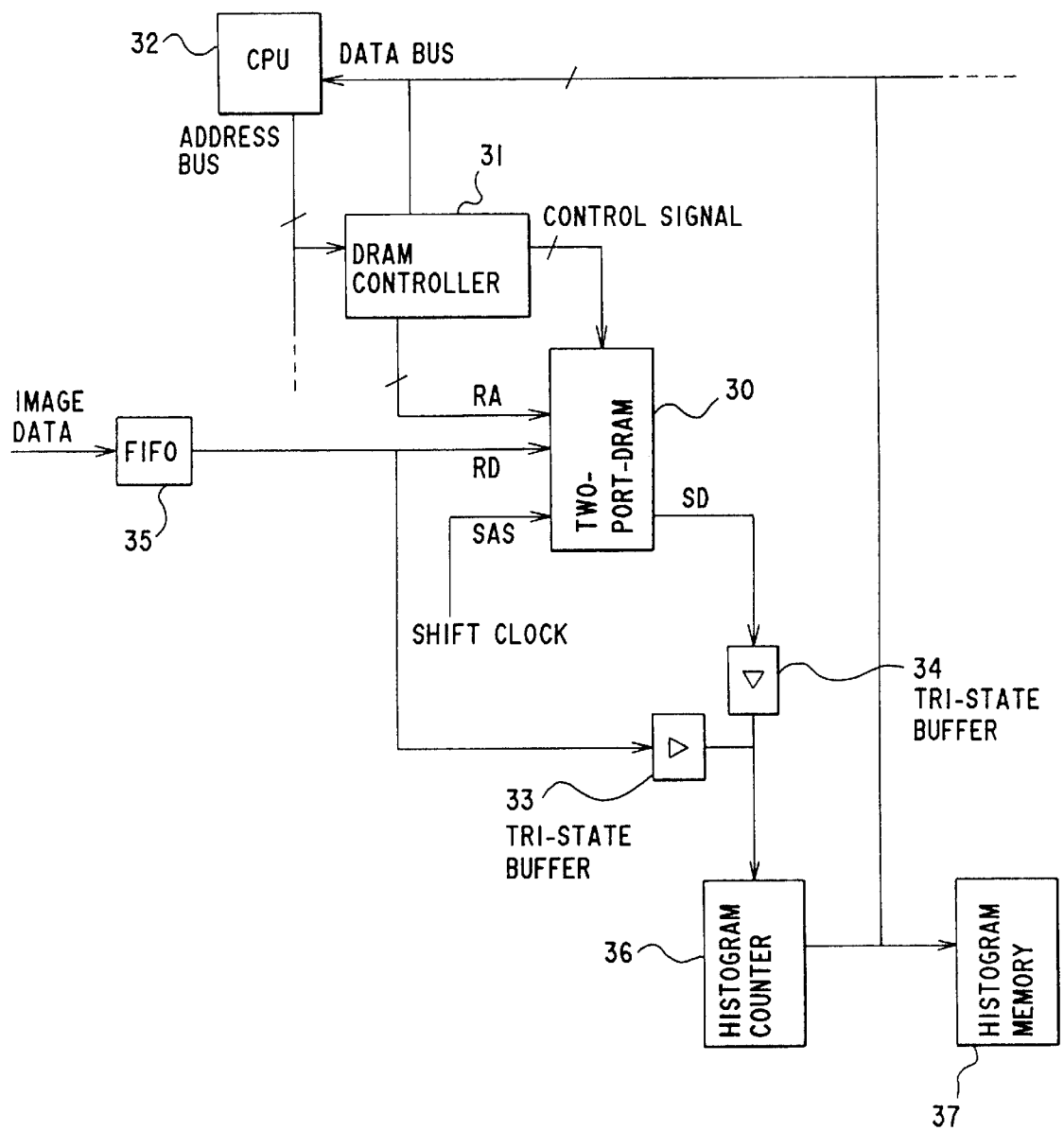
FIG. 3 shows in detail the circuit configurations of a row-histogram module and a column-histogram module using the first principle of this invention.

FIG. 3 shows in detail the circuit configuration of the row-histogram module 13 and the column-histogram module 14 using the first principle of this invention.

The embodiment of this invention shown in FIG. 3 provides a two-port DRAM 30 and a DRAM controller 31. The DRAM controller 31 specifies the addresses supplied to the two-port DRAM 30 at input and output times. When image data is supplied to an input terminal (RD) of the two-port DRAM 30 through a FIFO 35, the DRAM controller 31 supplies line data of a direction of the image data to the same column addresses as those specified earlier by sequentially changing row addresses of the two-port DRAM 30. The DRAM controller 31 is connected to an address bus and a data bus of a CPU 32. The CPU 32 controls the DRAM controller 31 for accessing the two-port DRAM 30, immediately before the read image data are supplied to the two-port DRAM 30 through the FIFO 35.

The control by the CPU 32 makes the DRAM controller 31 sequentially access row addresses. After accessing the row addresses of one line, the DRAM controller 31 changes the column addresses.

The outputs from the FIFO 35, i.e. data supplied to the input terminal of the two-port DRAM 30, are supplied to a tri-state buffer 33. The outputs from the two-port DRAM 30 are supplied to a tri-state buffer 34. The outputs from the tri-state buffer 33 and the tri-state buffer 34 are supplied commonly to a histogram counter 36.

Either the tri-state buffer 33 or the tri-state buffer 34 is activated when the histogram counter 36 starts counting prompted by an instruction signal (not shown in the drawing) from the CPU 32. The histogram counter 36 is for counting a dot number in one direction along a line, e.g. one scanning direction or its vertical direction. A histogram memory 37 stores a result for each direction. The outputs from the histogram counter 36 are supplied not only to the histogram memory 37 but also to the data bus. If the DRAM controller 31 controls the histogram counter 36, e.g. when the histogram counter 36 outputs a counting result, the outputs from histogram counter 36 open the buses and have the histogram memory 37 store the addresses through the buses.

Figure 4:
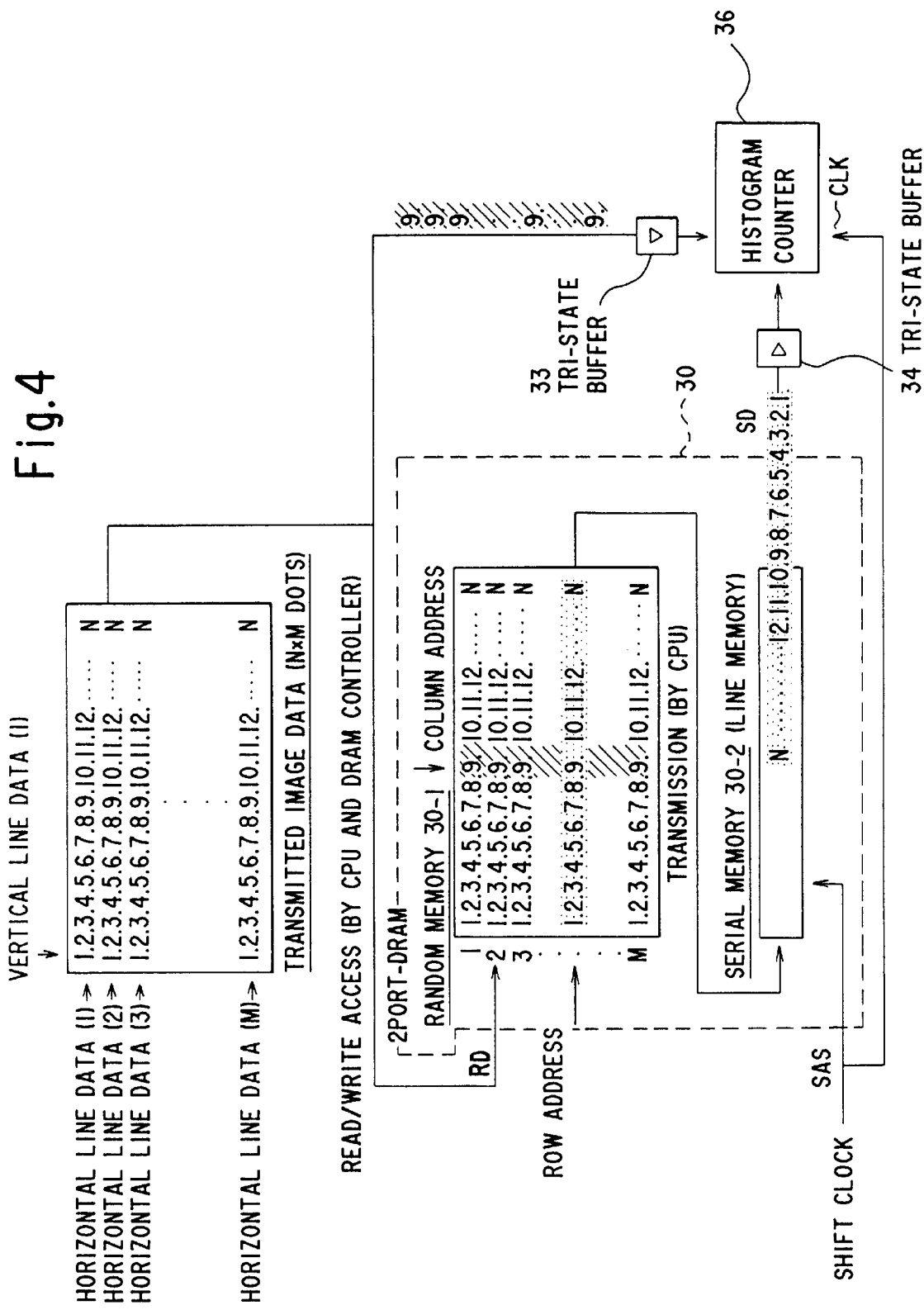
FIG. 4 explains the operations and the circuit configurations of the row-histogram module and the column-histogram module using the first principle of this invention, described in FIG. 3 further in detail.

FIG. 4 explains in more detail the operations and the circuit configurations of a row-histogram module 13 and a column-histogram module 14 using the first principle of this invention described in FIG. 3.

The two-port DRAM 30 comprises a random memory 30-1 for storing the row addresses and the column addresses and a serial memory (line memory) 30-2. Vertical line data of the read image data (of n by m dots) are supplied dot-serially to the two-port DRAM 30. At this time, the two-port DRAM 30 stores the row addresses sequentially changed by the DRAM controller 31 while keeping the column addresses constant in a vertical line, so that the vertical line data are sequentially stored in the same column addresses. By having the vertical line data (or the line numbers) sequentially changed and transmitting them to lines 1 through n, the DRAM controller 31 under the control of the CPU 32 has the random memory 30-1 store the transmitted image data (of n by m dots).

While these data are being stored, the vertical line data are sequentially supplied to the histogram counter 36 in one-dot units by activating the tri-state buffer 33. The outputs from the tri-state buffer 33 are supplied to an enable terminal of the histogram counter 36 corresponding to a clock pulse supplied in one-dot units. When the inputted dot data is "1" (black), the histogram counter 36 performs a counting. When the inputted dot data is "0" (white), the histogram counter 36 does not perform it. That is, the histogram counter 36 counts the number of black dots whose value is "1". Since the results in vertical-line units are stored in the histogram memory 37 shown in FIG. 3, a histogram in vertical-line units is stored in the histogram memory 37.

Meanwhile, after the transmitted image data (of n by m dots) are stored in the random memory 30-1, a signal (not shown in the drawing) specifies row addresses. Dot data specified by the row addresses are transmitted to the serial memory 30-2. After the transmission controlled by the CPU 32, by applying a shift clock pulse SAS to the two-port DRAM 30, an output terminal SD of the two-port DRAM 30 outputs data (1 through n) corresponding to a row address in horizontal-line units.

At this time, the tri-state buffer 34 is activated and supplies the dot data outputted from the output terminal SD of the two-port DRAM 30 are sequentially supplied to the histogram counter 36. Since outputs from the tri-state buffer 34 are supplied to the enable terminal of the histogram counter 36, dot data are counted in the horizontal direction, similarly to those in the vertical direction described earlier. The counted value is supplied to the histogram memory 37 in horizontal-line units, and the histogram memory 37 obtains the vertical and horizontal histogram results.

Whereas image data are transmitted in one-dot units in the first embodiment shown in FIG. 3, when a histogram of one direction is inputted, a histogram of the other direction is already stored in the two-port DRAM 30. Since a hard circuit performs the accesses to the two-port DRAM 30 at high speed, it cuts the processing time.

Figure 5:
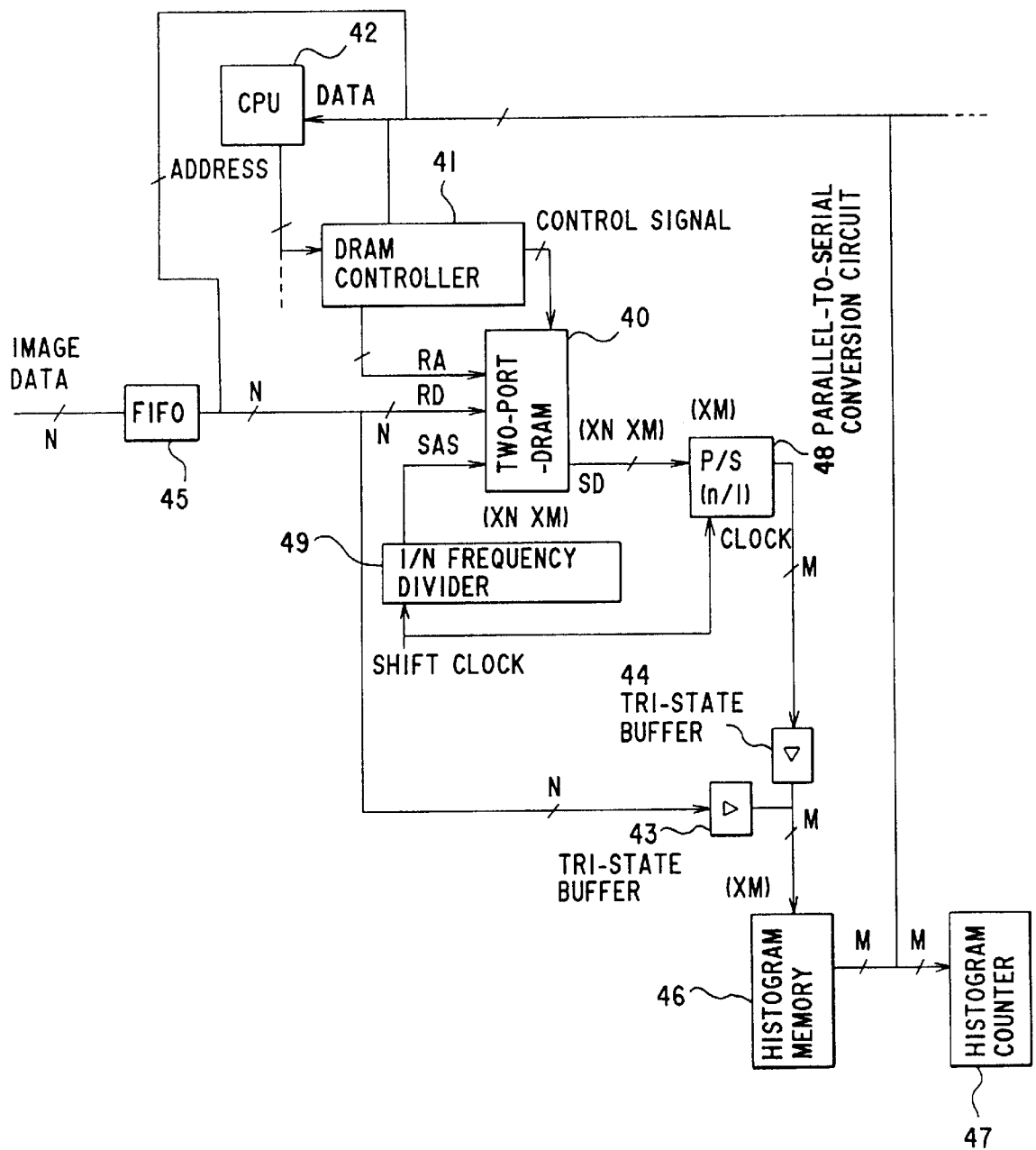
FIG. 5 shows the detailed circuit configurations of the row-histogram module and the column-histogram module using the first principle of this invention.

FIG. 5 shows in detail the circuit configurations of the row-histogram module 13 and the column-histogram module 14 using the first principle of this invention.

Figure 6:
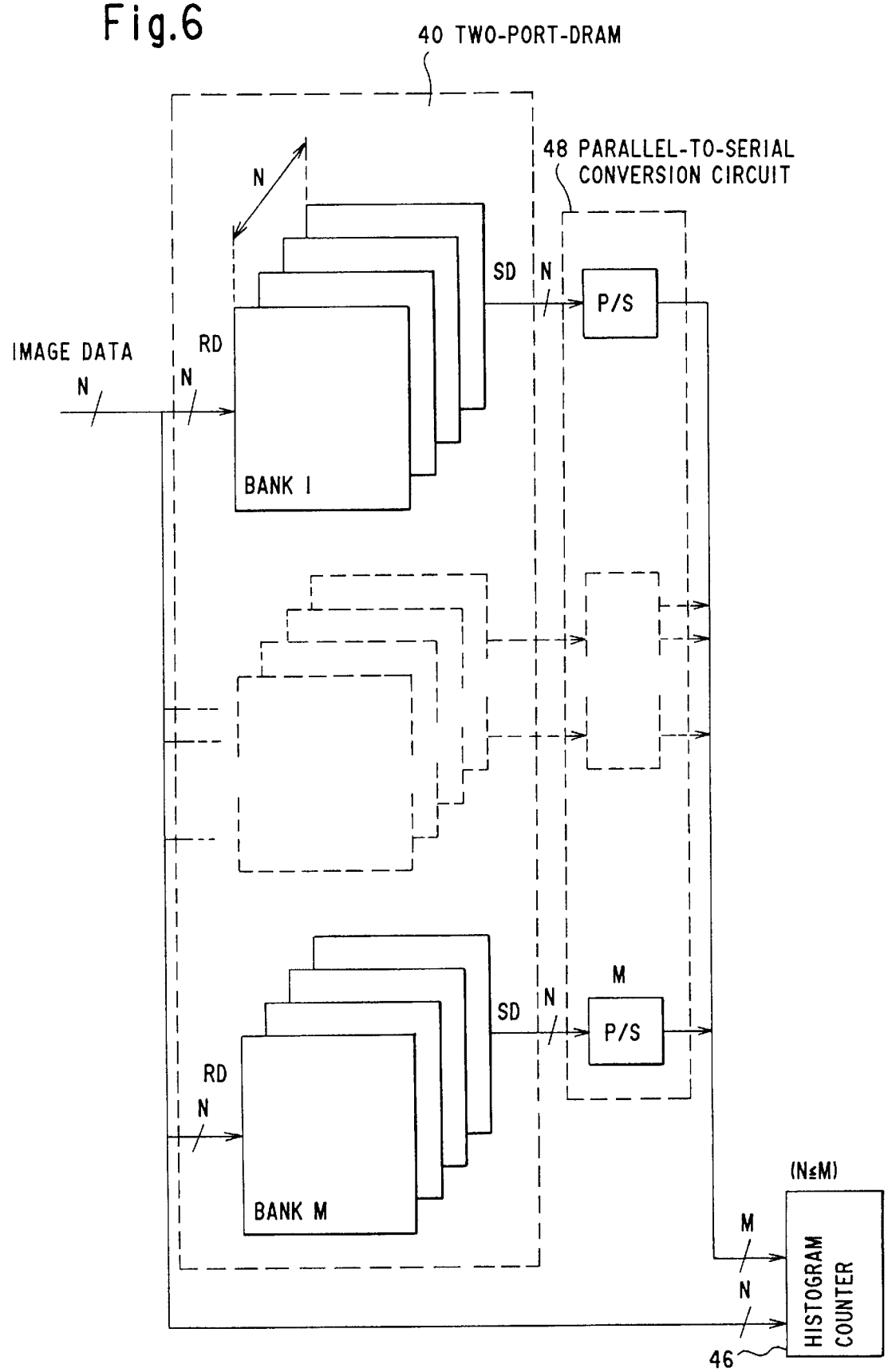
FIG. 6 shows schematically the configurations of the row-histogram module and the column-histogram module using the first principle of this invention.

FIG. 6 shows schematically the configurations of the row-histogram module 13 and the column-histogram module 14 using the first principle of this invention.

Whereas the first embodiment shown in FIG. 3 uses only one two-port DRAM 30, the second embodiment shown in FIG. 5 uses a two-port DRAM 40 comprising n by m pieces of the two-port DRAMs 30 for processing in n bit units. That is, n pieces of dot data are supplied to the two-port DRAM 40 in a batch.

A DRAM controller 41 is similar to the DRAM controller 31 shown in FIG. 3 and is for controlling the two-port DRAM 40 each comprising n by m pieces of the two-port DRAMs 30 by supplying respective addresses and control signals. When dot data are stored, n pieces of these addresses for storing dot data are supplied in a batch to n pieces of the two-port DRAMs 30 in the two-port DRAM 40. By outputting the n pieces of these addresses m times, n by m bits of dot data are stored in the two-port DRAM 40 comprising n by m pieces of the two-port DRAMs 30.

More specifically, image data of n dots, i.e. n bits of dot data, are stored in a FIFO 45 before they are supplied to the two-port DRAM 40, and a CPU 42 controls the DRAM controller 41. n bits of dot data are stored in a batch in n pieces of the two-port DRAMs 30 grouped in the two-port DRAM 40. By repeating the procedure m times, n by m bits of dot data are stored in the two-port DRAM 40.

The outputs from the FIFO 45 are supplied to a tri-state buffer 43 as well as to the two-port DRAM 40. Per an instruction from the CPU 42, when the tri-state buffer 43 is active, the n inputted bits of data are supplied to a histogram counter 46. The histogram counter 46 then counts the number of black dots included in these n bits of dot data received. That is, the histogram counter 46 comprises m pieces of counters, where m is no less than n. In order to be counted, the outputs from the tri-state buffer 43 are supplied respectively to n pieces of counters among the above m pieces of counters.

When the two-port DRAM 40 stores a page of image data, n by m pieces of the two-port DRAMs 30 in the two-port DRAM 40 output data in parallel in the direction vertical to their respective stored data. That is, n pieces of data comprising n by m bits (which is the number of the two-port DRAMs 30 in the two-port DRAM 40) are outputted.

Since the two-port DRAM 40 outputs n bits of dot data in the direction vertical to the stored direction, a parallel-to-serial conversion circuit 48 serially outputs the n bits by a further parallel-to-serial conversion of the n bits. Because a clock shifted by a frequency divider 49 is supplied to the respective input terminals for receiving the shift clock pulse SAS in the two-port DRAM 40, the two-port DRAM 40 simultaneously outputs n bits in synchronization with the shift clock pulse SAS. Accordingly, each time n bits are received, the parallel-to-serial conversion circuit 48 supplies the n bits to the histogram counter 46 through a tri-state buffer 44, by converting n bits from parallel data to serial data. Since the outputs from the parallel-to-serial conversion circuit 48 comprise n bits, the histogram counter 46 counts the respective n bits of dot data and supplies the result to the histogram memory 47.

As shown in FIG. 6, the two-port DRAM 40 as an image memory determines a bit width of one bank based on the transmitted image bit width, and the bank number is set equal to the histogram counter number (i.e. limited by the histogram counter number), where m is never less than n.

Figure 7:
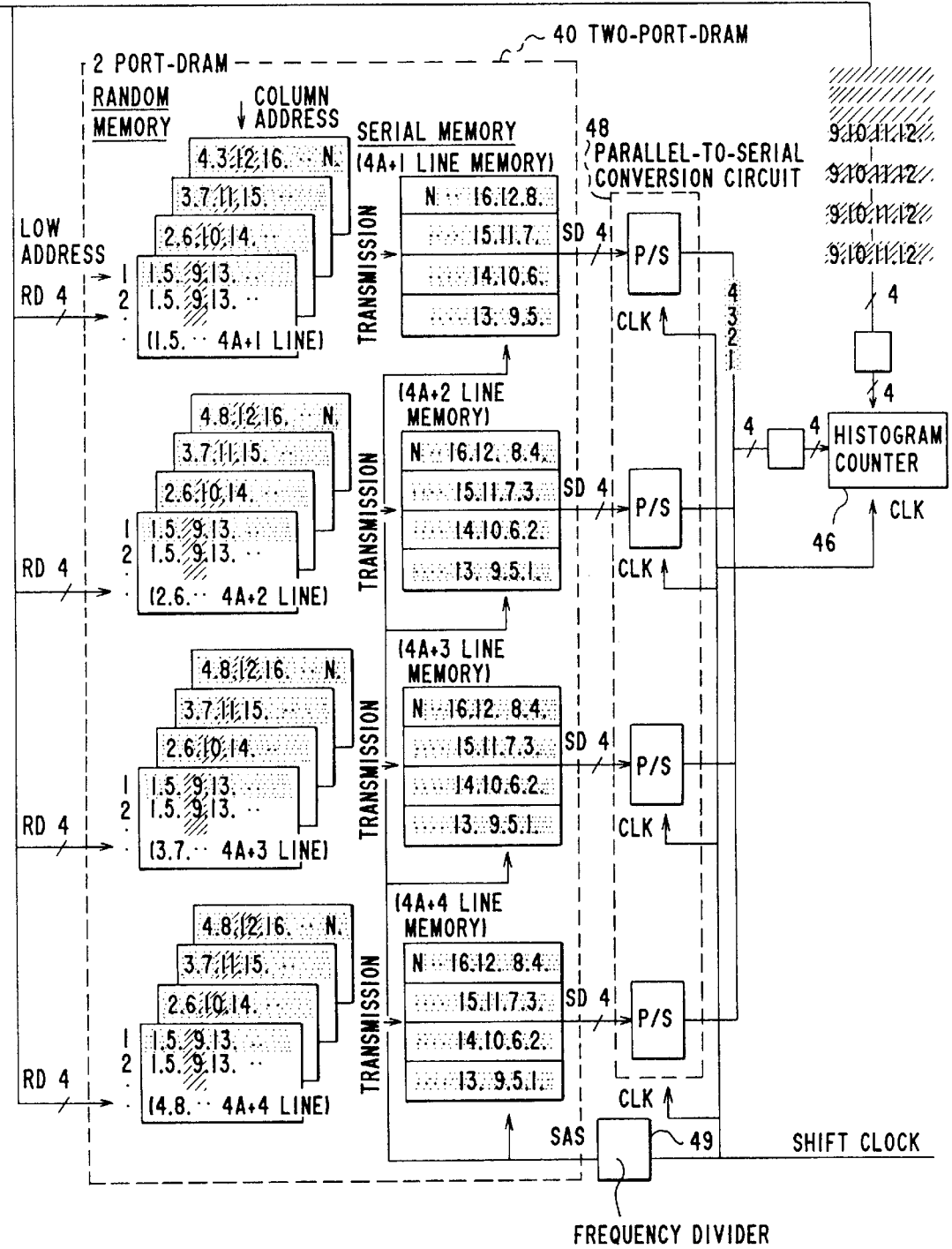
FIG. 7 explains the operations of the row-histogram module and the column-histogram module using the first principle of this invention.

FIG. 7 explains the operations of the row-histogram module 13 and the column-histogram module 14 using the first principle of this invention.

The image data transmitted to the two-port DRAM 40 are stored, as shown in FIG. 7. After "i"-th horizontal line data are stored in an "i"-th bank, "i+1"-th horizontal line data are stored in an "i+1"-th bank. After the bank of the maximum number stores the corresponding line data, the line data storage operations are repeated from bank 1. At this time, horizontal line data in their respective banks are stored in the same column addresses so that the horizontal histogram can be easily calculated.

FIG. 7 illustrates the case where n=m=4. Data are supplied to the two-port DRAM 40 in four (4) bits. Banks 1 through 4 receive dot data of the lines 4a+1 through 4a+4, respectively.

For example, when dots of Nos. 9, 10, 11 and 12 in line 4a+1, dots of Nos. 9, 10, 11 and 12 in line 4a+2, dots of Nos. 9, 10, 11 and 12 in line 4a+3, and dots of Nos. 9, 10, 11 and 12 in line 4a+4 are respectively supplied, the respective two-port DRAMs 40 of the same row and column addresses store them. By sequentially repeating the procedure, dots in the direction vertical to the inputted direction are read, parallel data of n by m bits (four (4) by four (4) in FIG. 7) are respectively supplied to a plurality of the parallel-to-serial conversion circuits (P/S) 48 provided externally at the shift clock pulse SAS. The parallel-to-serial conversion circuits (P/S) 48 which in turn output data in m bit units. By counting the number m, where m=4 in this case, the histogram counter 46 obtains a histograms of dot data in the direction vertical to the inputted direction.

The operations of the horizontal histogram calculation is explained, next.

Figure 8:
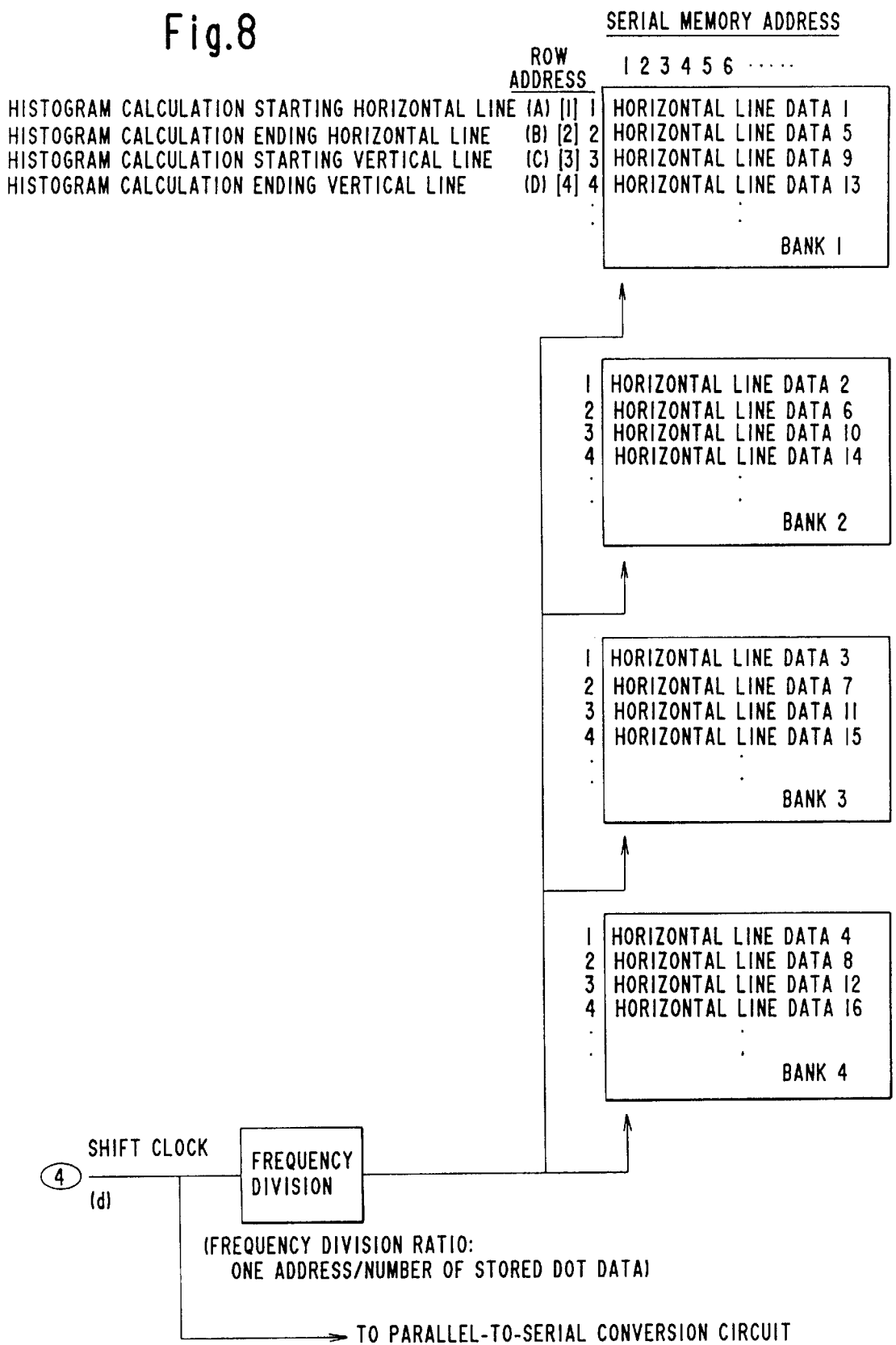
FIG. 8 shows the operations of the horizontal histogram calculation of the row-histogram module and the column-histogram module using the first principle of this invention.

FIG. 8 shows the operations of the horizontal histogram calculation of the row-histogram module 13 and the column-histogram module 14 using the first principle of this invention.

Horizontal histogram calculation patterns are expressed by histogram calculation starting/ending horizontal lines and histogram calculation starting/ending vertical lines.

As shown in FIG. 8, the operating procedures are as follows. First, a target bank and a target address are obtained from the histogram calculation starting horizontal line and the histogram calculation ending horizontal line. Second, the number of a histogram calculation starting vertical line is set as a serial memory address for determining data outputted first from a serial memory after the shift clock pulse SAS is inputted, horizontal line image data are transmitted to the serial memory in the two-port DRAM 40 by inputting a computable address to the target bank, and the serial memory is set to a designated state by inputting the serial memory address.

If the histogram calculation ending vertical line and the histogram calculation starting horizontal line are inputted in this state, target image data are outputted from the serial output terminal of the two-port DRAM 40 and the histogram counter 46 counts the number of black dots (or white dots).

When the difference between the number of the histogram calculation ending horizontal lines and the number of the histogram calculation starting horizontal lines is greater than the number of banks, the above procedures are repeated.

The operations of the vertical histogram calculation is explained, next.

Figure 9:
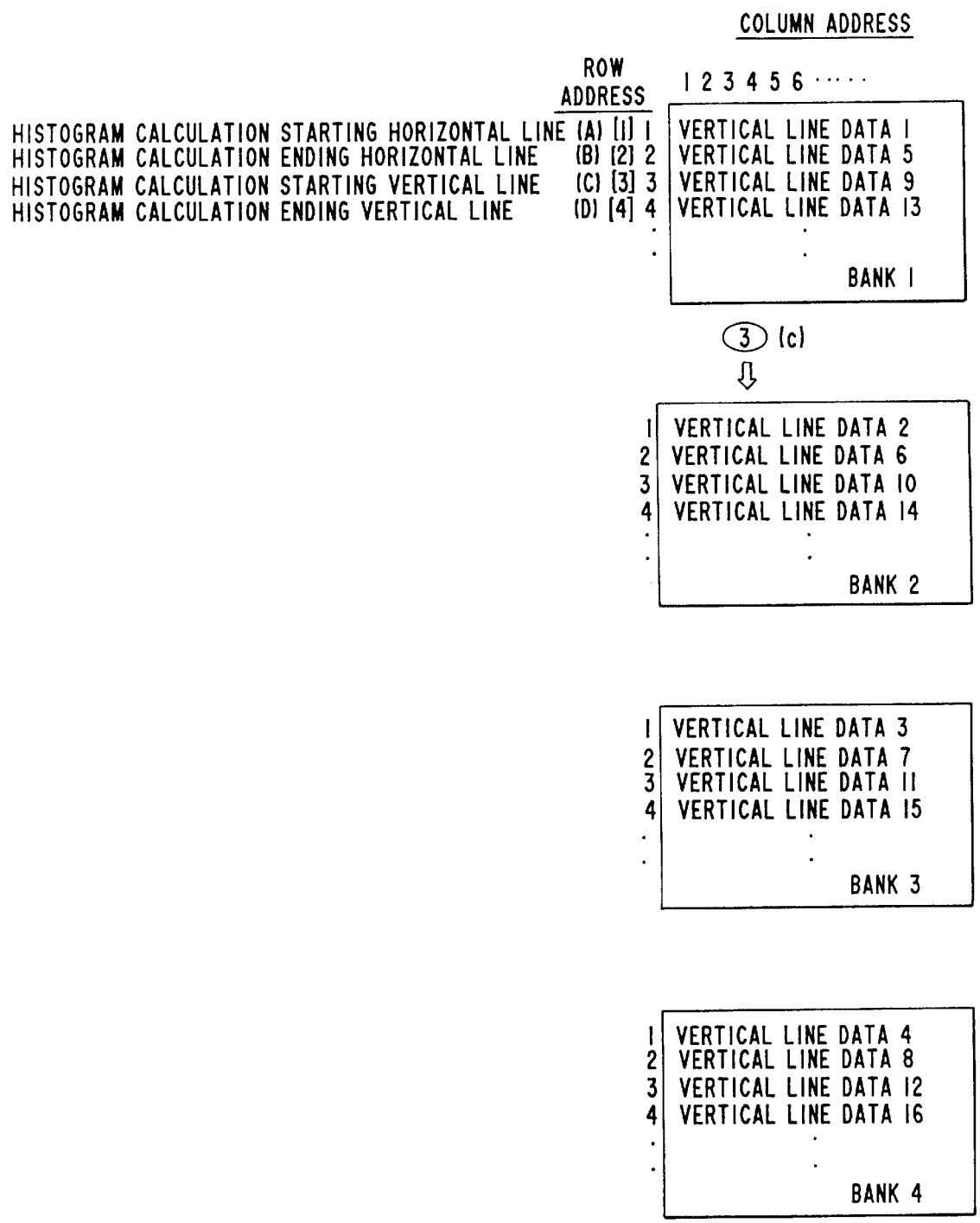
FIG. 9 shows the operations of the vertical histogram calculation of the row-histogram module and the column-histogram module using the first principle of this invention.

FIG. 9 shows the operations of the vertical histogram calculation of the row-histogram module 13 and the column-histogram module 14 using the first principle of this invention.

Vertical histogram calculation patterns are expressed by histogram calculation starting/ending horizontal lines and histogram calculation starting/ending vertical lines.

As shown in FIG. 9, the operating procedures are as follows. First, a target bank and a target address are obtained from the histogram calculation starting horizontal line and the histogram calculation ending horizontal line. Second, by setting the histogram calculation starting horizontal line and the histogram calculation ending horizontal line as addresses common to all banks, a calculation starting row address is inputted to the target bank. Third, upon receiving a common column address, a random board of the two-port DRAM 40 outputs a dot of a horizontal line image, and the histogram counter 46 counts the number of black dots (or white dots).

When the difference between the number of the histogram calculation ending horizontal lines and the number of the histogram calculation starting horizontal lines is greater than the number of address storage bits, the above procedures are repeated.

Since the above operations enable hardware to obtain vertical or horizontal histograms in parallel in one-dot units or in units of a predetermined number of bits, high speed histogram calculations are realized.

Figure 10:
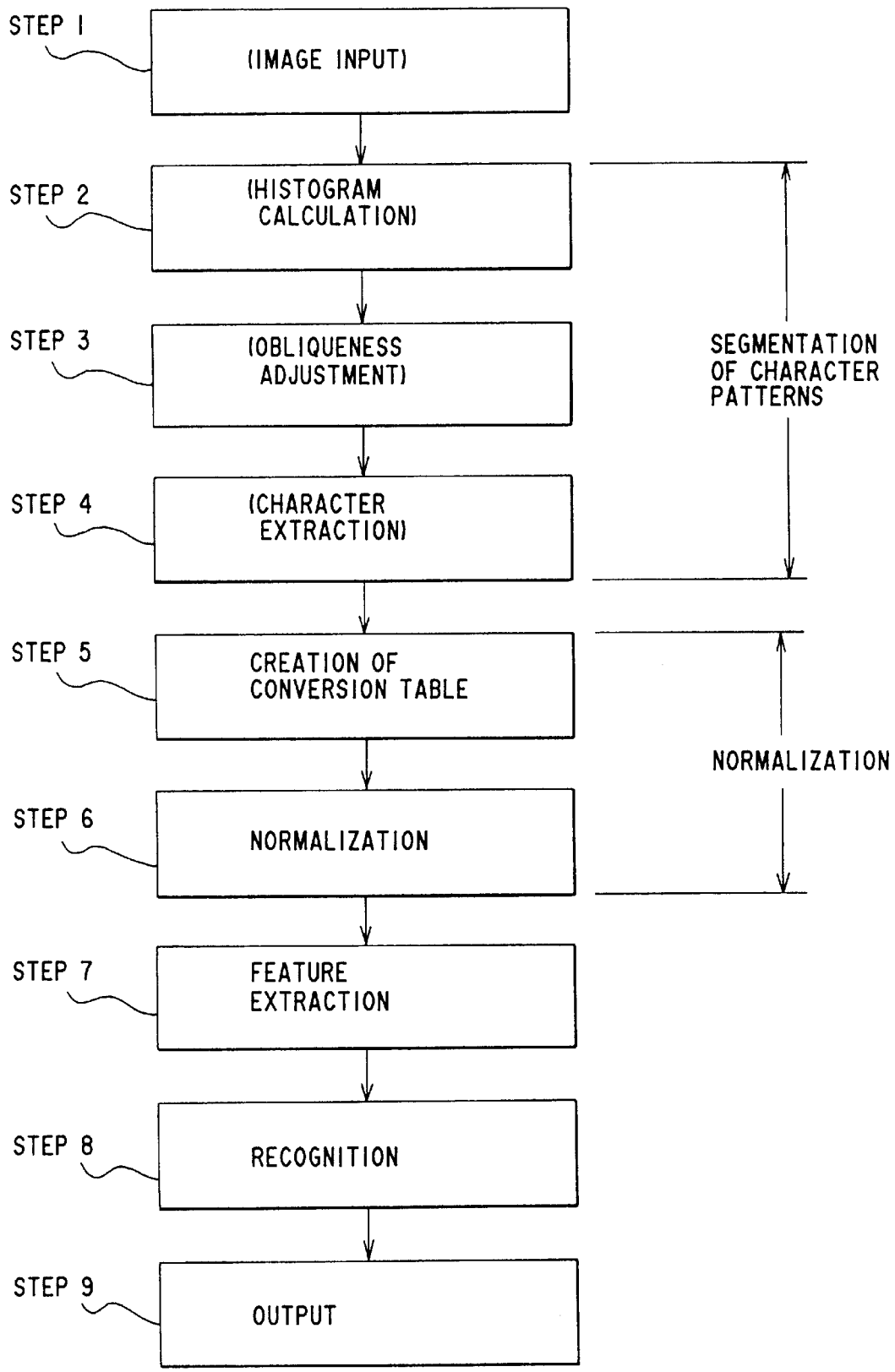
FIG. 10 is a flowchart of the character recognition method in a normalization module using the first principle of this invention.

FIG. 10 is a flowchart of the character recognition method in the normalization module 16 using the first principle of this invention.

(STEP 1: IMAGE INPUT) To recognize a character printed, for example on a form, a document image is read.

(STEP 2: HISTOGRAM CALCULATION) A histogram is calculated for the read page. This histogram calculation comprises addition to obtain the number of dots on a page projected vertically and horizontally. The histograms correspond to respective obliquenesses considered to be within an obliqueness range used for adjusting the obliqueness of the form.

(STEP 3: OBLIQUENESS ADJUSTMENT) The obliquenesses of the form obtained from the histograms are respectively adjusted. Since the histograms correspond to the obliquenesses, the difference between the maximum and minimum of the histogram values is maximized when the form is set at the proper position. That is, the obliqueness of the form is determined from the obliqueness that maximizes the difference between the maximum and minimum of the histogram values among those calculated in correspondence with a plurality of obliquenesses.

(STEP 4: CHARACTER EXTRACTION) The results of adjusting the forms' obliquenesses through histogram calculation are received for finding a character area to be used as a unit for extracting a character.

(STEP 5: CREATION OF CONVERSION TABLE) Although a document (form) is read as image inputs in page units in the embodiments of this invention, the above steps segment the image inputs into areas in character units, so that a character for which a conversion table is created is normalized. The conversion table is used for normalizing the extracted characters to a predetermined size by magnifying or contracting them in both directions in one-dot units.

(STEP 6: NORMALIZATION) All the extracted characters, of M by M dots, in the read document are normalized, to D by D dots.

(STEP 7: FEATURE EXTRACTION) Features of respective inputted characters are extracted, and the distances (i.e. differences) between their features and those of the characters registered in the association dictionary are calculated.

(STEP 8: RECOGNITION) The characters registered in the association dictionary with the least differences are recognized.

(STEP 9: OUTPUT) The code of the recognized character is outputted as the result.

Whereas the pre-treatments in steps 2 through 6 for recognition are all done in one-dot units, which require a huge amount of processing, a systolic array is used for expediting the processings, as follows.

First, a normalization algorithm is explained. Second, a systolic array for realizing the normalization algorithm is explained. Unless otherwise noted, inputted images comprise M by M dots, have two-value images and are to be normalized to a size of D by D dots.

Algorithm for Creating a Conversion Function for Normalization

A normalization is a processing for absorbing the effect of differences in sizes and positions of the character areas of the inputted images by magnifying or contracting the originally inputted images to a predetermined size.

The simplest normalization, called linear normalization, linearly magnifies or contracts the sizes of inputted images to a predetermined size.

Any other normalizations, i.e. non-linear normalizations, obtain line densities (the numbers of white elements inverted to black picture elements) $f(i)$ and $g(j)$ of the inputted image in row and column directions. Conversion functions $F(i)$ and $G(j)$ for mapping are defined as follows.

$$F(i) = \text{SIGMA}(i' = i_s - 1 \text{ through } i)[f(i')*b+1] \quad (i \geq i_s) \quad (1)$$
$$0 \quad (i < i_s)$$
$$G(j) = \text{SIGMA}(j' = j_s - 1 \text{ through } j)[f(j')*b+1] \quad (j \geq j_s) \quad (2)$$
$$0 \quad (j < j_s)$$

where $i_s$ and $j_s$ respectively represent the uppermost row and the leftmost column in an area where black picture elements exists, and b which usually is 1 represents a positive weight coefficient for deciding the degree of non-linearity.

That is, in a magnification of a non-linear normalization, the dots in the columns with fewer inversions from white picture elements to black picture elements are magnified in the row direction by smaller magnification rates, and the dots in the columns with more inversions from white picture elements to black picture elements are magnified in the row direction by larger magnification rates. Likewise, the dots in the rows with fewer inversions from white picture elements to black picture elements are magnified in the column direction by smaller magnification rates, and the dots in the rows with more inversions from white picture elements to black picture elements are magnified in the column direction by larger magnification rates.

Thus, in a magnification of a non-linear normalization, when lines exist which are long in the horizontal or vertical direction, they are not widened and dots in other graphics are magnified more than by a linear normalization.

Non-linear normalization is effective for all the embodiments of this invention, in which lines of the character to be recognized are narrowed.

Figure 11:
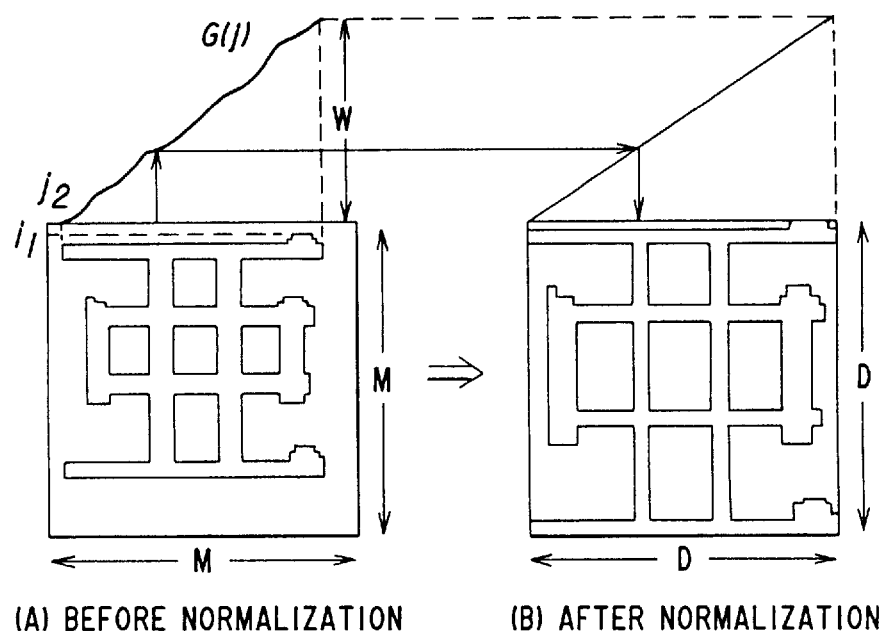
FIGS. 11A and 11B show an example for a non-linear normalization in the normalization module using the first principle of this invention.

FIGS. 11A and 11B show an example of a non-linear normalization in the normalization module 16 using the first principle of this invention. More specifically, FIG. 11A shows a character before a non-linear normalization and FIG. 11B shows a character after the non-linear normalization.

First, a normalization in the column direction is explained by referring to FIGS. 11A ad 11B. In case of a magnification, column j' in FIG. 11A is made to correspond with columns $G(j')*D/W$ through $G(j'+1)*D/W-1$ in FIG. 11B. In case of a contraction, column j in FIG. 11B is made to correspond with a plurality of consecutive columns in FIG. 11A determined by $G^{-1}$ ("$j*W/D$"), where a variable sectioned in quotation marks (" ") is rounded up and W is the maximum of $G(j)$ in an area where a black picture element exists.

Second, a normalization in the row direction is similarly performed by using $F(j)$ and H, where H is the maximum of $F(j)$ in an area where a black picture element exists. These non-linear normalizations are effective for recognizing hand-written Chinese characters.

Meanwhile, linear normalizations are equivalent to cases where b=0 in equations (1) and (2). All the normalizations below are performed by the mapping of these conversion functions.

FIG. 12 illustrates creations of conversion functions in the normalization module 16 using the first principle of this invention.

FIG. 13 shows a loop program for a normalization by the normalization module 16 using the first principle in this invention.

These conversion functions $F(i)$ and $G(j)$ are obtained by the double-loop program shown in FIG. 12, where r_den [i] and c_den[j] respectively correspond with $f(i)$ and $g(j)$; r_acc[i] and r_acc[j] are respectively equivalent to $F(i)$ and $G(j)$; and img[i][j] represents the value of the picture element at row i and column j of the inputted image, which is 1 for a black picture element and 0 for a white picture element; as well as H=r_max[M] and W=c_max[M].

Algorithm for Normalization (Mapping by Conversion Function)

Figure 14:
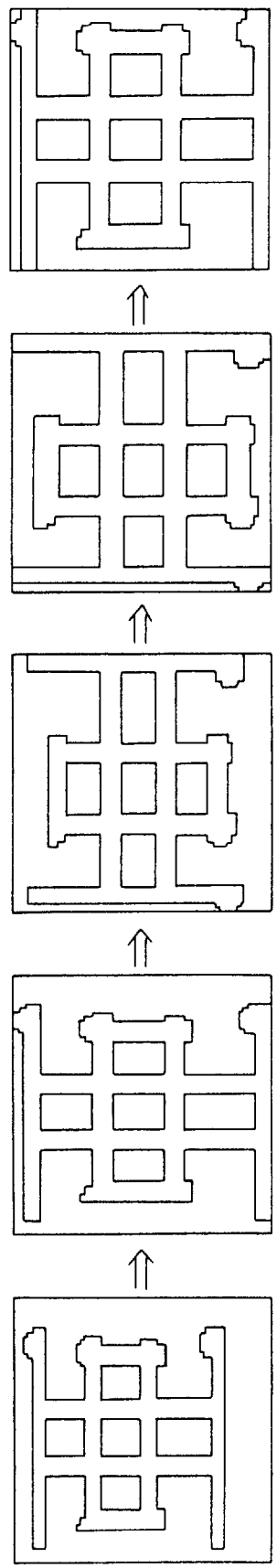
FIG. 14 shows an example of converted data at various stages of a normalization by the normalization module using the first principle of this invention.

FIG. 14 shows an example of converted data at various stages of a normalization by the normalization module 16 using the first principle of this invention.

A conversion function realizes a normalization in a procedure of "normalization in the row direction→horizontal conversion→normalization in the column direction→transposition", as shown in FIG. 14. Although a transposition is not described in detail, it is realized by a memory element circuit having an exclusive two-input/output port.

A normalization in the row direction is performed per the following algorithm.

$$\text{for } i=1 \text{ to } M \ [o\_img[i]=i\_img["G^{-1}(j*w/D")];] \qquad (3)$$

where i_img[i], o_img[i] and D respectively indicate row i of the inputted image, row i of the image after a normalization and character dimensions after the normalization.

Generally, it is hard to convert a loop program like $$\text{for } i=1 \text{ to } N \ [a(i)=b[h(i);] \qquad (4)$$

whose right-side variable is written in the form of a function, to a systolic algorithm. Thus, equation (4) is redundantly rewritten into the following double loop program.

$$\text{for } i=1 \text{ to } N \ [\text{for } t=M_1 \text{ to } M_2 \ [a(i)=\text{if } t==h(i) \text{ then } b(t) \\ \text{else } a(i);]] \qquad (5)$$

where h(i) takes only an integer between $M_1$ and $M_2$. It is easily understood that equations (4) and (5) are the same. By performing such a conversion, a systolic array realizing equation (4) is obtained.

A loop program shown in FIG. 13 is obtained by applying this conversion to equation (3) and rewriting the condition with the conversion function F(i), where it is expressed as an array F[i].

Normalizing Systolic Array

Figure 15:
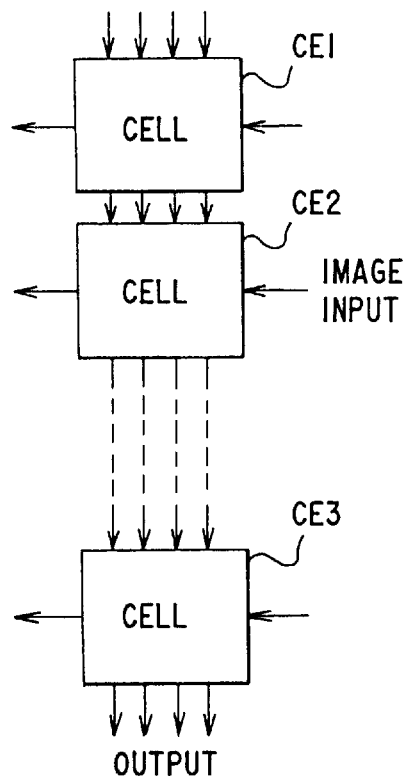
FIG. 15 shows a schematic view of an array in the normalization module using the first principle of this invention.

FIG. 15 shows a schematic view of an array in the normalization module 16 using the first principle of this invention.

Figure 16:
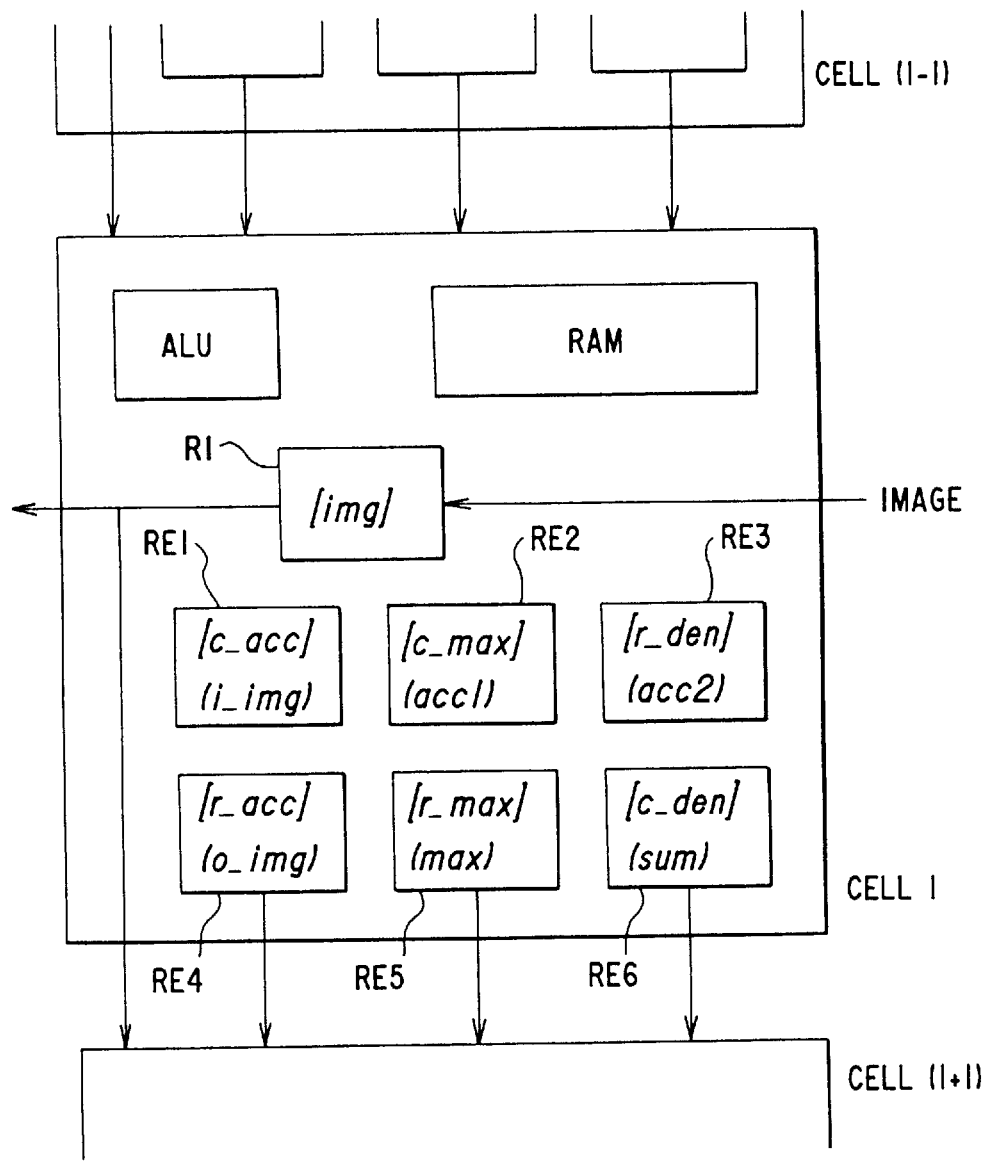
FIG. 16 shows a configuration of a cell in the normalization module using the first principle of this invention.

FIG. 16 shows a configuration of a cell in the normalization module 16 using the first principle of this invention.

By creating conversion functions from the normalizing loop programs shown in FIGS. 12 and 13, a uni-dimensional systolic array comprising M pieces of cells for normalization is configured as shown in FIG. 15.

A cell has a function of adding and comparing the register values and comprises a logical operation circuit ALU, six (6) registers RE1 through RE6 for storing computed values, one (1) register RI for inputting image data, and a memory circuit RAM for describing a cell function. Among them, four (4) registers RE4, RE5, RE6 and RI are capable of sending a value to a neighboring cell. Names of values memorized in registers at a creation of a conversion function and at a normalization are respectively put in parentheses [ ] and ( ) for describing cell functions.

The memory circuit RAM stores a microprogram for describing a cell function beforehand. Each cell updates the values of respective registers RE1 through RE6 and RI.

Next, inputting data into this systolic array and a cell function of CELL(i) are explained, where the input from the register of CELL(i−1) is expressed as r(−1) and the operation starting time is set as t=1.

Creation of a Conversion Function by a Systolic Array

Figure 17:
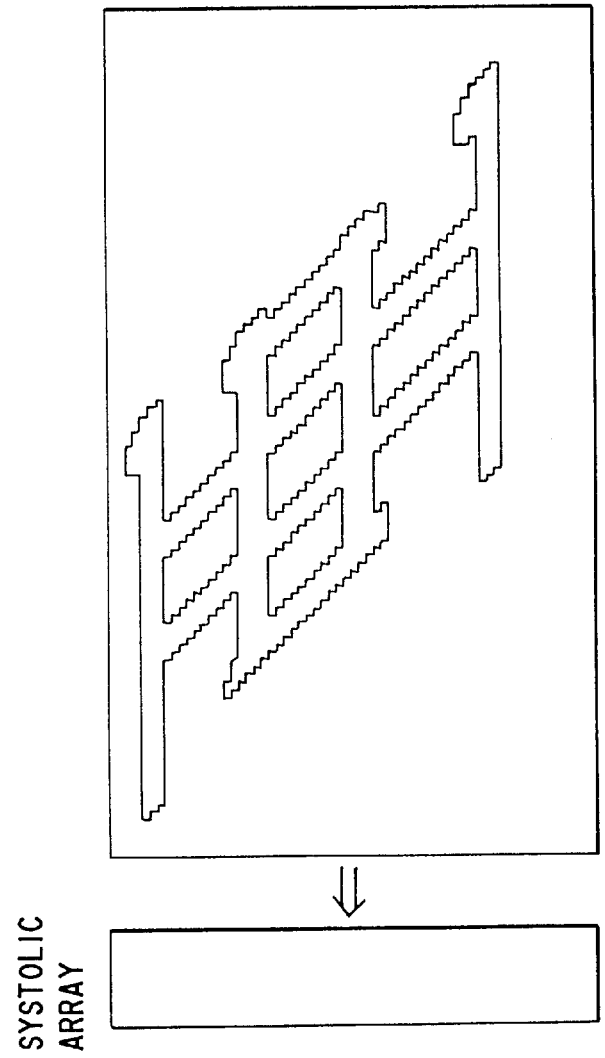
FIG. 17 shows an input sequence of shifted data in the normalization module using the first principle of this invention.

FIG. 17 shows an input sequence of shifted data in the normalization module 16 using the first principle of this invention.

The values of registers RE1 through RE6 and RI are all set to 0 in a cell initialization. When data is inputted, the picture element of row i and column (t−i+1) of the inputted image is inputted to CELL(i) at time t. As a result, data shifted by a row are inputted as shown in FIG. 17.

CELL(i) obtains the following values from the loop program shown in FIG. 12 and stores them in respective registers RE1 through RE6 and RI.

```
r_den=if img==0 and input==1
          then r_den+1
       else r_den;
r_acc=if r_den==0 and r_acc(−1)
          ==0 then 0
       else r_den*b+r_acc(−1)+1;
r_max=if r_den==0 then r_max(−1)
       else r_acc;
c_den=if img(−1)==0 and input==1
          then c_den(−1)+1
       else c_den(−1);
c_acc=if c_den==0 and c_acc==0 then 0
       else c_den*b+c_*acc+1;
c_max=if c_den==0 then c_max
       else c_acc;
img=input;
where CELL(1) operates as
r_acc(−1)=r_max(−1)=c_den(−1)=0
``` because there is no neighboring cell and data is not inputted. The value of b is ordinarily 1 (for a non-linear normalization) or 0 (for a linear normalization). Such multiplications as a doubling and a quadrupling can be realized by shifting data without using an adder.

When data is outputted, the creation of a conversion function is completed at clock 2M, and the value of row i of a conversion function in the row direction is stored in register r_acc of CELL(i). The value of the column j of a conversion function in the column direction is outputted from register c_acc of CELL(M) at time t=M+j. In addition, the maximum values H and W in the row and column directions become register values r_max and c_max of CELL(M) at an operation completion time (at time t=2M).

Operation at a Normalization

At a cell initialization, the value of register RE1 i_img stores all data (of M bits) for row i of the inputted image through a register RI for inputting image data (or directly) and sets the values of registers RE2 and RE3 to the values of D*F(i−1) and D*F(i), respectively. However, at a normalization in the column direction, the column direction conversion function G(j) is used instead of F(i).

The following functions are determined as the cell functions from the loop program shown in FIG. 13.

```
max=max(−1);
sum=if max==0 then 0
      else sum+max;
```

-continued

```
o_img=if acc1<sum and sum≤acc2
    then i_img
    else o_img(-1);
However, CELL(1) is set as
o_img(-1)=0, max(-1)=r_max
``` where r_max is the maximum in the row direction obtained at the creation of the conversion function. At a normalization in the column direction, the maximum in the column direction c_max is obtained.

When data are outputted, a normalization is completed at clock M+D, and row i of the image after the normalization is outputted from the value o_img of register RE4 of CELL(M) at t=M+i. If the value i_img of the register RI cannot be anything but of N bits (where N<M), normalizations are performed by N columns. Values acc1 and acc2 of registers RE2 and RE3 can be computed without using a multiplier by substituting "+1" with "+D" by the cell functions at the creation of the conversion function.

Whereas a non-linear normalization by a systolic array is explained above, various normalizations are further explained below.

By changing data in the registers by using a systolic array for a normalization, various normalizations considered to be useful in character recognition are realized. Although a changing method in the row direction is explained below, a changing method in the column direction is realized in an essentially similar manner. Also, the changing methods in the row and column directions can be mixed.

Below, value acc2 stored in register RE3 in CELL(i) and value acc1 stored in register RE2 in CELL(i+1) are set as F(i)*size+pos, and the value substituted into register RE5 in CELL(1) is described as max. Various normalizations are realized by how concretely size, pos and max are provided. In an ordinary normalization, size=D, pos=0, and max=r_max.

When an object of a character recognition is set as a printed character of a word processor in a designated size normalization, there are various points to be chosen. Although there is a method of normalizing characters of all the different fonts into the same size for recognition, since characters of different points have different fonts and they need to be recognized separately, it is better to be able to freely vary the size after a normalization rather than to fix it at D by D dots.

When such normalizations are performed, since the image after the normalization does not occupy the entire area of D by D dots, a blank area arises. Therefore, it is convenient if a character area can be placed in a designated area.

To enable a normalization to make the size d, size=d and max=r_max are satisfied. The values of pos differ according to the arranged position, and

```
           0              (placed upward)
pos=   (D-d)*r_max/2      (placed centrally)
       (D-d)*r_max        (placed downward)
```

When an adder is not employed, d is limited to an integer exponent of two (2).

If vertically long or horizontally long characters such as "1" or "-" are normalized in an ordinary manner with the same ratios in both vertical and horizontal directions, since the clock picture element area extends to the entirety frame of D by D dots, information of the original form is lost. At such a time, it is desirable to normalize a character in the vertical and horizontal directions with the same ratios.

If an inputted image is vertically long, the normalization in the row direction is ordinary. If it is horizontally long (c_max>r_max), for normalizing in both directions with the same ratios,

```
size=D
    max=c_max
        0                     (placed upward)
        pos=D*(c_max-r_max)/2 (placed centrally)
        D*(c_max-r_max)       (placed downward)
```

This idea can be combined with a designated size normalization, and a normalization to fit a character into a frame of d by d dots with the same ratio vertically and horizontally becomes possible.

When a recognition is performed by a pattern matching method in a position normalization, a magnification, a contraction or a transformation is not performed and a normalization is only necessary for adjusting a position. For performing such a normalization,

```
size = 1
    max = 1
        0                    (placed upward)
        pos = (D-r_max)/2    (placed centrally)
        (D)-r=max)           (placed downward)
```

Figure 18:
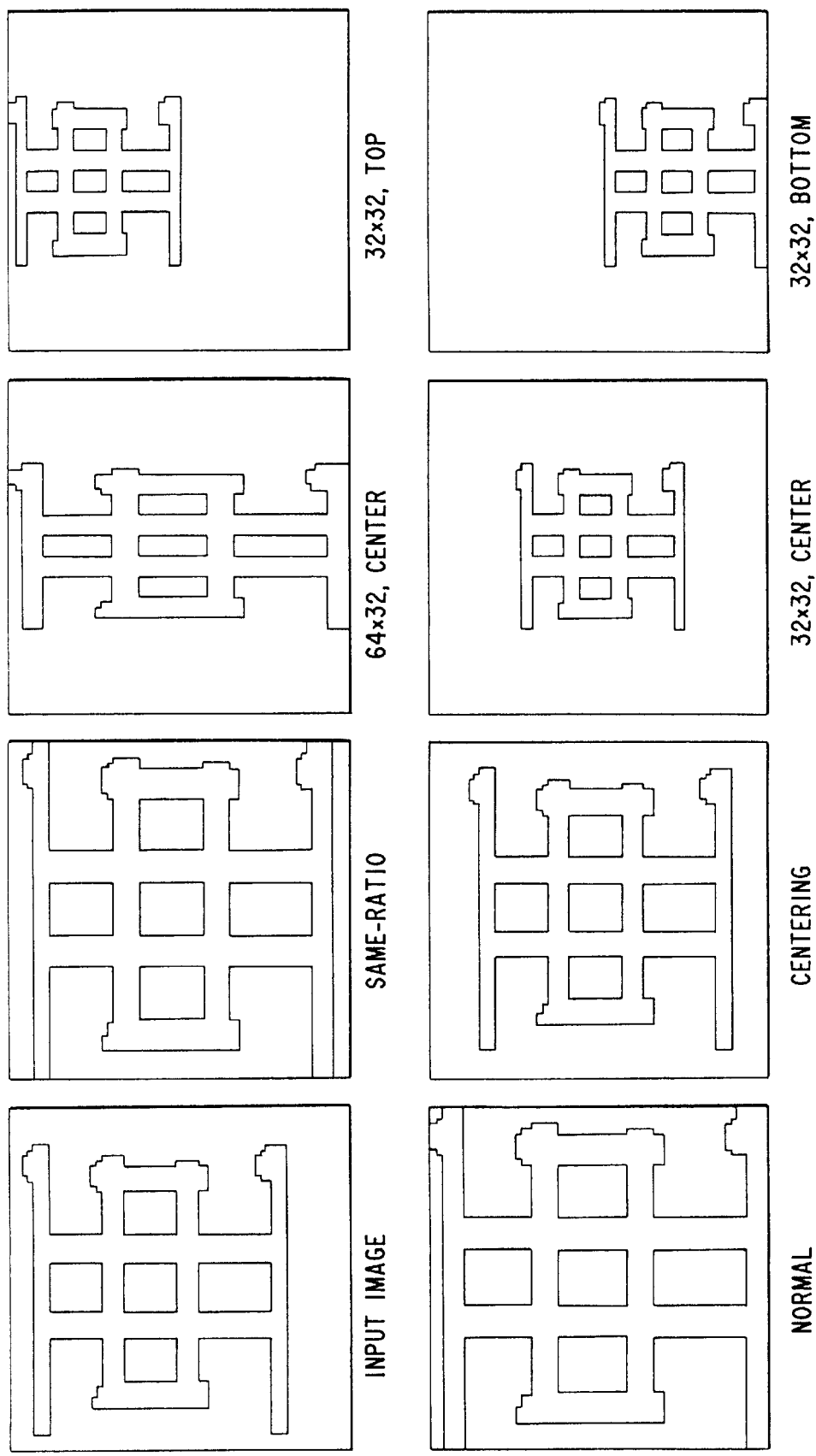
FIG. 18 shows various examples of normalizations of the same character in the normalization module using the first principle of this invention.

FIG. 18 shows various examples of normalizations of the same character in the normalization module 16 using the first principle of this invention. More specifically, FIG. 18 shows an example of an actual performance of the above three (3) kinds of normalizations with the systolic array shown in FIG. 16.

Whereas normalizations using embodiments of this invention are explained in detail above, application of embodiments of this invention to character extraction is explained below.

A systolic array for a normalization is applied to an obliqueness adjustment and to a histogram calculation of black picture elements necessary for a character extraction, where data handled is assumed to be two-value images of M by N dots. N is equivalent to the horizontal length of inputted image data.

Histogram Calculation

FIG. 19 shows an algorithm for a histogram calculation in the normalization module 16 using the first principle of this invention.

A histogram is calculated by an algorithm, which is described by the loop program shown in FIG. 19. This program is similar to those used in creating conversion functions for normalizations. Cell functions are realized without changing the data inputting method, as follows.

```
r_den=if input==1 then r_den+1
    else r_den;
c_den=if input==1 then c_den(-1)+1
    else c_den(-1);
```

Although no other registers are used unless anything but a histogram is calculated, if register RE4 with value r_acc and register RE1 with value c_acc are used and cell functions are defined as

```
r_acc=r_den+r_acc(-1);
c_acc=c_den+c_acc;
``` it becomes possible to obtain the accumulation value of a histogram in the row and column directions and the number of black picture elements in the entire image. Some algorithms for extracting characters are thought to use these values.

Obliqueness Adjustment

Figure 20:
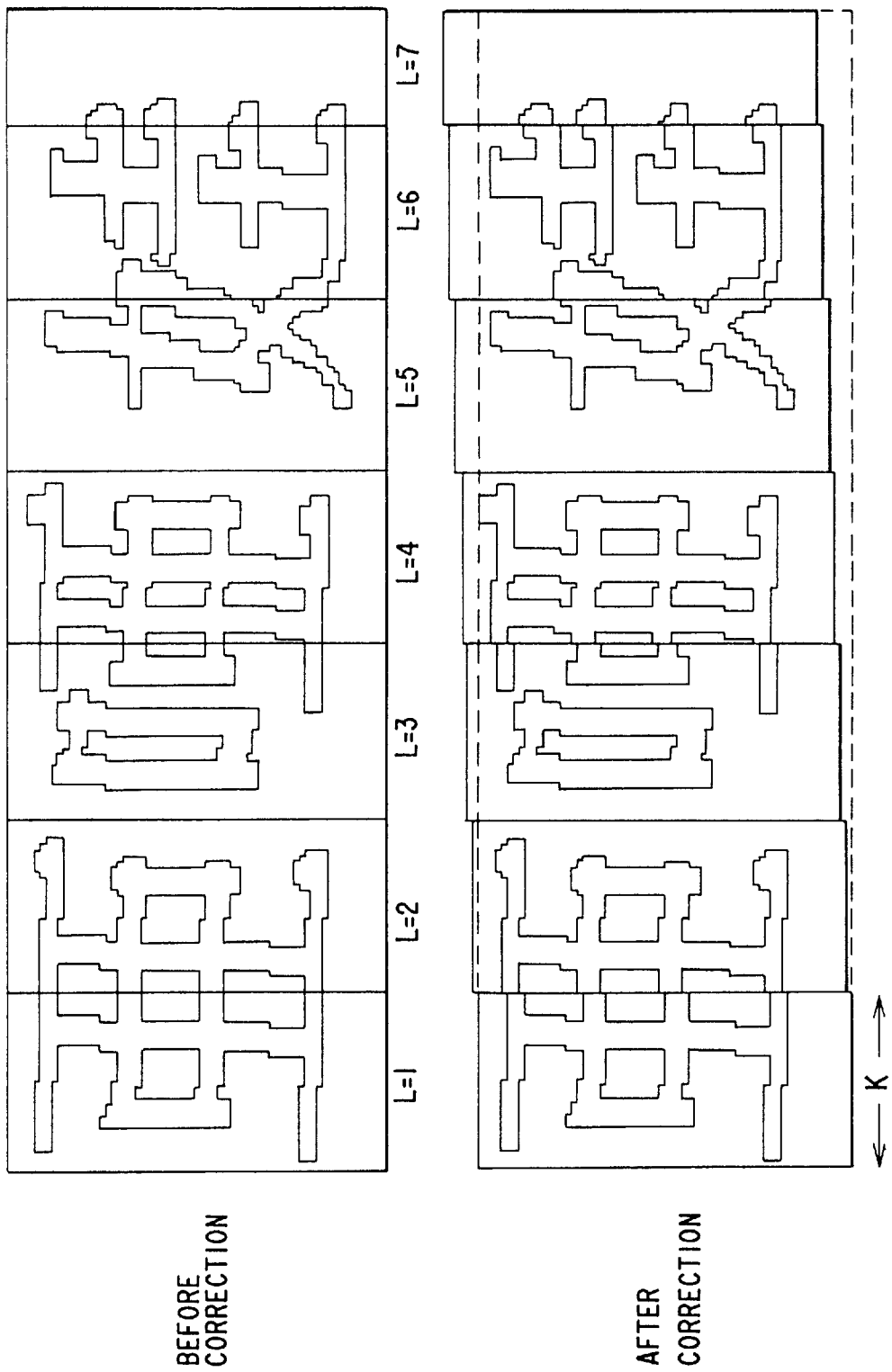
FIG. 20 shows adjustments of obliquenesses in the normalization module using the first principle of this invention.

FIG. 20 shows adjustments of obliquenesses in the normalization module 16 using the first principle of this invention.

As shown in FIG. 20, for obliqueness adjustment, an inputted image is divided into blocks every K rows and the "L"-th block is shifted up or down by L−1 rows. Here, obliqueness is assumed to be small and K is a value for adjusting the obliqueness by shifting blocks as described above and is a constant obtained from the obliqueness of the inputted image. These obliqueness adjustments are considered as position normalizations for respective blocks. The operations for handling "L"-th block are as follows.

In a cell initialization, register RE1 with value i_img stores data (of K bits) of row i of the inputted image. Data are not inputted.

CELL(i) has the following cell functions.

```
max = max(-1);
o_img = if max==i then i_img
        else o_img(-1);
```

However, at CELL(1)

```
o_img(-1)=0;
   max(-1)=t+L-1 (shifted upward)
         t-L+1 (shifted downward)
``` where t and L represent time and block number, respectively.

In outputting data, operations by respective blocks terminate at clock 2M and the row i of the image after conversion is outputted from register RE4 having value o_img in CELL(M) at time t=M+i.

Whereas the embodiments of this invention are explained in conversion function creation, normalization, histogram calculation and obliqueness adjustment, their processors can be similarly configured. Furthermore, since an arithmetic/logic unit ALU for comparison and addition can be used in a processor composing a cell, such a processor can be configured with LSI's with far fewer elements than conventional processors. Also, mere program changes enable various processings.

More detailed explanations of the principle of the conversion table creation module 17 and its circuit follow.

Figure 21:
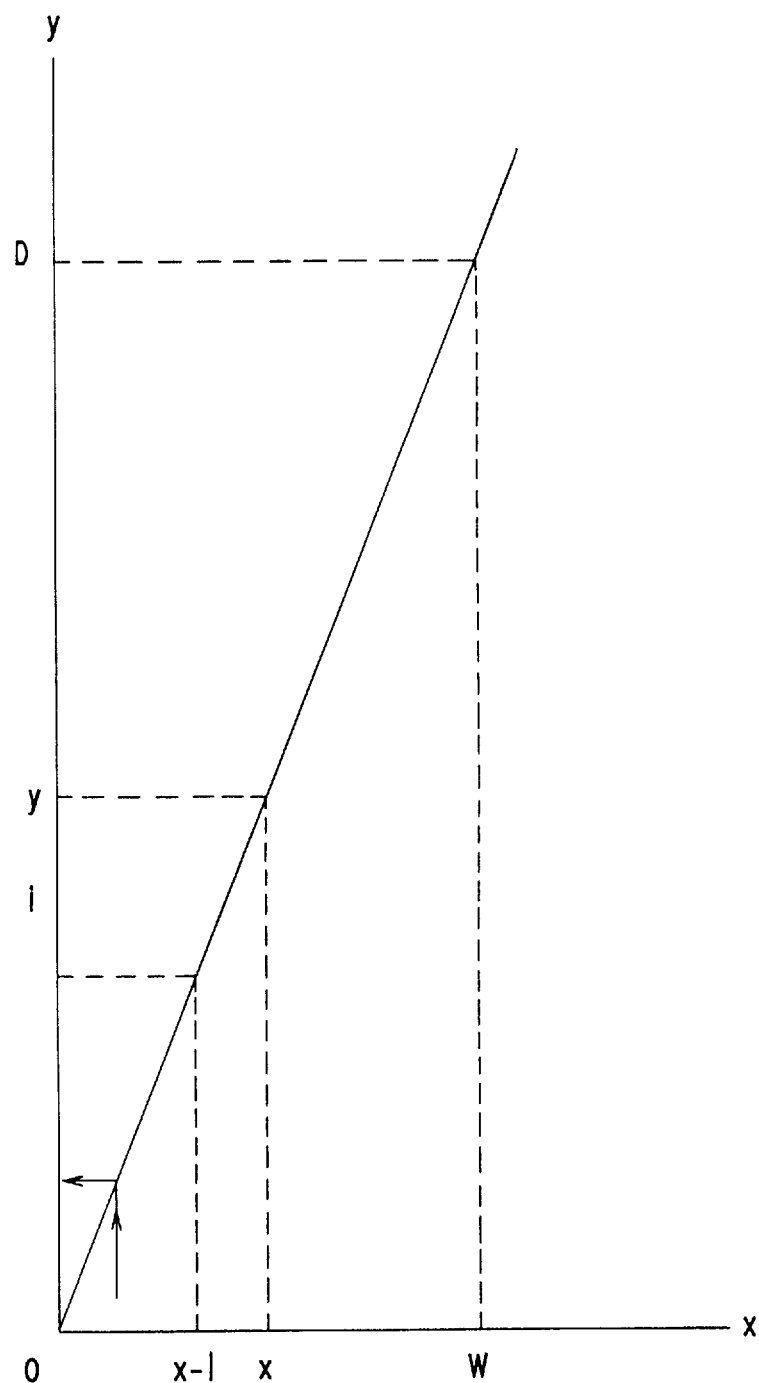
FIG. 21 explains the principle of magnification by the row-histogram module and the column-histogram module using the second principle of this invention, which utilizes a systolic array.

FIG. 21 explains the principle of magnification by the row-histogram module 13 and the column-histogram module 14 using the second principle of this invention, which utilizes a systolic array.

When the normalization module 16 in FIG. 2 performs a magnification or a contraction, a size of a character extracted by a read control module 15 in a character area needs to be obtained. This is because characters must be made the same size to ensure a good recognition rate in the recognition processings shown in the embodiments of this invention.

FIG. 21 explains the principle for magnification, in which a processing is performed to change the area $0 \leq X \leq W$ on the X axis to the area $0 \leq Y \leq D$ on the Y axis.

After the magnification principle is explained, circuit operations of the conversion table creation module 17 and normalizations are explained in detail.

When X and Y are any real numbers, X on the X axis corresponding to Y on the Y axis are expressed as $$X=W*Y/D.$$

Thus, coordinate X on an original graphic corresponding to coordinate I on a magnified graphic satisfies $$X-1<W*I/D \leq X \quad (6)$$

where I is an integer being $1 \leq I \leq D$ and X is an integer. By transforming equation (6), $$D(X-1)<W*I \leq DX \quad (7)$$

is obtained. Consequently, by substituting coordinate I for the coordinate X, a magnified graphic transformed to width D is obtained.

Because inputted image data are thus normalized, character width W of the inputted graphic must be determined and histograms in horizontal and vertical directions are created, that is a conversion table is created.

If the column histogram is linear, it is obtained by assigning 1 to the value of the column to which the leftmost point contained in the character area on the image data belongs and by sequentially incrementing the values of the columns to the right by 1. Similarly, if the row histogram is linear, it is obtained by assigning 1 to the value of the row to which the uppermost point contained in the character area on the image data belongs and by sequentially incrementing the values of the rows below by 1. The conversion table creation module 17 determines the width W of this character and the head ends of the column and the row.

Figure 22:
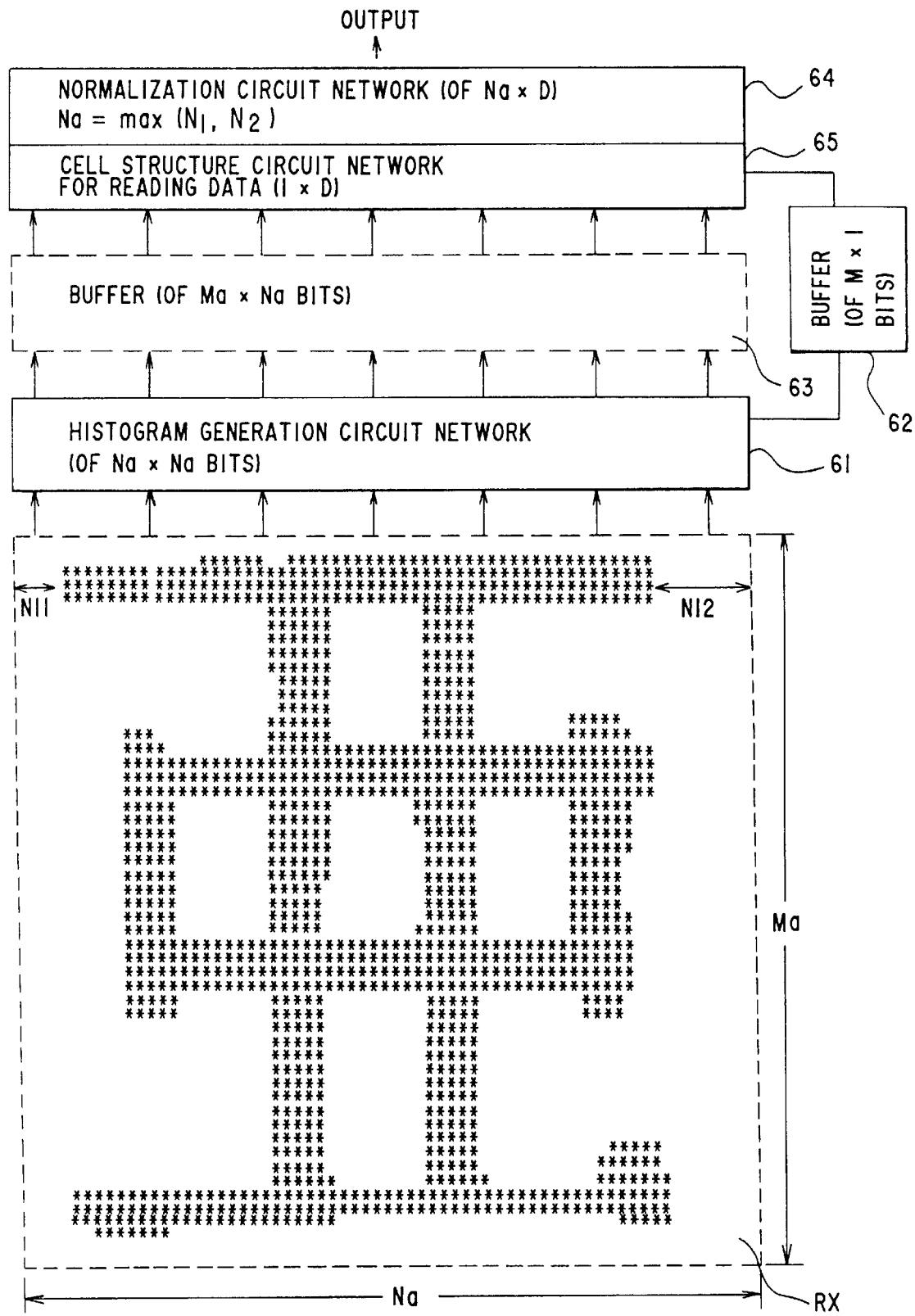
FIG. 22 shows the configurations of the row-histogram module and the column-histogram module using the second principle of this invention, which utilizes a systolic array.

FIG. 22 shows the configurations of the row-histogram module 13 and the column-histogram module 14 using the second principle of this invention, which utilizes a systolic array.

Figure 23:
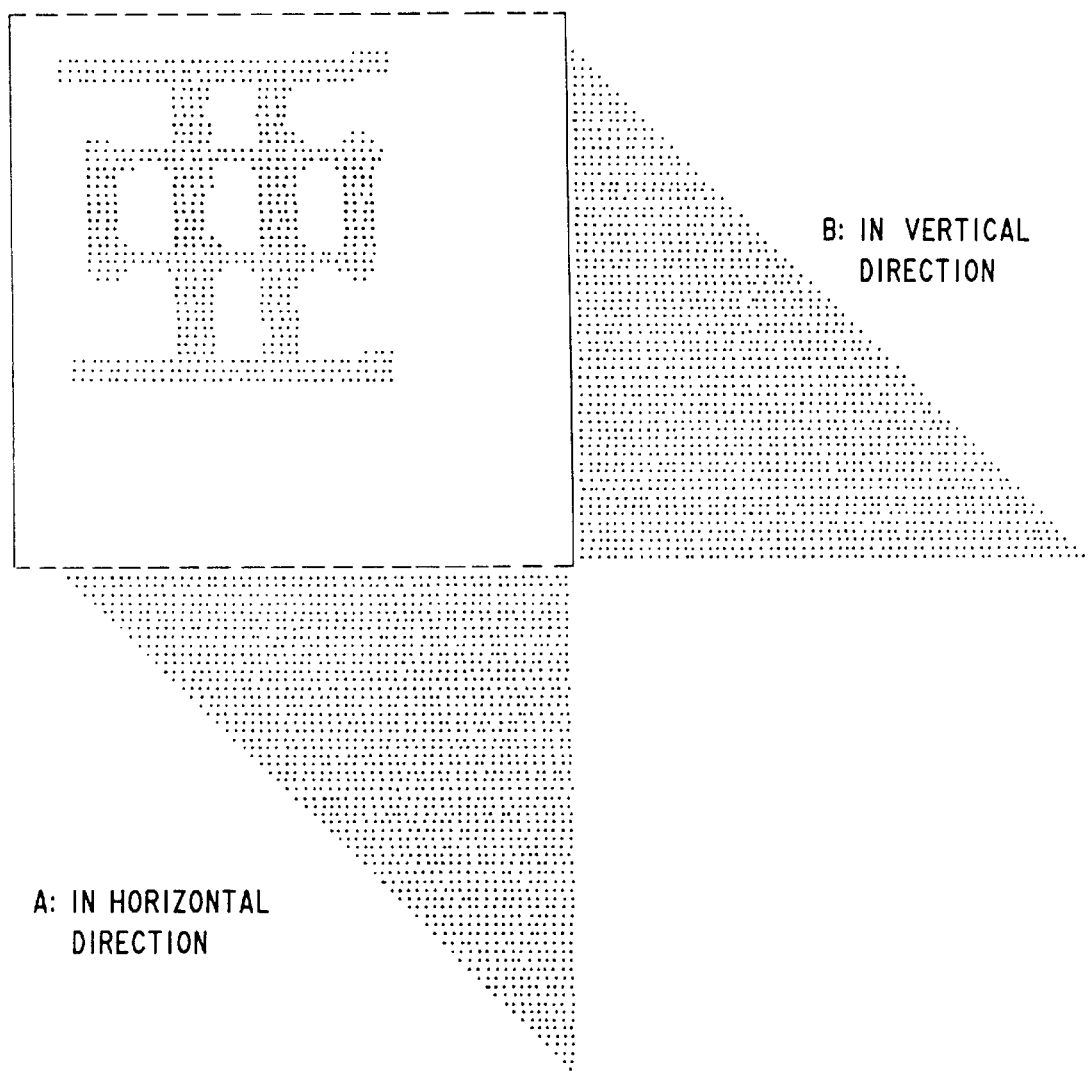
FIG. 23 shows exemplary histograms in the vertical and horizontal directions of the row-histogram module and the column-histogram module using the second principle of this invention, which utilizes a systolic array.

FIG. 23 shows exemplary histograms in the vertical and horizontal directions of the row-histogram module 13 and the column-histogram module 14 using the second principle of this invention, which utilizes a systolic array.

An image RX extracted by the read control part 15 (Refer to FIG. 2A.) is inputted into a histogram generation circuit network (of NA*NA bits) 61 which is for obtaining histograms of the vertical and horizontal directions and the width of the inputted character shown in FIG. 23. The histograms in the vertical direction are stored in a buffer (of MA*1 bits) 62 as values in a row unit. The histograms in the horizontal direction are directly supplied to a normalization circuit network (of nA*D bits) 64 from the histogram generation circuit network (of NA*NA bits) 61.

The histogram generation circuit network (of NA*NA bits) 61 has a systolic array structure of NA*NA bits, and image data passing through the histogram generation circuit network (of NA*NA bits) 61 are stored in a buffer (of NA*NA bits) 63. That is, the image RX is finally stored in the buffer (of MA*NA bits) 63. In FIG. 2A, since the output from the read control module is supplied directly to the normalization module 16, the buffer (of MA*NA bits) 63 is not required in this case or could be provided in the normalization module 16.

The histograms in the vertical and horizontal directions obtained by the histogram generation circuit network (of NA*NA bits) 61 are supplied to and control the operations of the normalization module 16. The normalization circuit network (of nA*D bits) 64 is for a normalization in the horizontal direction (in column units). A normalization in the vertical direction (in row units) is performed by reading data in dot-row units by a cell structure circuit network (of 1*D bits) 65 for reading data from the buffer (of MA*NA bits) 63. That is, the cell structure circuit network (of 1*D bits) 65 for reading data performs necessary computations for normalization in the horizontal direction by contemporaneously performing normalization in the vertical direction, and outputs the values and inputted data to the normalization circuit network (of nA*D bits) 64.

The cell structure circuit network (of 1*D bits) 65 for reading data is for a normalization in the vertical direction and reads a row corresponding to row t of the graphic after being normalized at time t, where t=1 is defined as the time whereat the normalization circuit network (of nA*D bits) 64 and the cell structure circuit network (of 1*D bits) 65 for reading data start to operate. The cell structure circuit network (of 1*D bits) 65 for reading data reads row i' of the inputted image at time t so that $$D*h2(i'-1) < tL \leq D*h2(i') \tag{8}$$

is satisfied. In other words, if the cell structure circuit network 65 for reading data reads the inputted image and the histogram in the vertical direction (direction of sequentially reading rows), until the histogram values satisfy equation (8), a normalization in the vertical direction is performed. Thus, a cell can perform a processing such that while (tL>D*h2(i') && i'<M) read data && histogram;
When a normalization in the horizontal direction is performed, a processing satisfying equation (7) is performed. The cell having the value of the histogram in the horizontal direction and column J for calling in the horizontal character width W computes D*h1(j−1), jW and D*h1(j) and performs conversion such that if $D*h1(j') < jW$ then $j \rightarrow j-1$ and if $jW \leq D*h1(j'-1)$ then $j \rightarrow j+1$ where j is a column of the normalized graphic and j' is a column of the inputted graphic.

These operations of the normalization circuit network (of na*D bits) 64 and the cell structure circuit network (of 1*D bits) 65 for reading data normalize the inputted image in the horizontal and vertical directions, thus producing a normalized graphic of D*D bits.

The histograms of the inputted character is required for the above normalization. The histogram generation is explained further in detail below.

Figure 24:
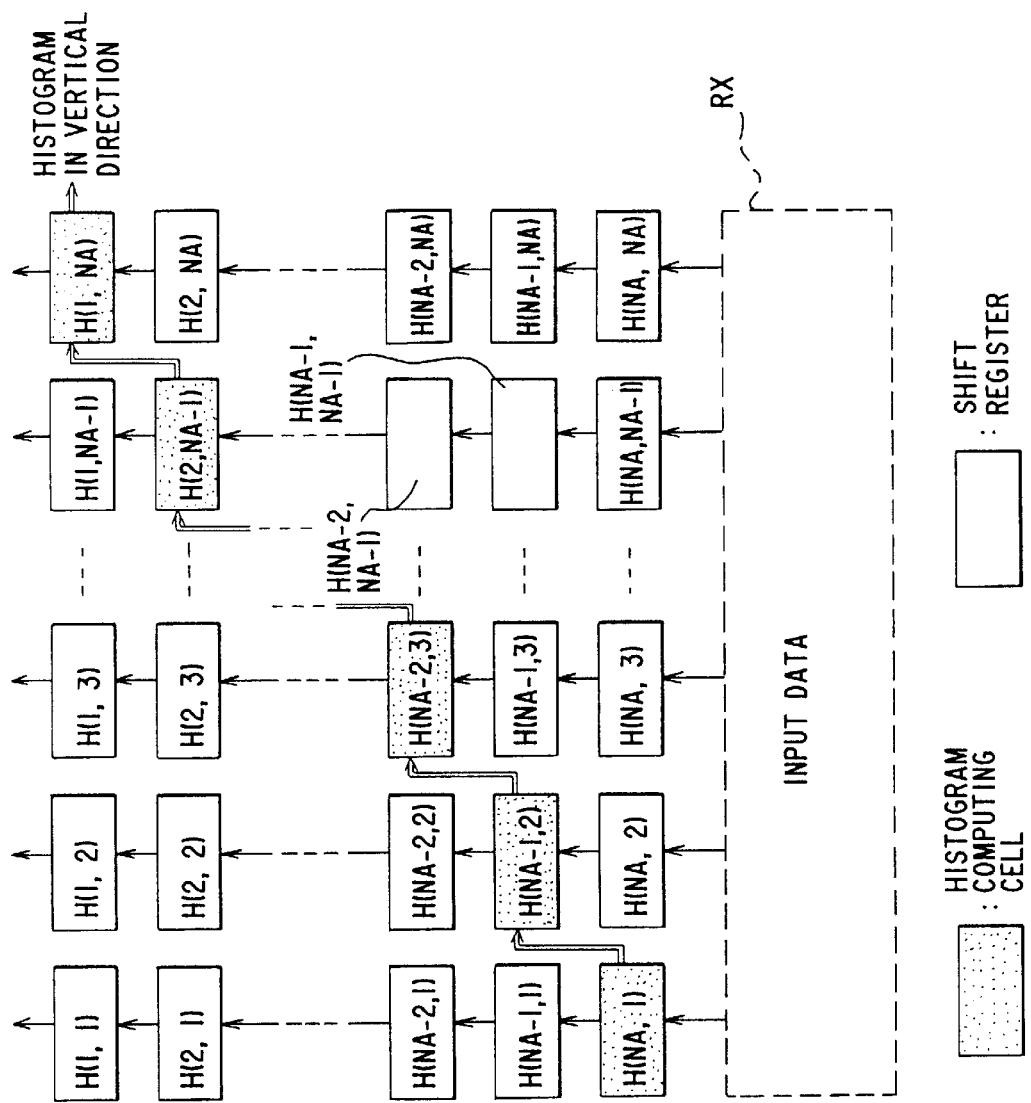
FIG. 24 shows the histogram generation circuit network of the row-histogram module and the column-histogram module using the second principle of this invention, which utilizes a systolic array.

FIG. 24 shows the histogram generation circuit network of the row-histogram module 13 and the column-histogram module 14 using the second principle of this invention, which utilizes a systolic array.

Respective cells H(1,1) through H(Na,Na) comprise a histogram computing cell or a shift register. As shown in FIG. 22, inputted data RX of MA*NA bits are supplied in dot-row units to histogram computing cell H(NA,1) and shift registers H(NA,2) through H(NA,NA). An output from histogram computing cell H(NA,1) is supplied to shift register H(NA−1,1), and an output from shift register H(NA,2) is supplied to histogram computing cell H(NA−1,2). Further, outputs from shift registers H(NA,3) through H(NA,NA) are supplied to shift registers H(NA−1,3) through H(NA−1,NA).

That is, histogram computing cells are sequentially provided to the leftmost position in the lowermost row, the second leftmost position in the second lowermost row, the third leftmost position in the third lowermost row, and so forth, to the rightmost position in the uppermost row, and data are sequentially outputted to the next histogram computing cell in this order.

In other words, first, cell H(NA−1,1) through H(1,1) are provided as shift registers each corresponding to a dot, and cell H(NA,1) is provided as a histogram computing cell. Second, the second cell H(NA−1,2) is provided as a histogram computing cell. Third, the third cell H(NA−2,3) is provided as a histogram computing cell. Similarly, histogram computing cells are sequentially provided up to the last cell H(1,NA). The respective histogram computing cells sequentially output the results to the next ones right and above in dot units.

These respective histogram computing cells and shift registers output data to the histogram computing cells and shift registers in the next stages in one clock cycle. The shift registers delay received data by one clock cycle.

The operations of the histogram generation circuit network in the embodiments of this invention are explained in more detail below.

The histogram generation circuit network (of NA*NA bits) 61 starts its operations at t=1. If t increments by 1 at each clock increment, the operations of the respective cells at time t are as follows.

[1] At $t \leq M$, cells H(NA,1) through H(NA,NA) read row t of the inputted data. At M<t, cells H(NA,1) through H(NA, NA) read 0.

[2] Histogram computing cell H(i,NA−i+1) processes data sent from shift register cell H(i+1,NA−i+1) and the operation results sent from histogram computing cell H(i+1, NA−i), according to the cell operations to be described later.

[3] Histogram computing cell H(i,NA−i+1) sends the operation results to histogram computing cell H(i−1,NA−i+2). Any cell H(i,j) in rows 1 through NA−1 send data received from cell H(i+1,j) "as is" to cell H(i−1,j).

However, because the operation results of cell H(1,NA) become the values (xwidth, xcount) of row NA−t+1 t+1 at $NA \leq t$, they are stored in the buffer (of MA*1 bits) 62. The values (ywidth, xcount) stored as the data of cell H(1,j) ($0 \leq j \leq NA$) are sent to the buffer (of MA*NA bits) 63.

The above operations are all completed at clock MA+NA−1, the histogram value (in the horizontal direction) of row J of the inputted data are stored in the histogram computing cell H(J,NA−J+1) of row J, and the histogram value (in the vertical direction) of row I is stored in row I of the buffer (of MA*1 bits) 62.

Figure 25:
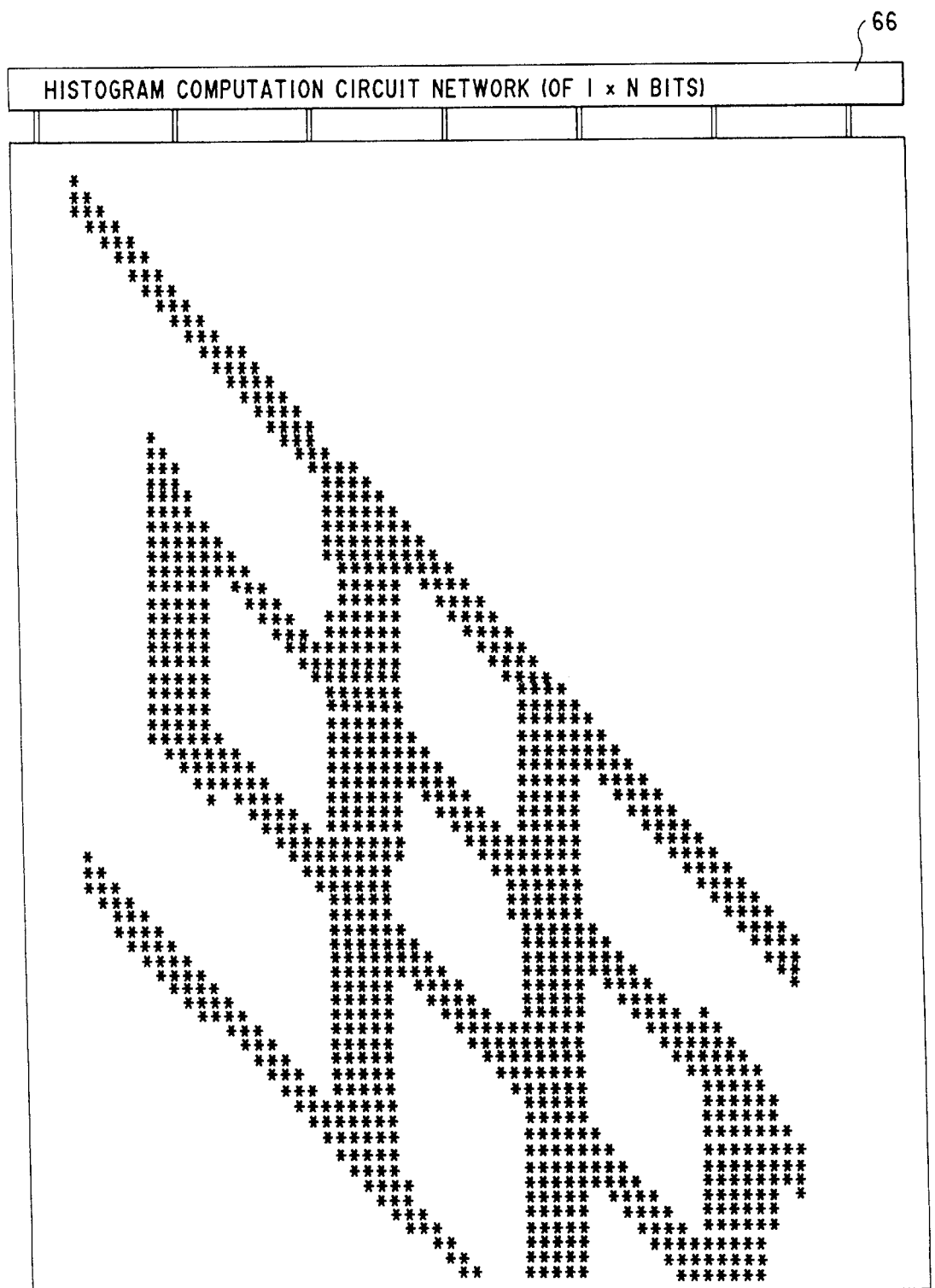
FIG. 25 shows an input sequence of shifted data of the row-histogram module and the column-histogram module using the second principle of this invention, which utilizes a systolic array.

FIG. 25 shows an input sequence shifted data of the row-histogram module 13 and the column-histogram module 14 using the second principle of this invention, which utilizes a systolic array.

When cells are positioned as shown in FIG. 24, e.g. data of row I of the inputted graphic are processed in cell H(NA,1) and the processing result and the data of the second row are processed in cell H(NA−1,2) at time t=(I+1). Since data of the same row are sequentially met in this manner, the histograms in both the vertical and horizontal directions are created simultaneously. Instead of positioning cells as shown in FIG. 24, histograms arrayed in single dimension can be used to separately input data to a histogram computation circuit network 66 by delaying them by one clock cycle as shown in FIG. 25.

Whereas the operations in the horizontal and vertical directions are explained above, the operations of the histogram computing cells described earlier are explained in more detail below.

First, a linear histogram in the horizontal direction in the histogram computing cell is explained.

As described earlier, the column histogram in the horizontal direction is obtained by assigning 1 to the value of the column to which the leftmost point contained in the character area on the image data belongs and by sequentially incrementing the values of the columns to the right by 1.

Therefore, when a column of the inputted image is scanned, if the column contains a black picture element and no column to the left contains a black picture element, 1 is assigned to the histogram value of the column, and the histogram values of the columns to the right are incremented by 1. Cells in column j determine the values of the cells in column (j-1). Unless the values are less than 1, the cells in column j assign the values plus 1 to themselves.

If the values of the cells of column (j-1) are 0, when there is a black picture element in column j the values of the cells in column j become 1, and when there is no black picture element in column j the value of the cells in column j become 0. When the respective cells are provided with the processings described earlier, and the inputted image is processed sequentially from the first row, the histogram in the horizontal direction is finally obtained.

The character width can be obtained from the histogram value of the rightmost column having a black picture element on the inputted image data, because they are the same.

The histogram in the vertical direction can be similarly obtained. However, whereas functions are distributed spatially for the histogram in the horizontal direction, they are distributed time-wise for the histogram in the vertical direction.

FIG. 26 shows in detail the configuration of a linear histogram computing cell of the row-histogram module 13 and the column histogram 14 module using the second principle of this invention, which utilizes a systolic array.

A "flag" determines the existence of a black picture element in a scanning, a "count" is a histogram value, and a "width" is a character width value. An "x" and a "y" express the vertical direction and the horizontal direction. "yflag", "xwidth" and "xcount" are data sent to the right cell as a result of processing the cell value of the left column. "ywidth", "ycount" and "xflag" are data stored in the respective cells as a result of processing their own cell values. "xflag", "xcount" and "xwidth", as well as "yflag", "ycount" and "ywidth" are determined by the following expressions.

In the horizontal direction:

```
xflag = if data ==1 then 1
        else xflag
xcount = if xcount>0 then xcount+1
        else if xflag==1 or data==1 then 1
        else xcount
xwidth = if xflag==1 or data==1 then xcount+1
        else xwidth
```

In the vertical direction:

```
yflag = if data==1 then 1
        else yflag
ycount = if ycount>0 then ycount+1
        else if yflag==1 or data==1 then 1
        else ycount
```

-continued
```
ywidth = if yflag==1 or data==1 then ycount+1
        else ywidth
```

If such cells are used in operations, then finally, the histogram in the horizontal direction, the horizontal character width and the vertical character width are expressed by the values of "xcount", "xwidth" and "ywidth", respectively.

Furthermore, the histogram in the vertical direction is outputted sequentially as the ycount of cell H(1,NA) after time NA.

The histogram in the horizontal direction of a non-linear histogram computing cell is explained.

Figure 27:
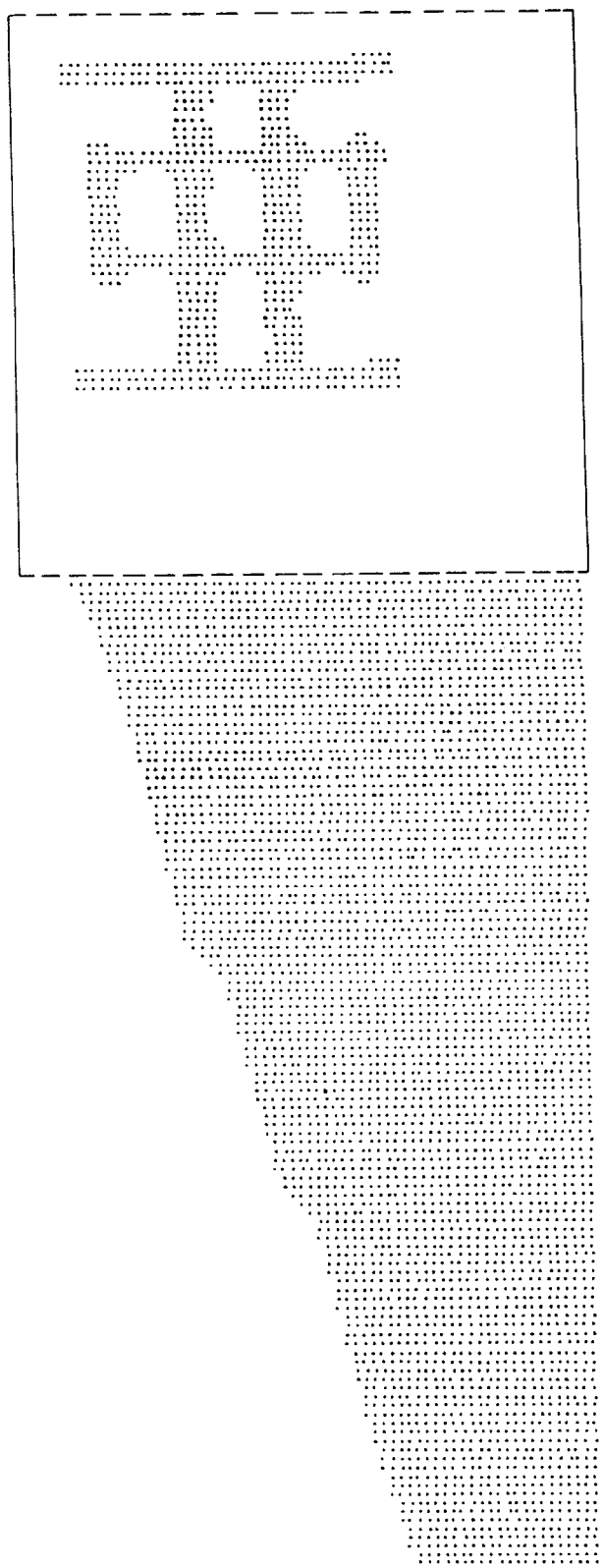
FIG. 27 shows an exemplary horizontal histogram of the row-histogram module and the column-histogram module using the second principle of this invention, which utilizes a systolic array.

FIG. 27 shows an exemplary horizontal histogram of the row-histogram module 13 and the column-histogram module 14 using the second principle of this invention, which utilizes a systolic array.

As shown in FIG. 27, in the case of a non-linear normalization, the numbers of black picture elements are counted for respective columns, which are accumulated. Therefore, the histogram computing cell H(N-j+1,j) in column j accumulates the number of black picture elements encountered in column j.

Figure 28:
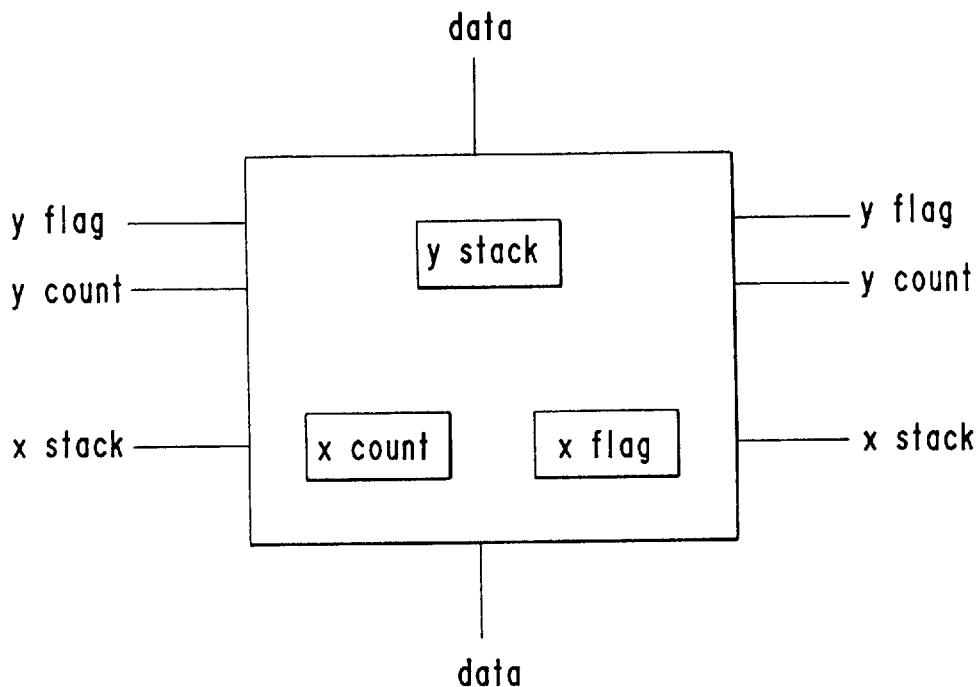
FIG. 28 shows in detail the configuration of a non-linear histogram computing cell of the row-histogram module and the column-histogram module using the second principle of this invention, which utilizes a systolic array.

FIG. 28 shows in detail the configuration of a non-linear histogram computing cell of the row-histogram module 13 and the column-histogram module 14 using the second principle of this invention, which utilizes a systolic array.

A "flag" determines the existence of a black picture element in a scanning, a "count" is a histogram value, and a "stack" is a value accumulated in the histogram at a row. "x" and "y" express the vertical and horizontal directions. "yflag", "xstack" and "ycount" are data sent to the right cell as a result of processing the cell value of the left column. "ystack", "xcount" and "xflag" are data stored in respective cells as a result of processing their own cell values. "xflag", "xcount" and "xstack", as well as "yflag", "ycount" and "ystack" are determined by the following expressions.

In the horizontal direction:

```
xflag = if data ==0 then 0
        else 1
xcount = if data==1 and xflag==0
        then xcount+xstack+1
        else xcount+xstack
xstack = if data==1 and xflag==0 then xstack+1
        else xstack
```

In the vertical direction:

```
yflag = if data==0 then 0
        else 1
ycount = if data==1 and yflag==0
        then ycount+ystack+1
        else ycount+ystack+1
ystack = if data==1 and yflag==0 then ystack+1
        else ystack
```

If such cells are used in operations, the histogram in the horizontal direction finally becomes the example shown in FIG. 28, the horizontal and vertical character widths are expressed by the values of "xcount" of cell H(1,NA) and "ycount" of cell H(1,NA), respectively, and the histogram in the vertical direction is sequentially outputted as "ycount" of cell H(1,NA) at and after time NA.

By configuring a histogram computing cell as above, conversion tables, which are linear or non-linear histograms, are obtained.

Figure 29:
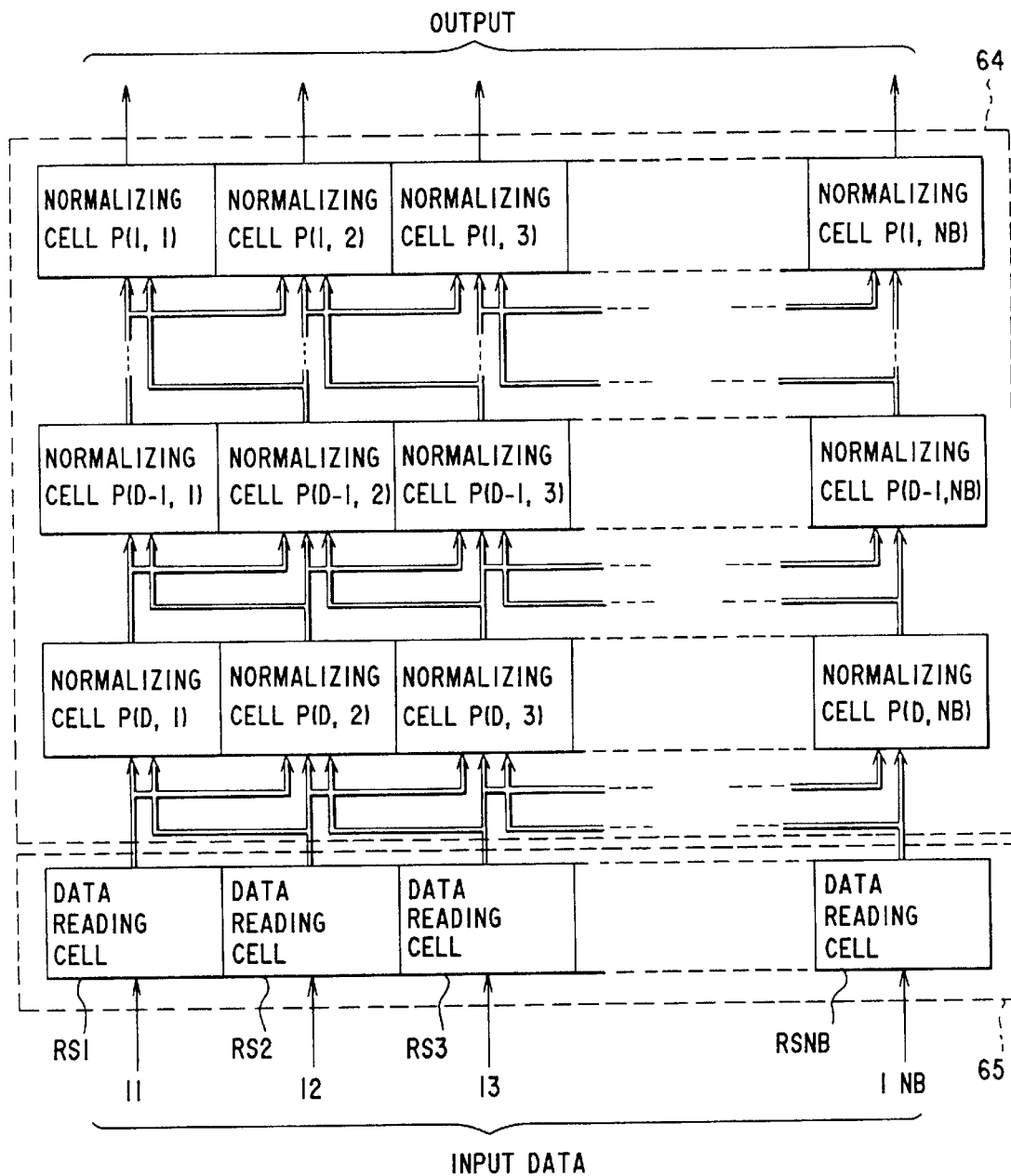
FIG. 29 shows the configuration of the normalization circuit network of the normalization module using the second principle of this invention, which utilizes a systolic array.

FIG. 29 shows the configuration of the normalization circuit network of the normalization module 16 using the second principle of this invention, which utilizes a systolic array.

The cell structure circuit network for reading data 65 (Refer to FIG. 22.) comprises data reading cells RS1 through RSn and reads data stored in the buffer (of MA*NA bits) 63 in dot-row units after the histogram generation circuit network (of NA*NA bits) 61 creates a histogram. In the embodiments of this invention, the normalization circuit network (of nA*D bits) 64 performs a normalization in the horizontal direction and the cell structure circuit network for reading data 65 performs a normalization in the vertical direction.

The cell structure circuit network for reading data 65 calculates the value necessary for a normalization in the horizontal direction by concurrently performing the earlier described normalization in the vertical direction and outputs the value and inputted data to the normalization circuit network (of nA*D bits) 64.

Figure 30:
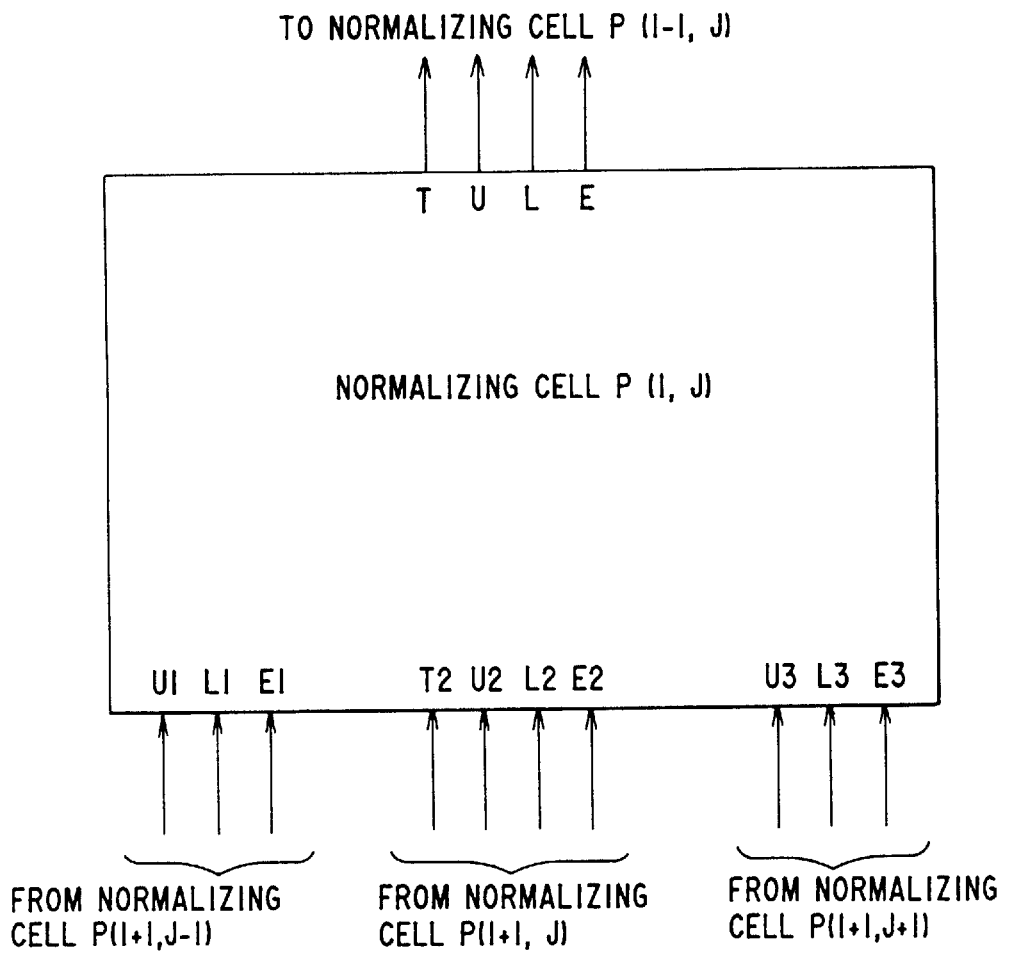
FIG. 30 shows the configuration of normalizing cells of the normalization module using the second principle of this invention, which utilizes a systolic array.

FIG. 30 shows the configuration of normalizing cells P(1,1) through P(D,NA) of the normalization module 16 using the second principle of this invention, which utilizes a systolic array.

Representative normalizing cell P(i,j) receives data t2, u2 , l2 and e2 from corresponding normalizing cell P(i+1,j) in the prior state. P(i,j) also receives data u1 , l1 and e1 from normalizing cell P(i+1,j−1), which is adjacent to corresponding cell P(i+1,j), as well as u3, l3 and e3 from another normalizing cell P(i+1,j+1), which is adjacent to and is opposite from corresponding cell P(i+1,j). Each normalizing cell P(i,j) calculates data t, u, l and e from the inputs described earlier and supplies the data to a normalizing cell P(i−1,j) in the posterior stage. This normalizing cell P(i,j) performs the processings shown in FIG. 30. That is, they are expressed as follows.

```
t = t2
u = if l2 ≧ t2 then u1
    else if u2 < t2 then u3
    else u2
l = if 2 ≧ t2 then l1
    else if u2 < t2 then l3
    else l2
e = if l2 ≧ t2 then e1
    else if u2 < t2 then e3
    else e2
```

The obtained resultant data t,u, l and e are outputted to normalizing cell P(i−1,j) and neighboring normalizing cells P(i−1,j−1) and P(i−1,j+1) in the posterior stage.

By the above operations, the normalization circuit network (of nA*D bits) 64 processes a normalization in the horizontal direction.

The number of stages in the horizontal direction of the normalization circuit network (of nA*D bits) 64 described earlier corresponds to the numbers of bits n1 and n2 to be expanded to the left and right, as shown in FIG. 22. In other words, it is the greater value of the left and right margins n1 and n2 of the inputted data. That is, it is enough to input the maximum value of the dot width of the character input.

By this processing, a normalized character pattern of D*D dots is obtained.

Figure 31:
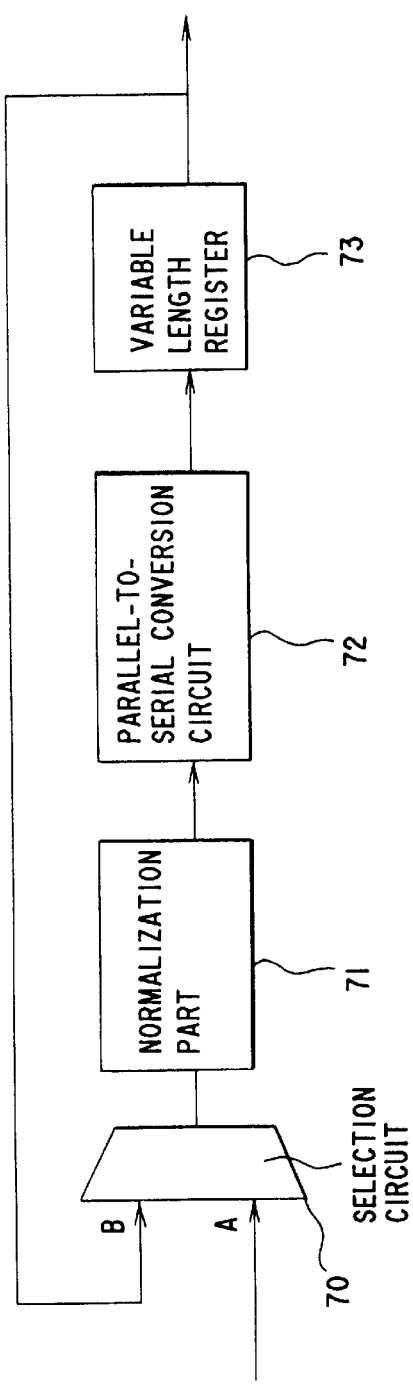
FIG. 31 shows the configuration of the normalization module using the third principle of this invention.

FIG. 31 shows the configuration of the normalization module 16 using the third principle of this invention.

A circuit configured as shown in FIG. 31 enables a normalization, other than a normalization by a systolic array described earlier.

Image data to be contracted or magnified are supplied to terminal A in dot-column units or in dot-row units. A selection circuit 70 outputs image data supplied from terminal A to a normalization part 71 by selecting them per the instruction from a control circuit not shown in the drawing.

The normalization part 71 normalizes supplied parallel dot data in the vertical direction.

Figure 33:
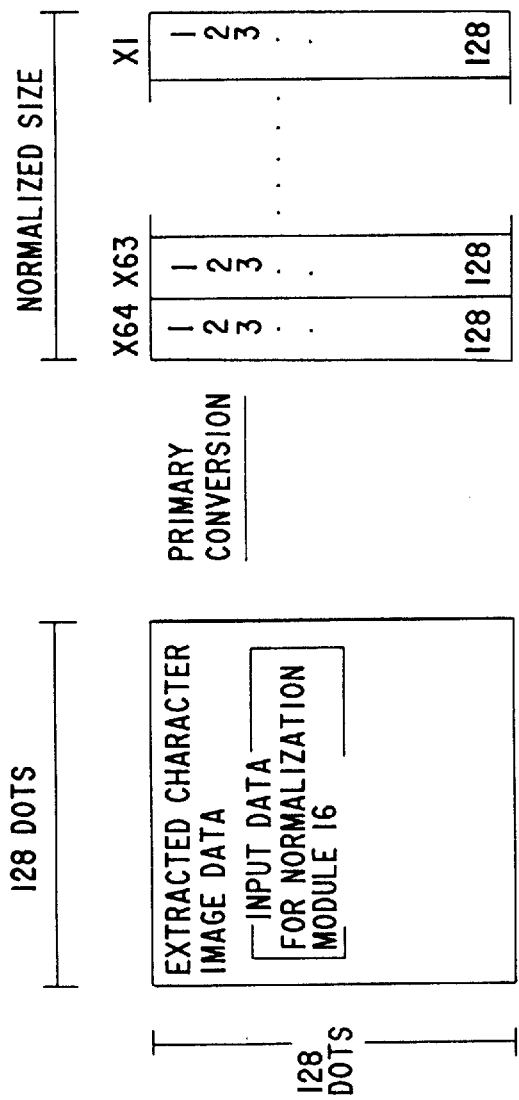
FIG. 33 illustrates the principle of the normalization module using the third principle of this invention.

FIG. 33 illustrates the principle of the normalization module 16 using the third principle of this invention.

If extracted character image data exists, such as of 128 dots by 128 dots, i.e. input data for normalization module 16, the normalization part 71 reads and contracts data sequentially supplied in dot-column units in the vertical direction. When the 128 dots by 128 dots are contracted, e.g. to 64 dots by 64 dots, to change one of the two sides to 64 dots (a primary conversion), data of a plurality of dot columns (two dot columns in this case) read in 128 dot units are "OR" added to be outputted as a single dot column. Normalized data outputted from the normalization part 71 (At this time, the dot number of one dot column does not change.) are supplied to a parallel-to-serial conversion circuit 72 (P/S) to be converted to serial data which are supplied to a variable length register 73.

When the normalization part 71 supplies parallel data of 128 dots in the first column to the parallel-to-serial conversion circuit 72, the variable length register 73 supplies the serial data of 128 dots in a first register. Parallel data of 128 dots of the second column are supplied to a second register.

Taking a magnification and a contraction into consideration, the variable length register 73 comprises a plurality of variable-length shift registers. In the configuration of FIG. 33, when data of 128 dots by 128 dots are inputted, serial data of 128 dots are supplied sixty-four (64) times to the variable length register 73.

Figure 35A:
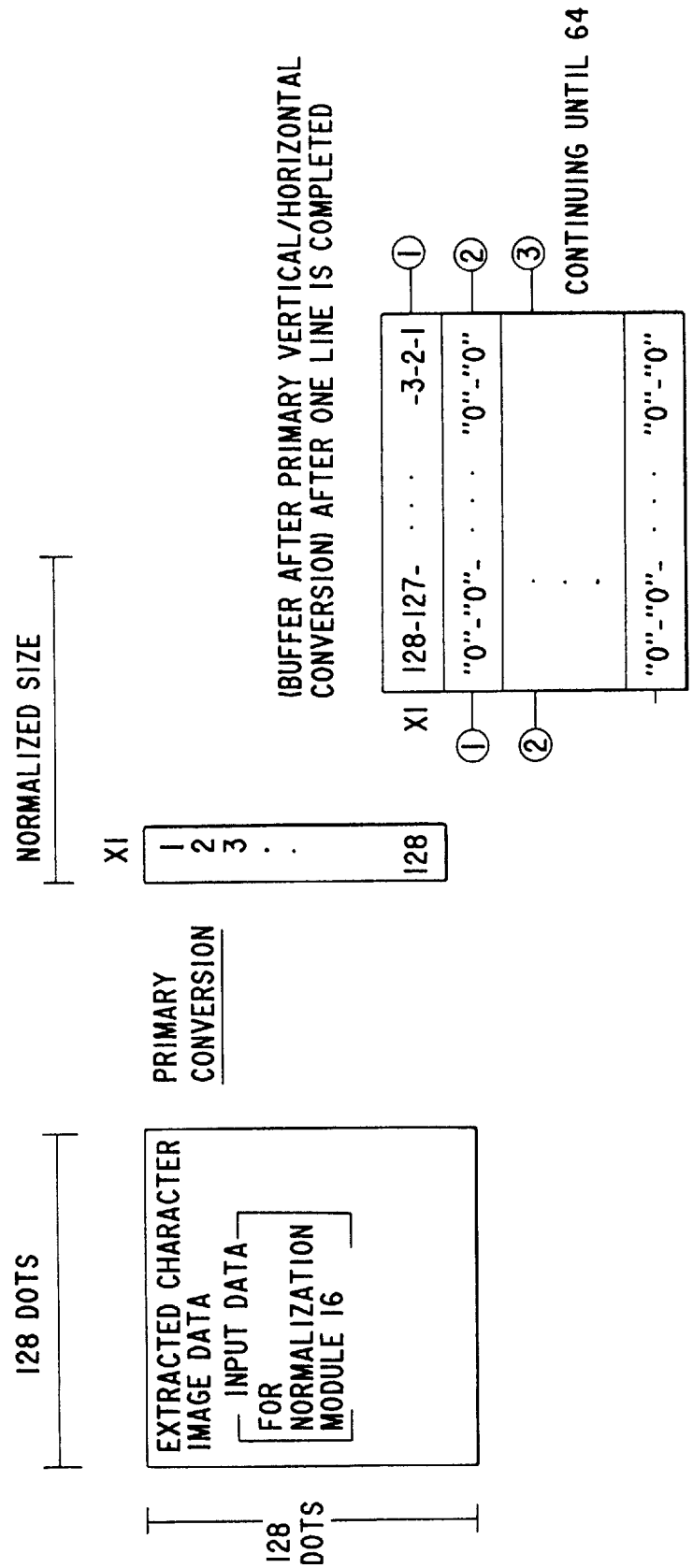
FIGS. 35A and 35B explain in detail the operations of the normalization module using the third principle of this invention.
Figure 35B:
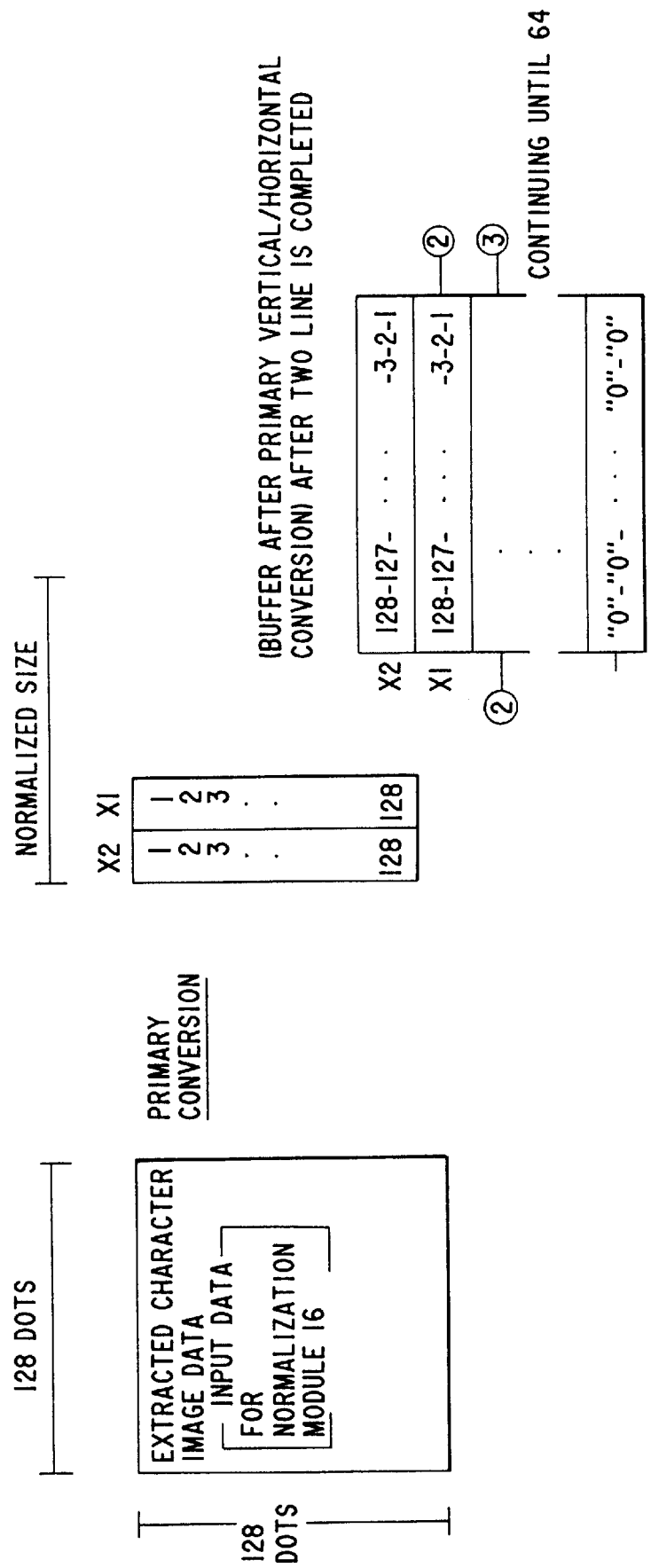

FIGS. 35A and 35B explain in detail operations of the normalization module 16 using the third principle of this invention.

In the primary conversion, as shown in FIGS. 35A and 35B, by "OR" additions for normalizing the size of 128 dots by 128 dots, a first dot column X1 through a sixty-fourth dot column X64 are outputted.

After the primary conversion is completed, the variable length register 73 outputs the result, which is supplied to terminal B of the selection circuit 70 that in turn selects and inputs data supplied to terminal B to the normalization part 71 per an instruction from a control circuit not shown in the drawing.

Since the variable length register 73 outputs head end dots respectively supplied in dot units from the parallel-to-serial conversion circuit 72, the variable length register 73 for storing data which have undergone the primary conversion from 128 dots by 128 dots as shown in FIG. 33 outputs the data in a 64 dot unit.

After the selection circuit 70 selects an output from the variable length register 73, the normalization part 71 contracts the character represented by the 64-dot data supplied a total of 128 times, to one represented, for example by 64 dots by 64 dots.

The operations of the normalization part 71 are similar to the normalizing operations described earlier. In a secondary conversion, data of 64 bits are received in parallel to be outputted by a plurality of "OR" additions to be contracted before they are outputted to the parallel-to-serial conversion circuit 72, which in turn converts them to serial data to be inputted to the variable length register 73.

Whereas the normalization part 71 receives 128 pairs of 64-dot data in parallel, since the normalization part 71 contracts them in the direction along the 128 pairs, the result obtained from the normalization part 71 after the secondary conversion is of 64 dots by 64 dots.

The data which have undergone the secondary conversion are converted to serial data by the parallel-to-serial conversion circuit 72. The serial data of 64 dots by 64 dots are supplied to the variable length register 73 to be stored and outputted to the next processing, e.g. at the line-narrowing module 18.

Figure 32:
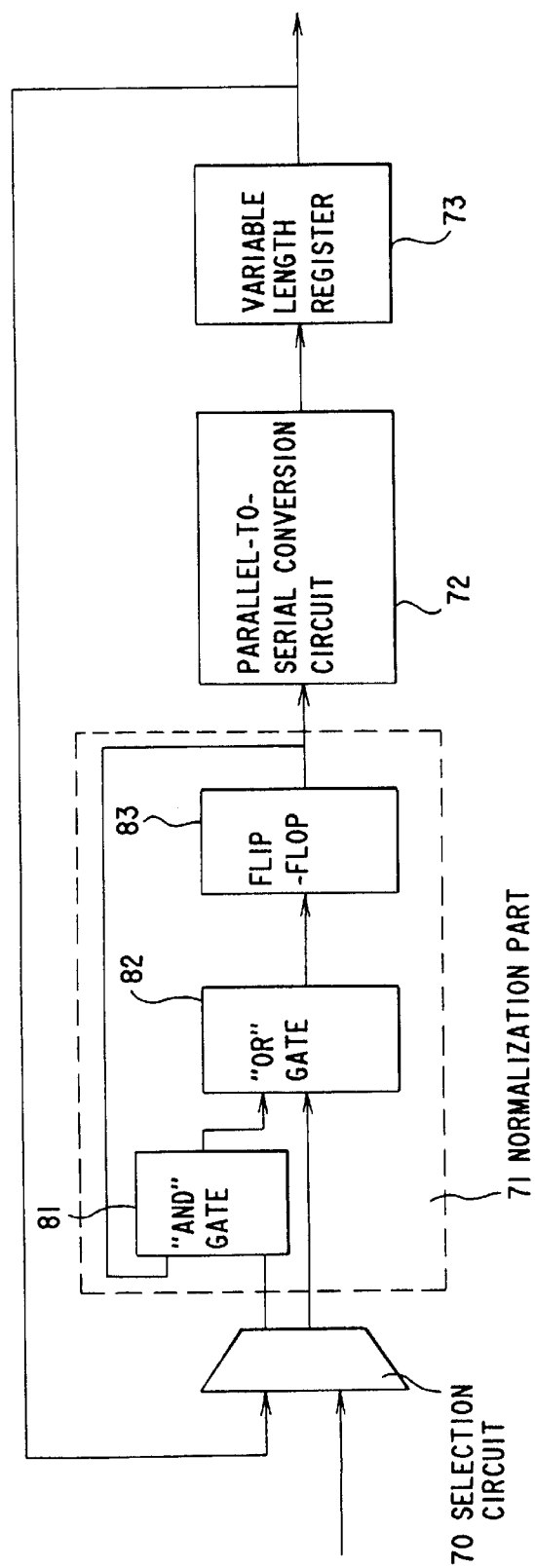
FIG. 32 shows in more detail the configuration of the normalizing part in the normalization module using the third principle of this invention.

FIG. 32 shows in more detail the configuration of the normalizing part 71 in the normalization module 16 using the third principle of this invention. Circuits in FIG. 32 which are the same as those in FIG. 31 have the same numbers, and their explanations therefore will not be repeated.

The normalization part 71 comprises an "AND" gate 81, an "OR" gate 82 and a flip-flop 83. One of the inputs of the "AND" gate 81 is supplied with a gate control signal from a control circuit not shown in the drawing.

A contraction requires an "OR" addition. Thus, to input the output from the flip-flop 83 to the "OR" gate 82, an H signal for turning on the "AND" gate 81 is applied from outside. Whereas the output from the flip-flop 83 is supplied to the "AND" gate 81, the "AND" gate 81 inputs data stored in the flip-flop 83 to the "OR" gate 82. That is, the flip-flop 83 re-inputs data routed through the "AND" gate 81 and the "OR" gate 82 which the flip-flop 83 originally stored by itself.

At this time, since the next dot row is supplied to the "OR" gate 82, data outputted from the "OR" gate 82 are the result of "OR" adding data stored in the flip-flop 83 and data of the next dot row. This is because a black dot exists at a similar position even if a plurality of dots are read, e.g. in a contraction when only one dot column of black dots exists.

Since the black and white dots have the values 1 and 0, respectively, in the embodiment shown in FIG. 32, when data are inputted with negative logic, the "AND" gate 81 performs the "OR" addition.

Contracted data stored in the flip-flop 83 are received in the parallel-to-serial conversion circuit 72 per an instruction by a receiving signal from a control circuit not shown in the drawing. A magnification or a contraction is performed in accordance with the sequence wherewith the receiving signal is supplied.

The conversion table creation module 17 shown in FIG. 2A is a circuit for creating a conversion table, indicating the relation between a variable I and a conversion table function value H(I), to obtain a receiving position in a magnification or a contraction.

FIG. 34 explains the operations of the normalization part 71 in the normalization module 16 using the third principle of this invention.

FIGS. 35A and 35B explain in detail the operations of the normalization module using the third principle of this invention.

The normalization part 71 obtains a conversion table value H(I)*D by sequentially incrementing I by 1 from the initial value 1. Initially, i.e. when i is 1, the value H(1)*D is obtained by multiplying H(1) by the dot number D to be changed. Since H(1) is 0, H(1)*D is also 0.

Meanwhile, the normalization part 71 multiplies the character width W by a variable J, which has the initial value 1 and is incremented by 1, each time the parallel-to-serial conversion circuit 72 receives data in dot-row units from the normalization part 71. That is, the accumulation of the character width W, SIGMA[W]=J*W, is calculated.

The example shown in FIG. 34 assumes that the dot number D to be changed and the character width W to be constant at 64 and 100, respectively.

Since the variable J is 1, initially, SIGMA[W] is 100. The normalization part 71 compares SIGMA[W] with H(I)*D, and declares the comparison result is effective when H(I)*D is greater than SIGMA[W]. Since H(2) is 0, the comparison result is ineffective. When I is incremented to 3 and then to 4, because H(3)=0 and H(4)=1, H(3)*D=0 and H(4)*D=64. Since SIGMA[W]>H(I)*D, their comparison results are still ineffective. Finally, when I is incremented to 5, since H(5) is 2, H(I)*D=128 and H(5)*D>SIGMA[W]. Thus the comparison result becomes effective, and the normalization part 71 outputs data at this time. In other words, the parallel-to-serial conversion circuit 72 receives data. When data is received, such as when the comparison result become effective, the variable J is incremented by 1.

Since the variable J changes to 2, SIGMA[W](=J*W) becomes 200. Thereafter, the normalization part 71 again compares H(5)*D(=128) with SIGMA[W]. Since SIGMA [W] is greater in this comparison, the comparison result becomes ineffective, and I is incremented to 6.

Thus, each time the parallel-to-serial conversion circuit 72 receives data from the normalization part 71, the normalization part 71 sequentially compares H(I)*D with SIGMA[W] by incrementing variable J by 1.

A character is normalized by the result obtained in the conversion table creation module 17 through the above operations. The comparisons are then performed with the character width W obtained simultaneously at the conversion table creation module 17 as described earlier. A magnification or a contraction in one direction is achieved by making J=64 effective by sequentially performing these operations.

Figure 36:
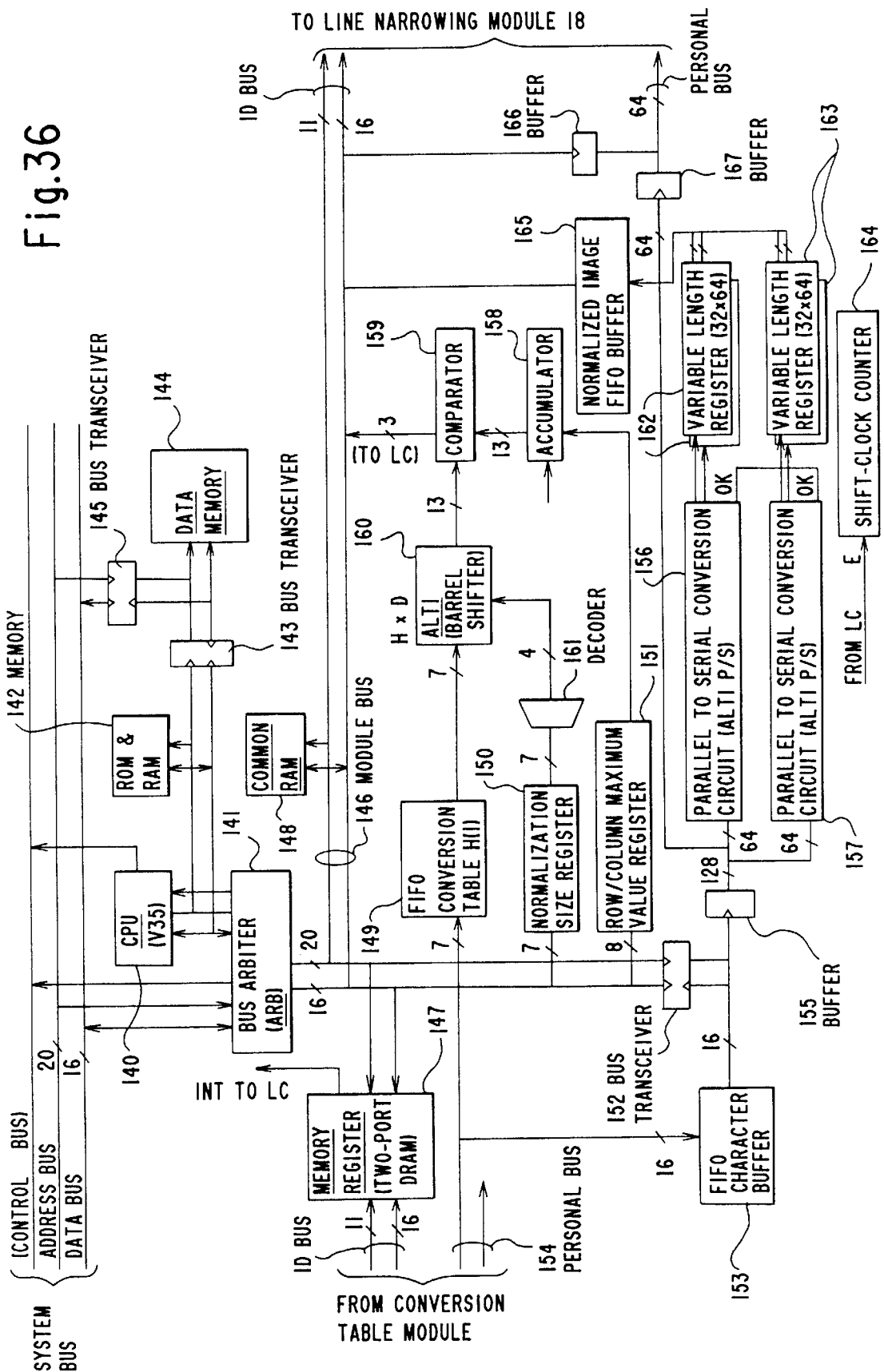
FIG. 36 shows in detail the system configuration of the normalization module using the third principle of this invention.

FIG. 36 shows in detail the system configuration of the normalization module 16 using the third principle of this invention.

In the embodiment shown in FIG. 2A, although it is not shown in the drawing, an instruction of a system CPU is supplied to each module by a system bus SBUS comprising a control bus, an address bus, and a data bus. Each module is provided with a local CPU 140 which exchanges data with the system bus SBUS through a bus arbiter (ARB) 141.

The system bus SBUS is connected to the local CPU 140 through the bus arbiter (ARB) 141. A local bus of the local CPU 140 is connected not only to the bus arbiter (ARB) 141 but also to a data memory 144 through a memory 142 and a bus transceiver 143. The data memory 144 is connected to the system bus SBUS through a bus transceiver 145 so that data can be accessed in response to an access from the local CPU 140, as well as from the system CPU through the bus transceiver 145. The local CPU 140 executes a program stored beforehand in ROM in the memory 142 to control the module operations.

The local CPU 140 is connected to the system bus SBUS described earlier through the bus arbiter (ARB) 141, as well as to a module bus 146 comprising an address bus and a data bus. The module bus 146 is connected to a FIFO character buffer 153 through a two-port SRAM 147, a common RAM 148, a normalization size register 150, a row/column maximum value register 151 and a bus transceiver 152. The two-port SRAM 147 which is a memory register is connected to an ID bus of the conversion table creation module 17, and upon receiving various information the two-port SRAM 147 notifies the local CPU 140 that the information is inputted, by interrupting the local CPU 140.

Per the controls described earlier, data stored in the FIFO character buffer 153 is supplied through a buffer 155 to parallel-to-serial conversion circuits (ALTI, P/S) 156 and 157. The buffer 155 outputs 16-bit data in 128 bit-units by sequentially storing eight (8) words (128 bits) of character pattern data inputted from the FIFO character buffer 153 and supplies them simultaneously to the parallel-to-serial conversion circuits (ALTI, P/S) 156 and 157 in 64-bit units. Although a clock instructing the parallel-to-serial conversion circuits (ALTI, P/S) 156 and 157 to receive 64-bit data is not shown in the drawing, a clock pulse of such a clock is supplied from a comparator 159. Each time a "big" signal for indicating big data is supplied from the comparator 159, the parallel-to-serial conversion circuits (ALTI, P/S) 156 and 157 receive 64-bit data.

An accumulator 158 accumulates the row/column maximum value W outputted from the row/column maximum value register 151 to output the result to the comparator 159.

The FIFO conversion table 149 stores a conversion table function value H(I) and supplies it to a barrel shifter 160. Meanwhile, a normalization size value D (7-bit data), by which H(I) is multiplied, is inputted to a decoder (DEC) 161 to be decoded.

Whereas the conversion sizes in the embodiments of this invention are expressed as $2^n$, such as 16, 32 and 64, the decoder DEC 161 decodes the conversion sizes into n by taking their exponents. Since the barrel shifter 160 shifts H(I) inputted from the FIFO conversion table 149 by the decoded value n, a multiplication of $2^n*H(I)$ is performed and the result is inputted to the comparator 159, which is a circuit for comparing the value supplied from the barrel shifter 160 with the value supplied from the accumulator 158. When the output from the barrel shifter 160 is small, the comparator 159 instructs the consecutive parallel-to-serial conversion circuits (ALTI, P/S) 156 and 157 to receive 128-bit data memorized in the buffer 155. The local CPU 140 controls the execution state and the result.

Meanwhile, respective 64-bit serial data obtained by the parallel-to-serial conversion circuits (ALTI, P/S) 156 and 157 are supplied to variable length registers 162, 162', 163 and 163'. The variable length registers 162, 162', 163 and 163' are shift registers each of 32 dots*64 dots and are inputted with 64-bit serial data in units of 64-bit columns. For instance, in the primary conversion for the first row, the variable length registers 162 and 163 operate to simultaneously receive 128-bit data in 64-bit units.

When the local CPU 140 judges that the variable length registers 162, 162', 163 and 163' store data and complete the operations of the primary conversion, the local CPU 140 causes the parallel-to-serial conversion circuits (ALTI, P/S) 156 and 157 to supply two 32-bit data respectively to the variable length registers 162 and 162' and the variable length registers 163 and 163'. That is, that the variable length registers 162, 162', 163 and 163' sequentially re-input 64-bit data from the head end of the 64 pairs of serial data inputted from the parallel-to-serial conversion circuits (ALTI, P/S) 156 and 157.

Whereas data of 128 bits*128 bits are supplied to the parallel-to-serial conversion circuits (ALTI, P/S) 156 and 157 in the primary conversion, since a contracted side is outputted in column units in the secondary conversion, only the parallel-to-serial conversion circuit (ALTI, P/S) 156 operates. At this time, the parallel-to-serial conversion circuit (ALTI, P/S) 156 receives data per the comparison result of the comparator 159 and outputs them as serial data, similarly to the case described earlier.

The output from the parallel-to-serial conversion circuits (ALTI, P/S) 156 and 157 are supplied through the variable length registers 162 and 163 to the normalized image FIFO buffer 165 as parallel data after the conversion.

Alternatively, since the parallel-to-serial conversion circuits (ALTI, P/S) 156 and 157 comprise an ALTI, the parallel output could be similarly supplied to the variable length registers 162, 162', 163 and 163', by providing a support for a parallel output from the local CPU 140.

Data contracted by the above procedures are stored in the normalized image FIFO buffer 165 and image data after a normalization are supplied to the line-narrowing module 18 such as through an ID bus or through a buffer 166 and the personal bus 154.

If something other than the line-narrowing module 18 needs the inputted character data, they could be outputted to the personal bus 154 through a buffer 167.

Although it is not shown in FIG. 36, the input parts of the parallel-to-serial conversion circuits (ALTI, P/S) 156 and 157 are provided with "OR" addition circuits for receiving the results of "OR" adding the inputted data.

Data conversion circuits of the line-narrowing module 18 are explained in more detail below.

Figure 37:
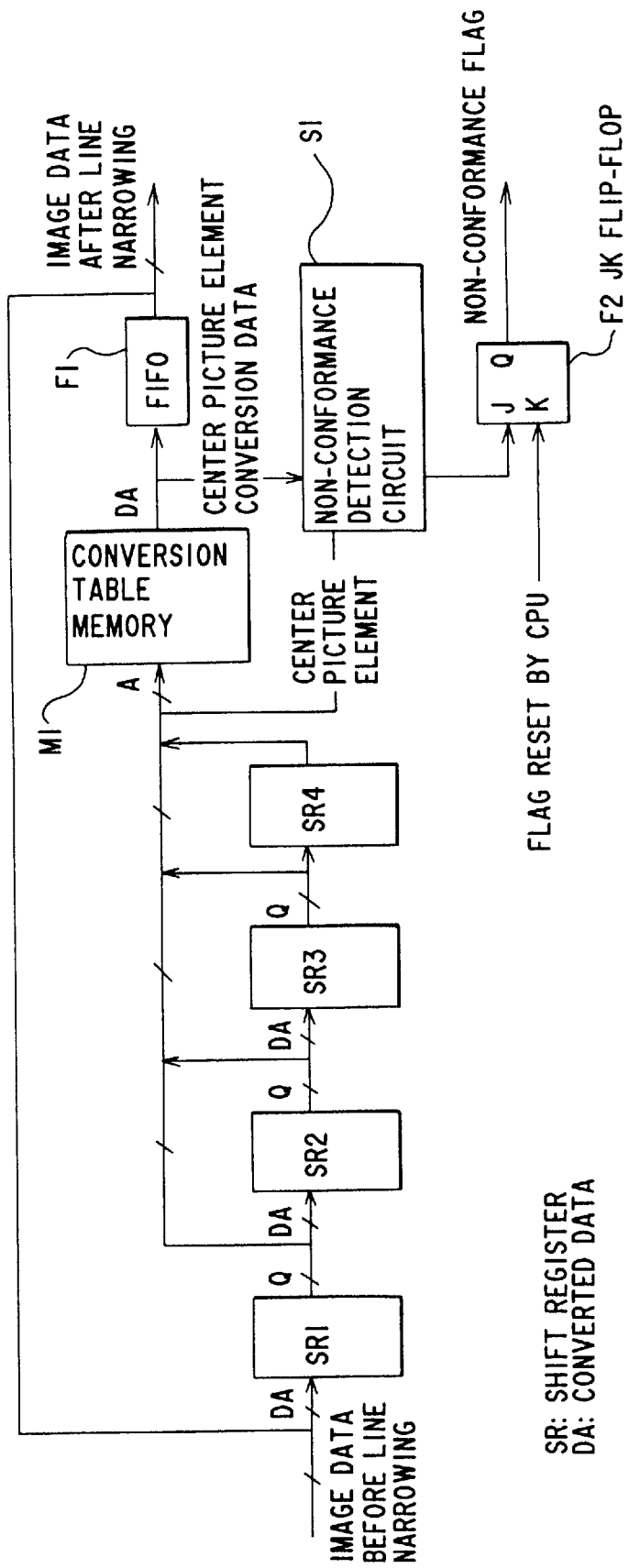
FIG. 37 shows in detail the configuration of the line-narrowing module using the first principle of this invention.

FIG. 37 shows in detail the configuration of the line-narrowing module 18 using the first principle of this invention.

Image data before a line is narrowed are supplied sequentially to a shift register SR1 by vertically read in 3-dot units comprising the center dot of the line to be narrowed and the dots to its left and right. Data stored in the shift register SR1 are sequentially shifted to shift registers SR2, SR3 and SR4 after each time one clock cycle elapses. These shift registers SR1 through SR4 store in four stages a total of 11 bits of dot data. These memorized dot data are supplied to an address of a conversion table memory M1 for storing information that makes a black center dot of the 3*3+2 dots white when the dots around the center dot are of a particular pattern. Then, the center dot corresponding to the inputted dot data is determined (converted) by the information. The converted data DA are supplied to a FIFO F1 (or to a line-narrowing circuit in the next stage). The shift registers SR1 through SR4, and the FIFO F1 receive the center dot and the dots to its left and right, and the dots above and below it are supplied for one character or one document.

When a series of data, such as for a character, are terminated, no more image data are supplied from outside, but in turn converted data DA from the FIFO F1 are again supplied to the shift register SR1. (However, this is not the case for a multiple stage line-narrowing circuit.) As described earlier, the shift registers SR1, SR2 and SR3 shift the inputted data, and the result is again supplied to the address of the conversion table memory M1. The above operations are sequentially repeated.

A non-conformance detection circuit S1 compares the center picture element supplied to the address of the conversion table memory M1 with the converted data DA for the center picture element, and supplies a non-conformance signal to a JK flip-flop F2 when a non-conformance has arisen. On receipt of the non-conformance signal, the JK flip-flop F2 stores it.

Although it is not shown in the drawing, a CPU controls the circuits shown in FIG. 37. When a non-conformance flag arises, the JK flip-flop F2 stores it. The CPU considers that there are points to be changed by a series of converting operations in the area of the line to be narrowed. The CPU does not receive the data after line-narrowing outputted from the FIFO F1, but repeats the control operations described earlier. At this time, the CPU resets the flag of the JK flip-flop F2.

Unless non-conformance is detected in the series of operations, the JK flip-flop F2 receives no data and a non-conformance flag is not outputted. When the flag is not outputted, data of the previous time and data after the conversion are matched. The CPU considers this as a conversion termination and receives data from the FIFO F1.

Figure 38:
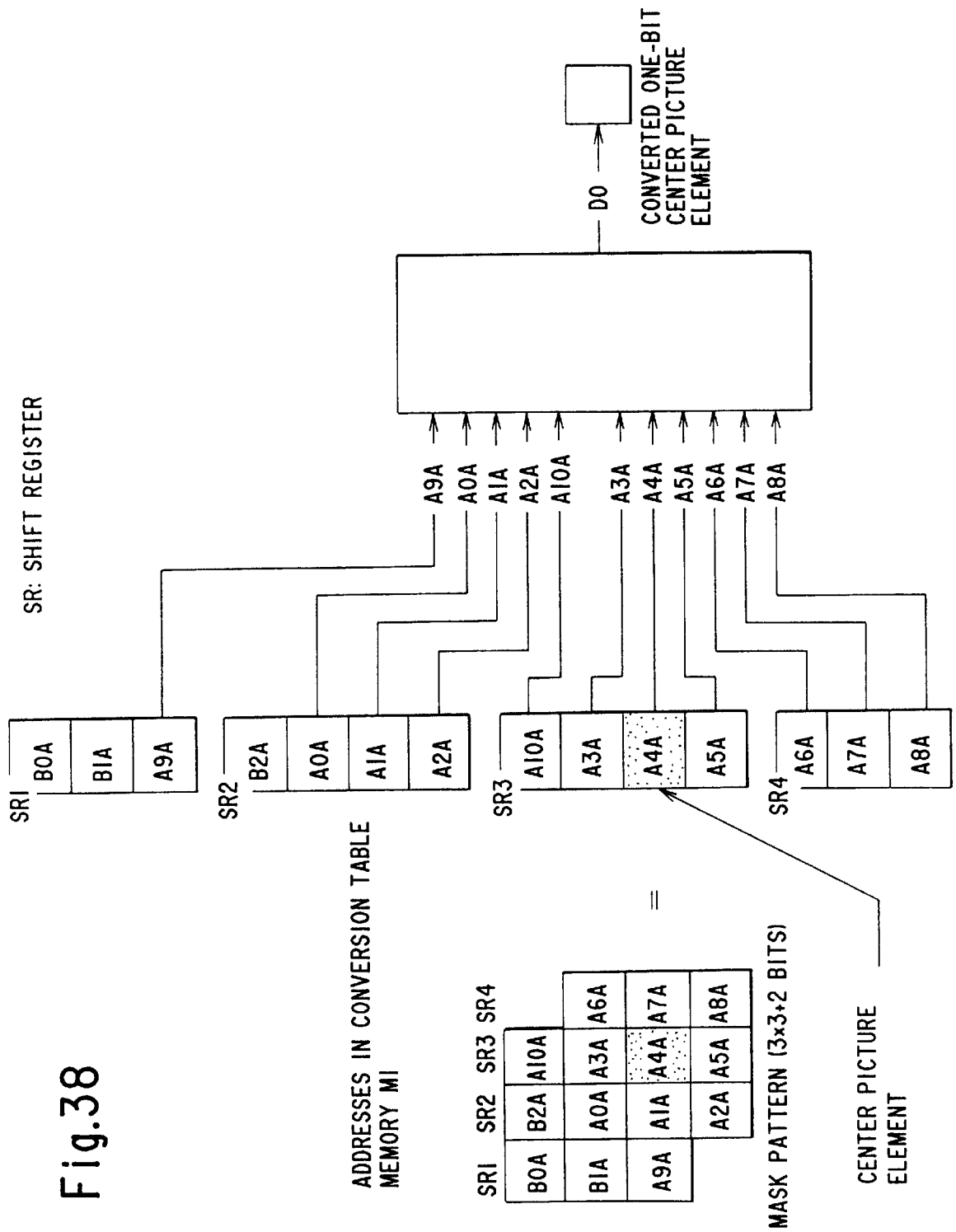
FIG. 38 illustrates the operation of the conversion in the line-narrowing module using the first principle of this invention.

FIG. 38 illustrates the operation of the conversion in the line-narrowing module 18 using the first principle of this invention.

Shift registers SR1, SR2, SR3 and SR4 receive 3-bit, 4-bit, 4-bit and 3-bit inputs, respectively. Thus, a total of fourteen (14) bits are stored. However, only eleven (11) of the fourteen (14) bits stored are actually supplied to addresses A0A through A10A in the conversion table memory M1.

Of the three (3) bits stored in shift register SR1, one (1) is supplied to address A9A. Of the four (4) bits memorized in shift register SR2, three (3) are supplied to addresses A0A, A1A and A2A. All four (4) bits stored in shift register SR3 are supplied to addresses A10A, A3A, A4A and A5A.

The center picture element of the conversion table memory M1 is in address A4. The conversion table memory M1 stores a determinant for determining whether or not the center picture element is changed per bit data stored in the surrounding addresses and outputs a converted one-bit center picture element.

Figure 39:
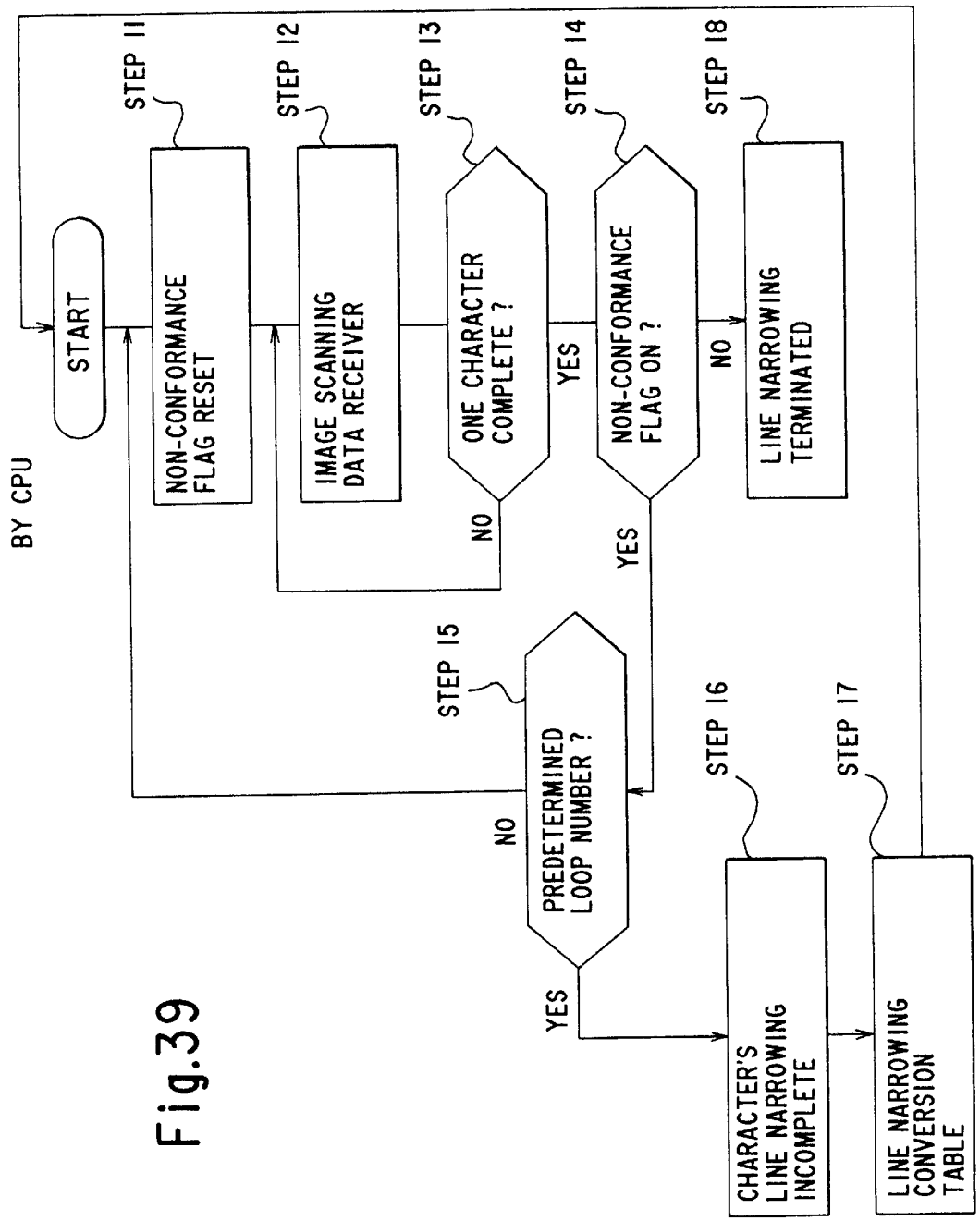
FIG. 39 is a flowchart of the operations of a CPU for controlling the line-narrowing module using the first principle of this invention.

FIG. 39 is a flowchart of operations of a CPU for controlling the line-narrowing module 18 using the first principle of this invention.

After the CPU starts an execution, it performs conversion processings in the following steps.

(STEP 11) The CPU resets the non-conformance flag.

(STEP 12) The CPU starts controlling for receiving the image scanning data stored in an external device.

(STEP 13) The CPU judges whether or not all image scanning data for one character are completely received. If it judges that all the image scanning data are not received (N), STEP 12 is repeated. If it judges that all the image scanning data are received (Y), STEP 14 is invoked.

(STEP 14) The CPU judges whether or not the non-conformance flag is on. If the non-conformance flag is on (Y), STEP 15 is initiated. If the non-conformance flag is not on (N), STEP 18 is invoked.

(STEP 15) The CPU judges whether or not the loop processings from STEP 11 through STEP 14 have been performed al predetermined number of times. If the CPU judges they have (Y), STEP 16 is invoked. If the CPU judges they have not (N), STEP 11 is repeated.

(STEP 16) When the CPU judges that the loop processings from STEP 11 through STEP 14 have been performed a predetermined number of times (Y) and that the non-conformance flag is on (Y), the CPU determines that the line scanning data represents a different character, because line-narrowing has not yet been completed.

(STEP 17) A line-narrowing table conversion is performed in consideration of the possibility of another character. After the processing in STEP 17 has been performed, STEP 11 is repeated.

(STEP 18) The image scanning data at this time is processed by the data stored in the FIFO F1. After repeating the above operations, when the non-conformance flag is not on (N) in STEP 14, the line-narrowing processings are terminated.

Although it is not shown in the drawing, the conversion table memory M1, a RAM, is connected to the CPU. When the image scanning data is of a special character or a character whose line-narrowing is not yet completed, the CPU performs a new line-narrowing by accessing the conversion table in the conversion table memory M1.

By performing the process as shown in FIGS. 37, 38 and 39, a line is narrowed in the input direction of one-column dot data, i.e. in the vertical direction, into a line comprising one dot left and right. A line is narrowed by performing these operations a plurality of times for the number of columns of the inputted character. For example, if the inputted character comprises 64 dots by 64 dots, the above procedures are repeated 64 times.

Whereas a line is narrowed in dot-row units in the operations described in FIGS. 37, 38 and 39, a plurality of lines narrowed in dot-row units are provided in the column direction in these embodiments of this invention, so that e.g. 64-bit data for a row of a character are processed in parallel.

Figure 40:
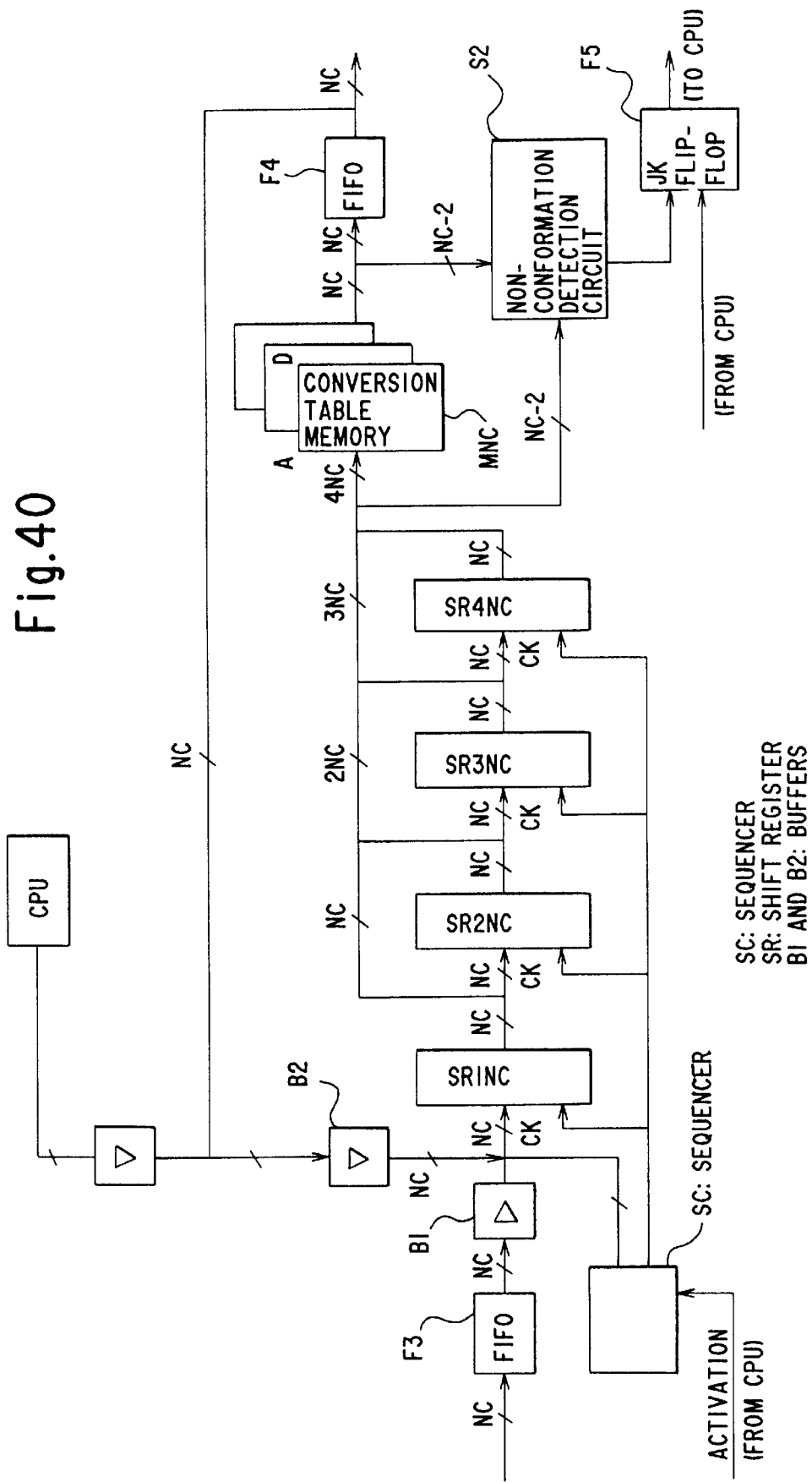
FIG. 40 shows in detail the configuration of the line-narrowing module using the first principle of this invention.

FIG. 40 shows in detail the configuration of the line-narrowing module 18 using the first principle of this invention.

Inputted data are stored in a FIFO F3. For instance, 64-bit data for a dot row of a character comprising 64 dots by 64 dots are supplied in parallel. (At this time, the FIFO F3 is e.g. a shift register of 64 stages.) Data stored in the FIFO F3 is supplied to shift register SR1NC through a buffer B1. Its output is supplied to shift register SR1NC. Its output is in turn supplied to shift register SR2NC. Then its output is supplied to shift register SR3NC. Finally its output is supplied to shift register SR4NC. Shift registers SR1NC through SR4NC receive clock signals from a sequencer SC and shift data from the buffer B1 in correspondence with the clock signals. A total of 4NC pieces of data stored in shift registers SR1NC through SR4NC are supplied to a conversion table memory MNC which comprises (NC–2) pieces of memories for storing the same converted data, and determines the center from the center dot datum. The eight (8) surrounding dots, the dot two up and the dot two to the left are supplied to the respective memories.

Figure 41:
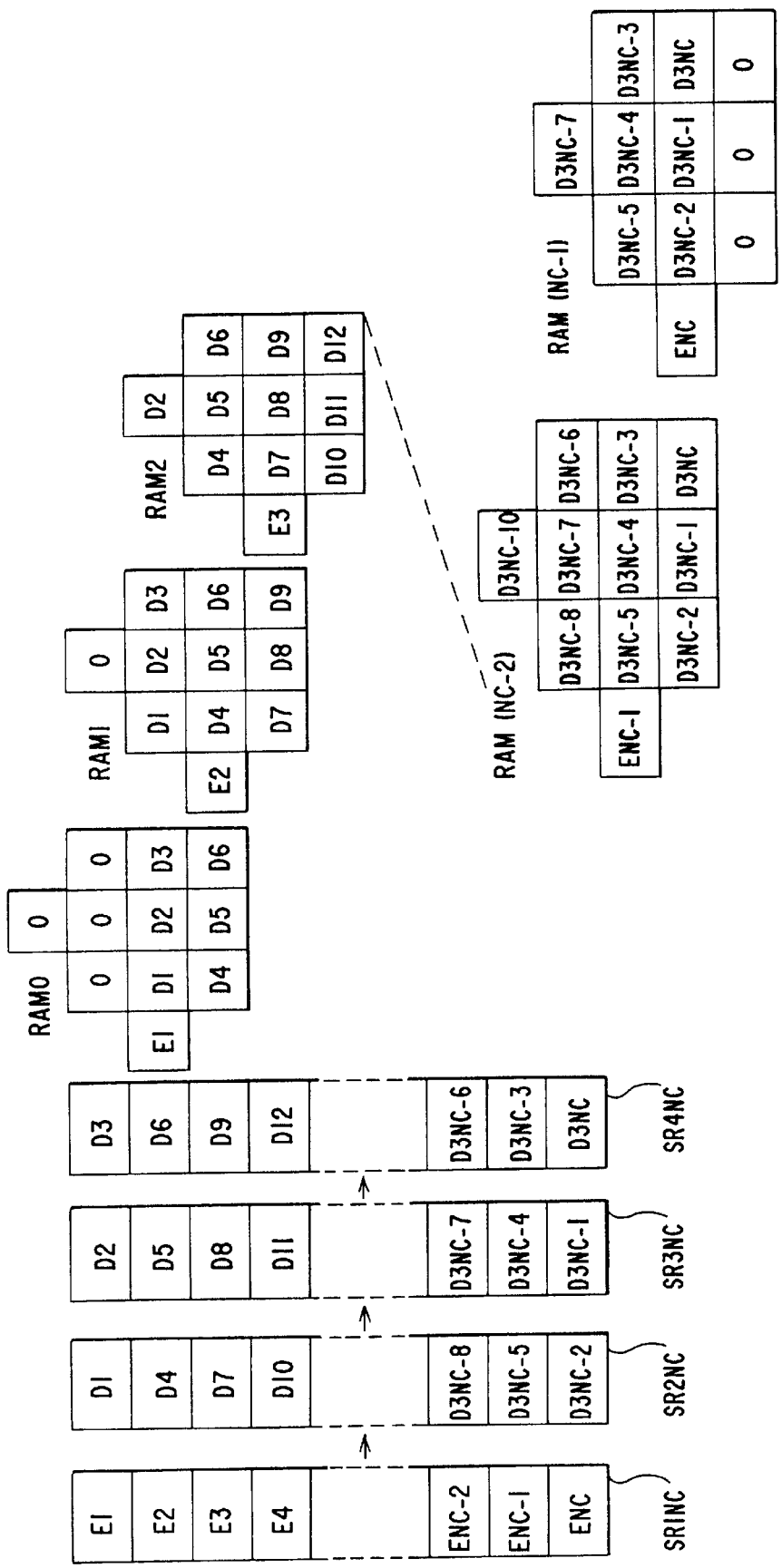
FIG. 41 illustrates in detail the operations of the line-narrowing module using the first principle of this invention.

FIG. 41 illustrates in detail the operations of the line-narrowing module 18 using the first principle of this invention.

As shown in FIG. 41, shift registers SR1NC SR2NC, SR3NC and SR4NC then stored data E1 through ENC, data D1 through D(3NC–2), data D2 through D(3NC–1) and data D3 through D3NC, respectively.

Also as shown in FIG. 41, the conversion table memory MNC comprises RAM0 through RAM(NC–1) which receive data at their address terminals. RAM0 stores data E1 and D1 through D6, and its center datum is D2. RAM1 stores data E2 and D1 through D9. RAM2 stores data E3, D2 and D4 through D12, and its center datum is D5, and its center datum is D8. Other RAM's store data similarly. RAM(NC–2) stores data E(NC–1), D(3NC–10) and D(3NC–8) through D3NC, and its center datum is D(3NC–4). RAM(NC–1) stores data EN, and D(3NC–7) through D(3NC–3), and its center datum is D(3NC–4).

Respective data are inputted to RAM0 through RAM (NC–1) at their proper addresses, as shown in FIG. 41. The results of conversion at RAM0 through RAM (NC–1) are supplied to a FIFO F4 whose output is supplied again to shift register SR1 through a buffer B2.

As described earlier, NC pieces of memories RAM0 through RAM(NC–1) narrow lines. Whereas RAM0, RAM1 and RAM(NC–1), unlike all the other memories RAM2 through RAM(NC–2), have empty dots (outside of the 64 dots), data supplied to the address terminals of those empty dots are set to 0, so that lines at edge parts can be similarly narrowed. Also, by adding two dots to make data of 66 dots, lines at edge parts can be similarly narrowed.

When the CPU starts to control the processing of image data of one character stored in the FIFO F3, the CPU activates the buffer B1 and the sequencer SC, thereby sequentially inputting data in the FIFO F3 to shift register SR1NC. The inputted data are converted by the operations illustrated in FIG. 40. The converted data are then supplied to the FIFO F4. After the FIFO F4 stores the converted data for one character, the CPU performs a control such that the buffer B2 is activated and the buffer B1 is deactivated, so that the data in the FIFO F4. are supplied again to shift register SR1NC.

The next conversion is performed by the above control. When data are supplied from the FIFO F3 to the FIFO F4 after being converted, and when data are supplied again from the FIFO F4 via shift registers SR1NC through SR4NC, a non-conformance detection circuit S2 compares NC bits of center data of the 4NC bits of data supplied to the conversion table memory MNC with NC bits of its output to determine whether or not they match with each other. When a non-conformance is detected, the non-conformance detection circuit S2 supplies a non-conformance signal to a JK flip-flop F5 to set it. When this setting signal is supplied even just once, the CPU again controls the execution of a conversion processing, by judging that a non-conformance exists, i.e. that a conversion has been performed and a change has been made. The CPU again resets the JK flip-flop F5 to a processing condition. The sequencer SC being terminated is reactivated.

When a non-conformance is not detected, the JK flip-flop F5 is not set. The CPU judges that no change has been made and reads the conversion data stored in the FIFO F4. The data is a collection of narrowed lines whose widths are, for example one dot.

Figure 42:
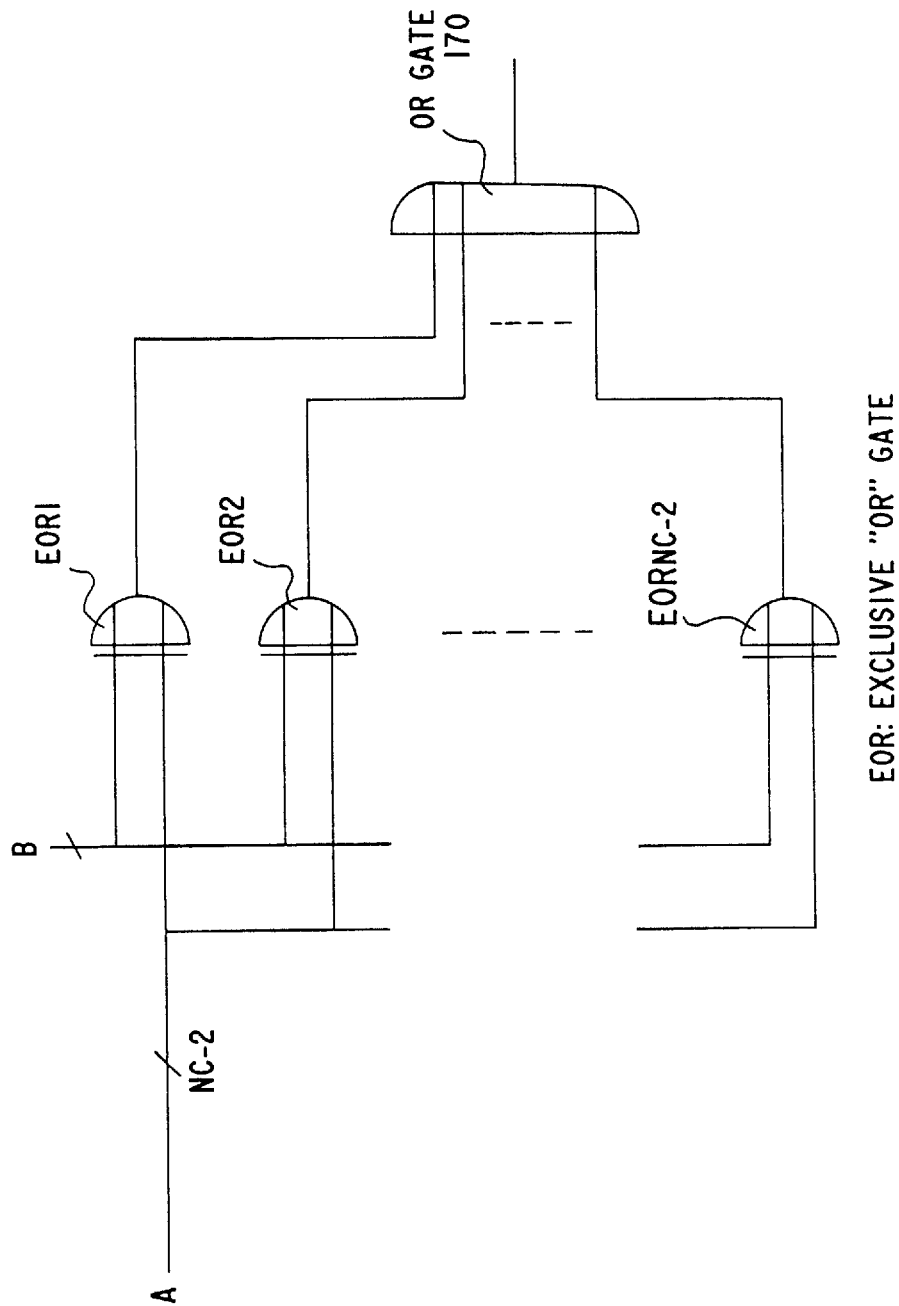
FIG. 42 shows the configuration of the non-conformance detection circuit in the line-narrowing module using the first principle of this invention.

FIG. 42 shows the configuration of the non-conformance detection circuit in the line-narrowing module 18 using the first principle of this invention.

The bit number NC described in FIGS. 40 and 41 is 64. The non-conformance detection circuit S2 compares bits respectively supplied bit-by-bit from NC-bit ports A and B, as shown in FIG. 42. That is, to judge whether or not they agree, the non-conformance detection circuit S2 supplies the compared bits to exclusive logical "OR" gates EOR1 through EOR(NC−2) whose outputs are in turn supplied to an "OR" gate 170. The non-conformance detection circuit S2 determines whether they conform with each other, depending on the output from the "OR" gate 170. Exclusive logical "OR" gates EOR1 through EOR(NC−2) output 0 when the compared bits agree with each other, and 1 when they don't. Thus, if at least one of the exclusive logical "OR" gates EOR1 through EOR(NC−2) outputs 1 because of the non-agreement of the compared bits, the "OR" gate 170 outputs a non-conformance, i.e. an "H" level.

By using the above non-conformance detection circuit S2, a non-conformance flag is set in the JK flip-flop F5, and the CPU determines whether or not line-narrowing should again be executed by judging the non-conformance.

Although it is not shown in the drawing, a clock signal indicating a conformance is supplied to the JK flip-flop F5 described earlier. The JK flip-flop F5 receives the output from the non-conformance detection circuit S2 upon receiving this clock signal.

Figure 43:
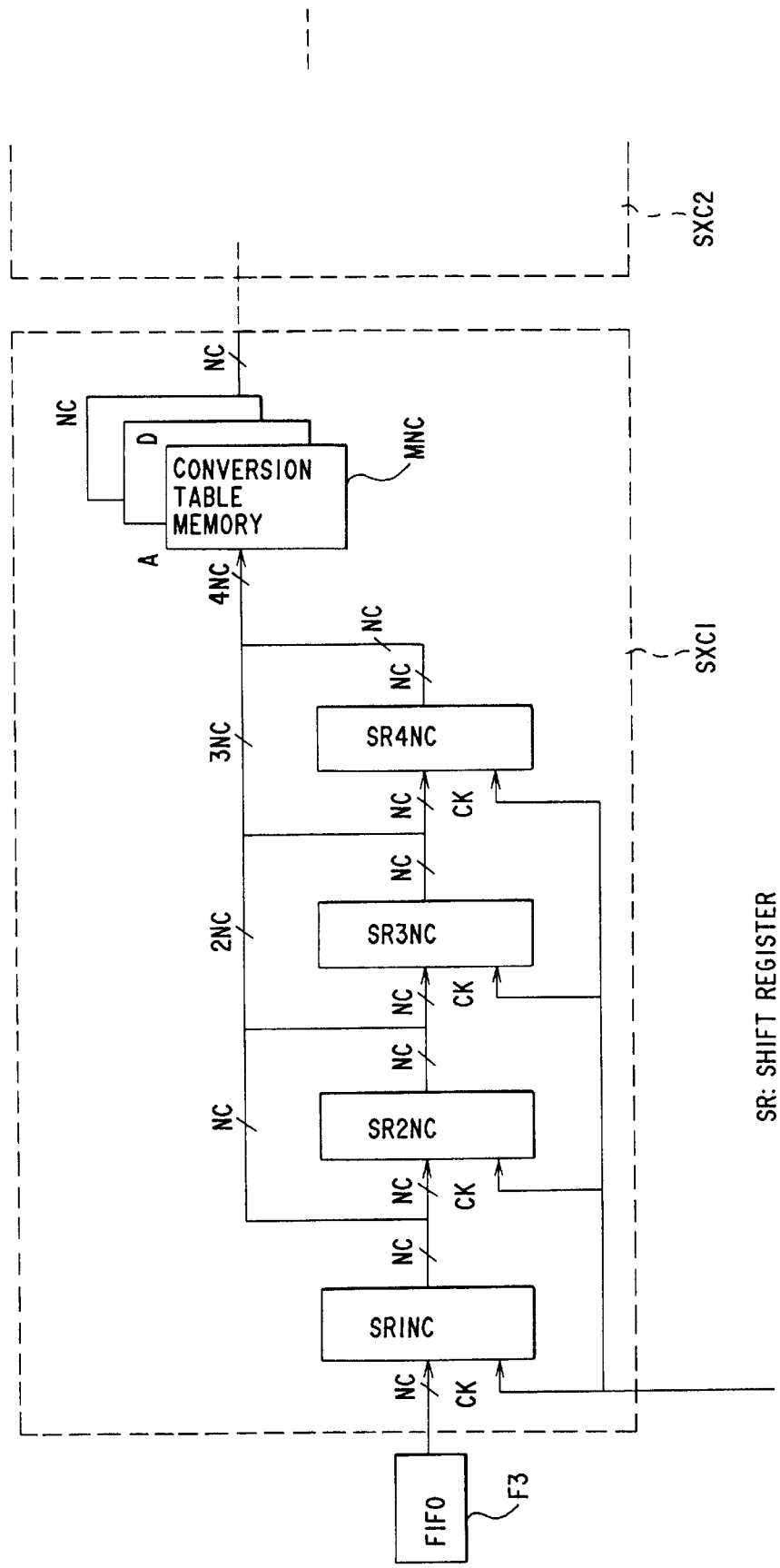
FIG. 43 shows the configuration of the line-narrowing module using the first principle of this invention.

FIG. 43 shows the configuration of the line-narrowing module 18 using the first principle of this invention.

Whereas the embodiment of the line-narrowing module 18 shown in FIG. 37 is explained in detail above, line-narrowing is not limited to sequential processings. For instance, as shown in FIG. 43, pairs of line-narrowing circuits SXC1, SXC2, etc. each comprising a plurality of stages for the line-narrowing amount (determined by the thickest line inputted) are provided for a pipeline processing that enables even faster line-narrowing.

Figure 44:
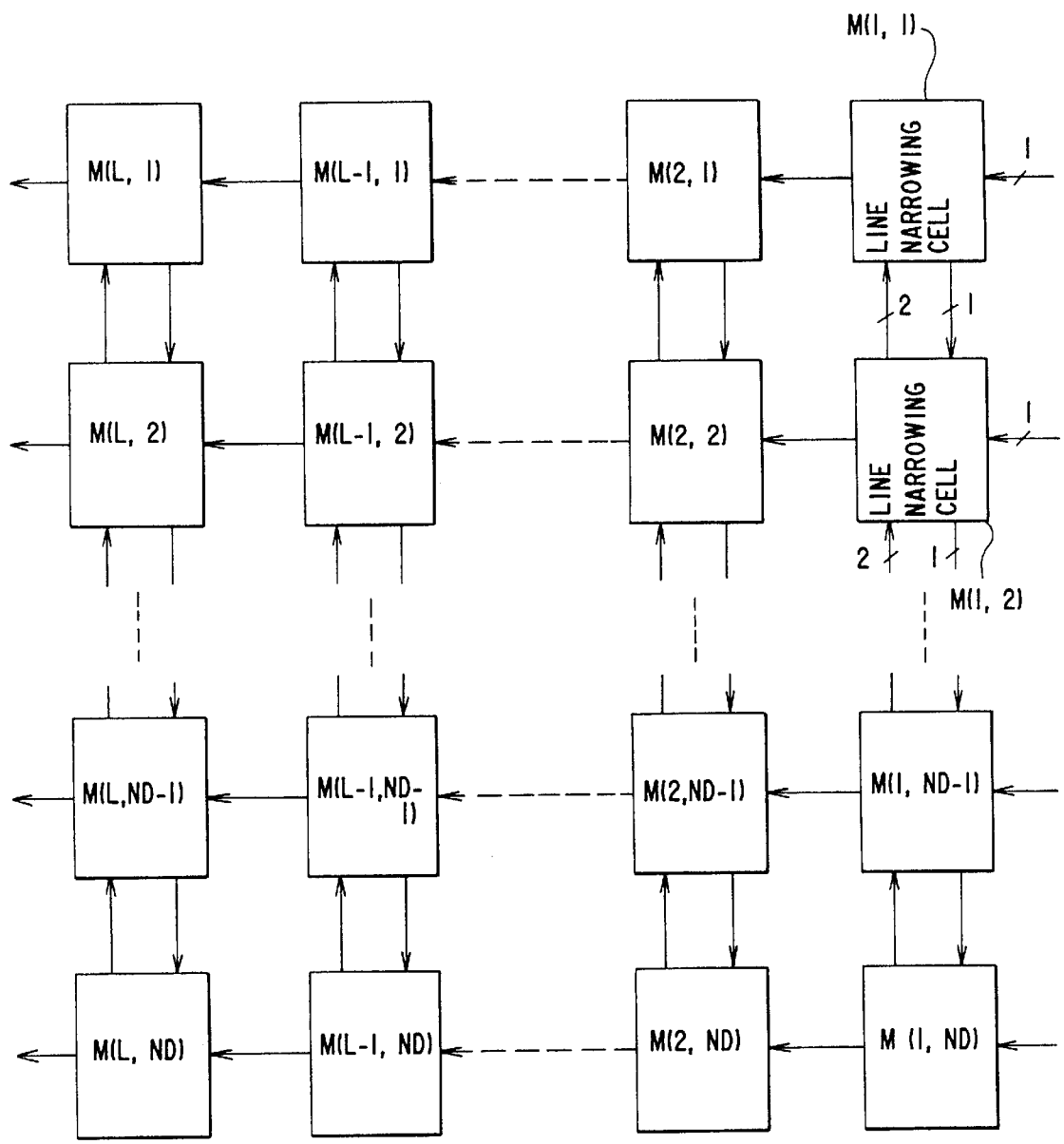
FIG. 44 shows the configuration of a line-narrowing array in the line-narrowing module using the second principle of this invention, which utilizes a systolic array.

FIG. 44 shows the configuration of a line-narrowing array in the line-narrowing module 18 using the second principle of this invention.

The line-narrowing illustrated in FIGS. 37 through 43 is performed by processings in one-dot units or in parallel. The following processing uses an array.

Data in a character frame normalized by the normalization module 16 is supplied in dot-row units to the line-narrowing module 18, which comprises line-narrowing cells M(1,1) through M(L,ND).

Respective line-narrowing cells M(1,1) through M(L,ND) output: two bits to the above cell and input one bit from the above cell.

Figure 45:
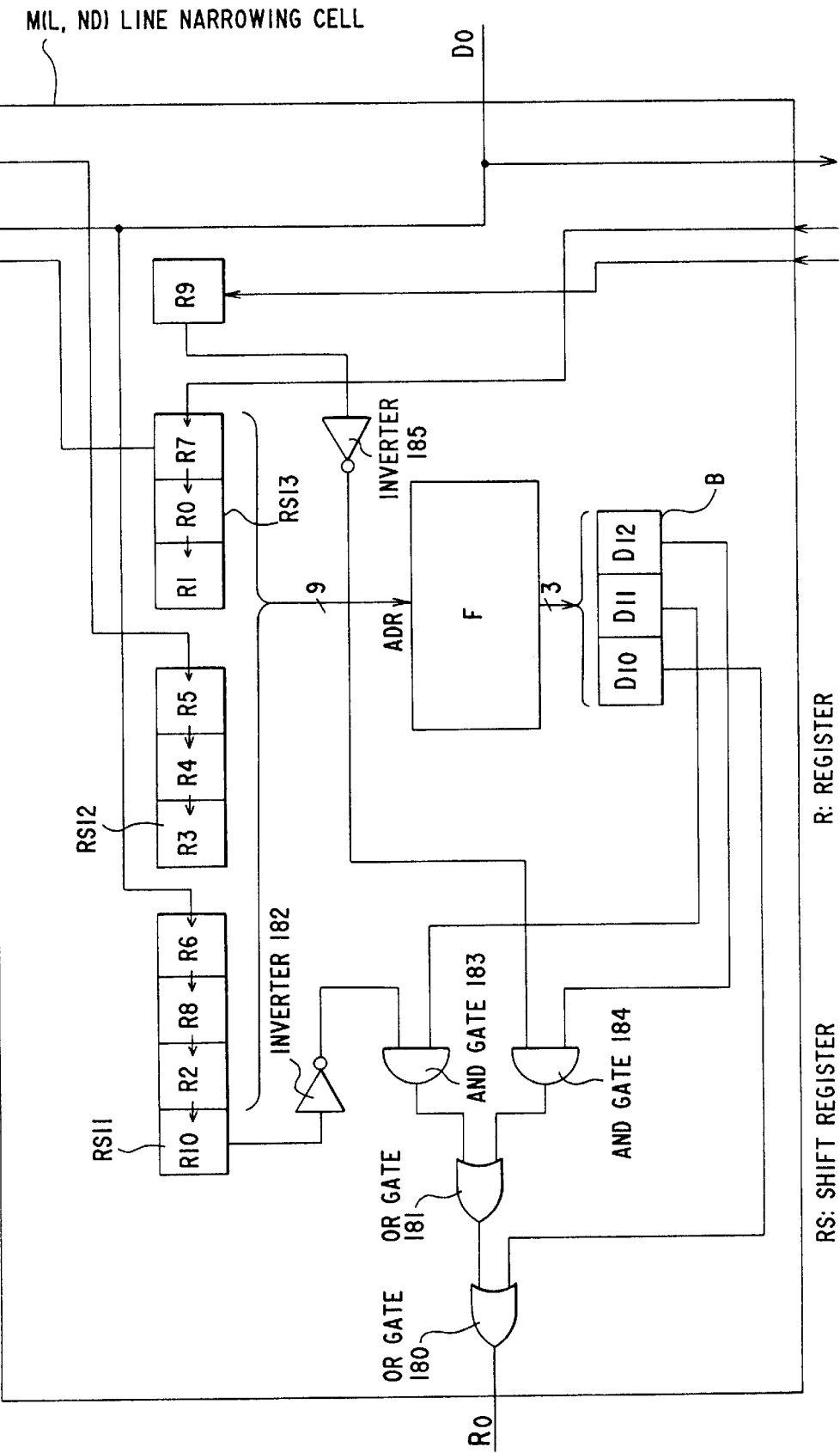
FIG. 45 shows in detail the configuration of line-narrowing cells in the line-narrowing module using the second principle of this invention, which utilizes a systolic array.

FIG. 45 shows in detail the configuration of line-narrowing cells M(1,1) through M(L,ND) in the line-narrowing module 18 using the second principle of this invention, which uses a systolic array.

Data $D_{OP}$ supplied to the line-narrowing cells M(1,1) through M(L,ND) is supplied to shift register RS11 which is a four-stage shift register comprising supplied also to the cells neighboring below. Meanwhile, data supplied from the neighboring cell below is supplied to shift registers RS12 and RS13.

In FIG. 45, data from an upper cell is supplied to shift register RS12, and data from a lower cell is supplied to shift register RS13 . Shift register RS12 comprises registers R3, R4 and R5. Shift register RS13 comprises registers R1, R0 and R7 . In addition, data supplied from a lower cell is supplied to register R9 . Outputs from register R7 are supplied to register R0, as well as an upper cell in FIG. 45. That is, register R9 is supplied with data obtained by shifting by one stage in the lower cell in FIG. 45.

Figures 46, 47:
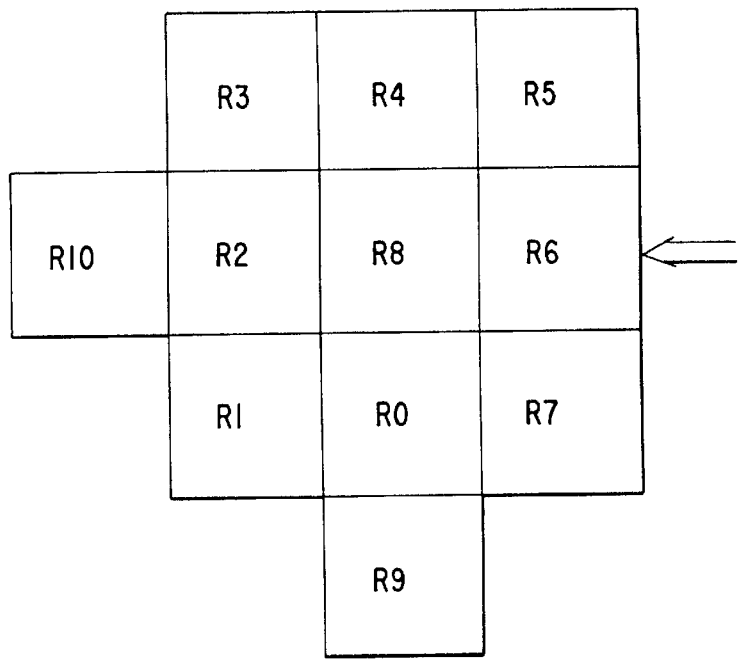
FIG. 46 illustrates the pattern positions of the registers in the line-narrowing module using the second principle of this invention, which utilizes a systolic array.
FIG. 47 is an input data diagram in the line-narrowing module using the second principle of this invention, which utilizes a systolic array.

FIG. 46 illustrates the pattern positions of the registers in the line-narrowing module 18 using the second principle of this invention.

As shown in FIG. 46, the data $D_O$ inputted to each cell comprises one (1) dot in register R8, eight (8) dots in eight registers R0 through R7 around register R8 and one (1) dot in the second left R10 register and one (1) dot in the second lower register R9, i.e. a total of eleven (11) dots.

Nine outputs from nine registers R6, R8, R2, R5, R4, R3, R7, R0, R1 are supplied to address input terminal ADR in memory F which outputs three bits to buffer B. Among data D10, D11 and D12 supplied to buffer B, data D10 is supplied to an input terminal of an "OR" gate 180.

As shown in FIG. 46, when the eight-dot data in the eight surrounding registers R0 through R7 determine the value (black or white) of the center dot, data D11 and D12 become 0 and data D10 take the determined value. That is, 1 for black or 0 for white is outputted through the "OR" gate 180.

Meanwhile when the eight dots cannot determine the value of the center dot stored in register R8, memory F sets the value of data D11 or data D12 to 1.

Data D11 and D12 are supplied to "AND" gates 183 and 184. As described earlier, if the value of the center dot stored in the register R8 is determined, the values of data D11 and D12 are 0, if it is not determined, the value is obtained by considering other two dot values.

The data D11 and D12 act as instruction signals for instructing the result and data by considering the dot value stored in register R10 and R9.

Outputs from register R10 are supplied through an inverter 182 to an "AND" gate 183. Outputs from register R9 are supplied through an inverter 185 to an "AND" gate 184. When the value of data D11 is 1, the dot data value stored in register R10 is inverted, and the result determines the output. When the value of data D12 is 1, the value outputted from register R9 determines it.

In other words, if the value stored in register R9 is 0 and the value of data D11 is 1, both two input terminals of the "AND" gate 183 receive 1, and it outputs 1. If the value of data D12 is 1 and the value stored in register R9 is 0, both input terminals of the "AND" gate 184 receive 1 and it outputs 1, i.e. an H level.

The outputs from the "AND" gates 183 and 184 are supplied to an "OR" gate OR2. If either of the outputs is 1, the "OR" gate 181 outputs 1. The output from the "OR" gate is supplied to an "OR" gate 180. Accordingly, the output data D20 represents the logical outputs from "AND" gates 183 and 184. That is, when the data stored in register R8 is set as the center dot value and the center dot vale is not determined by the surrounding data (stored in registers R0 through R7), the value stored in register R9 or R10 determines it.

FIG. 47 is an input data diagram in the line-narrowing module 18 using the second principle of this invention.

Figure 48:
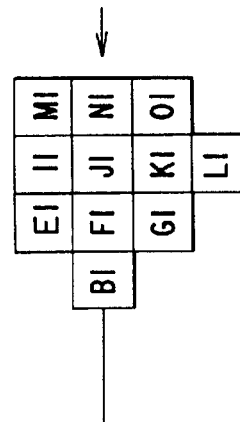
FIG. 48 illustrates data change in the register of the input data in the line-narrowing module using the second principle of this invention, which utilizes a systolic array.

FIG. 48 illustrates data change in the register of the input data in the line-narrowing module 18 using the second principle of this invention.

At time t=1, when data A1, B1, C1 and D1 are supplied to cells J+1, J, J−1 and J−2, data A1, B1 and C1 are supplied respectively to registers RS12, RS11 RS13 in cell J.

At time t=2, since data E1, F1, G1 and H1 are supplied, shift registers sequentially shift, data B1 and F1 are supplied to register RS11, data A1 and E1 are supplied to register RS12, data C1 and G1 are supplied to register RS13. Data D1 is supplied to register R9. And each register stores the value by shifting. In cell J−1, data C1 and G1 are supplied register RS11, data B1 and F1 are supplied to register RS12, data D1 and H1 are supplied to register RS13, and the registers store the values of supplied data.

By sequentially shifting as above, and if data I1, J1, K1 and L1 are supplied at time t=3, and data M1, N1, O1 and P1 are supplied at time t=4, cell J at time t=4 stores data B1, F1, J1 AND N1 in register RS11, data E1, I1 and M1 in register RS12, data G1, K1 and O1 in register RS13, and data L1 in register R9. Register RS11 of the cell J−1 stores data C1, G1, K1 and O1. Data F1 , J1 and H1 are stored in register RS13. That is, when data A1, B1, C1 and D1; data E1, F1, G1 and H1; data I1, J1, K1 and L1; and data M1, N1, O1 and P1 are sequentially supplied at time t=4 data are stored in registers RS11, RS12, RS13 and R9 like the slashed part shown in FIG. 47. At this time, the center dot of the objected cell has data J1.

When the center dot pattern of 3*3 dots cannot be determined, since the operation part operates to add the surrounding dot pattern, the objective line-narrowing is appropriately performed.

Figure 49:
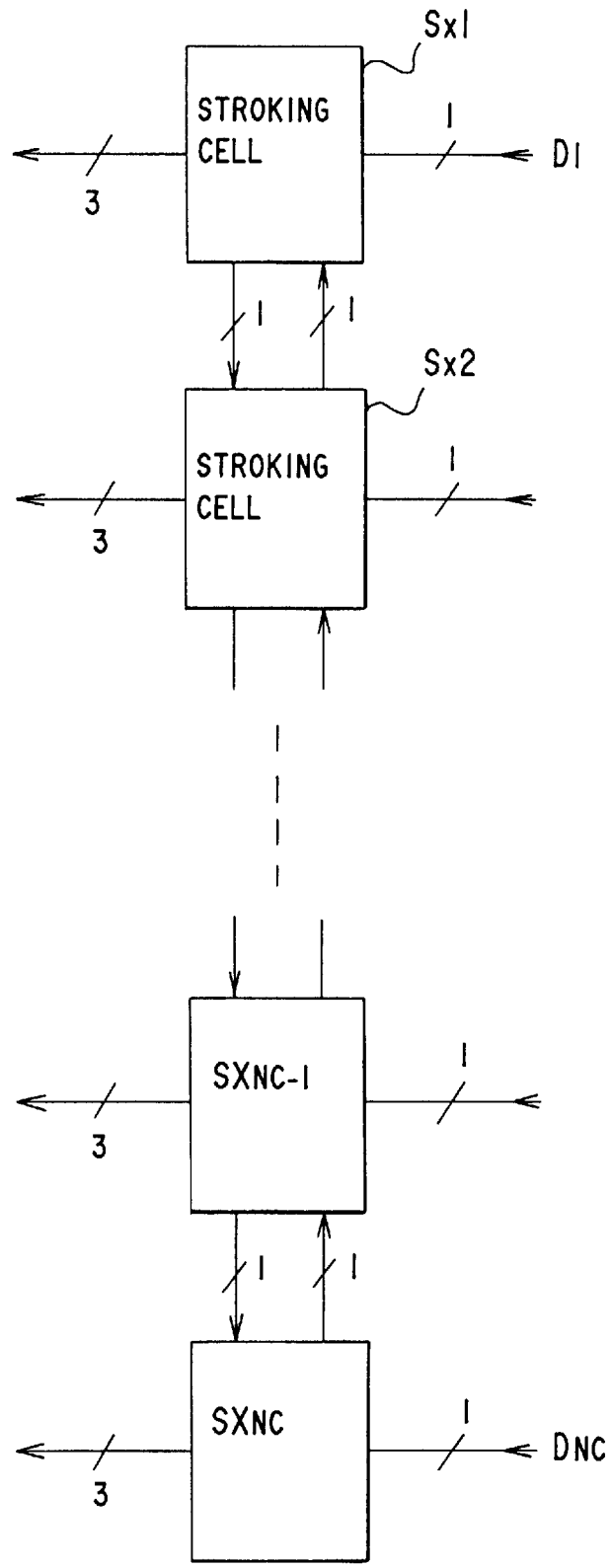
FIG. 49 shows the configuration of the stroking array in the stroking module in its embodiment of this invention using an array.

FIG. 49 shows a configuration of the stroking array in the stroking module 19 in its embodiment of this invention using an array.

Figure 50:
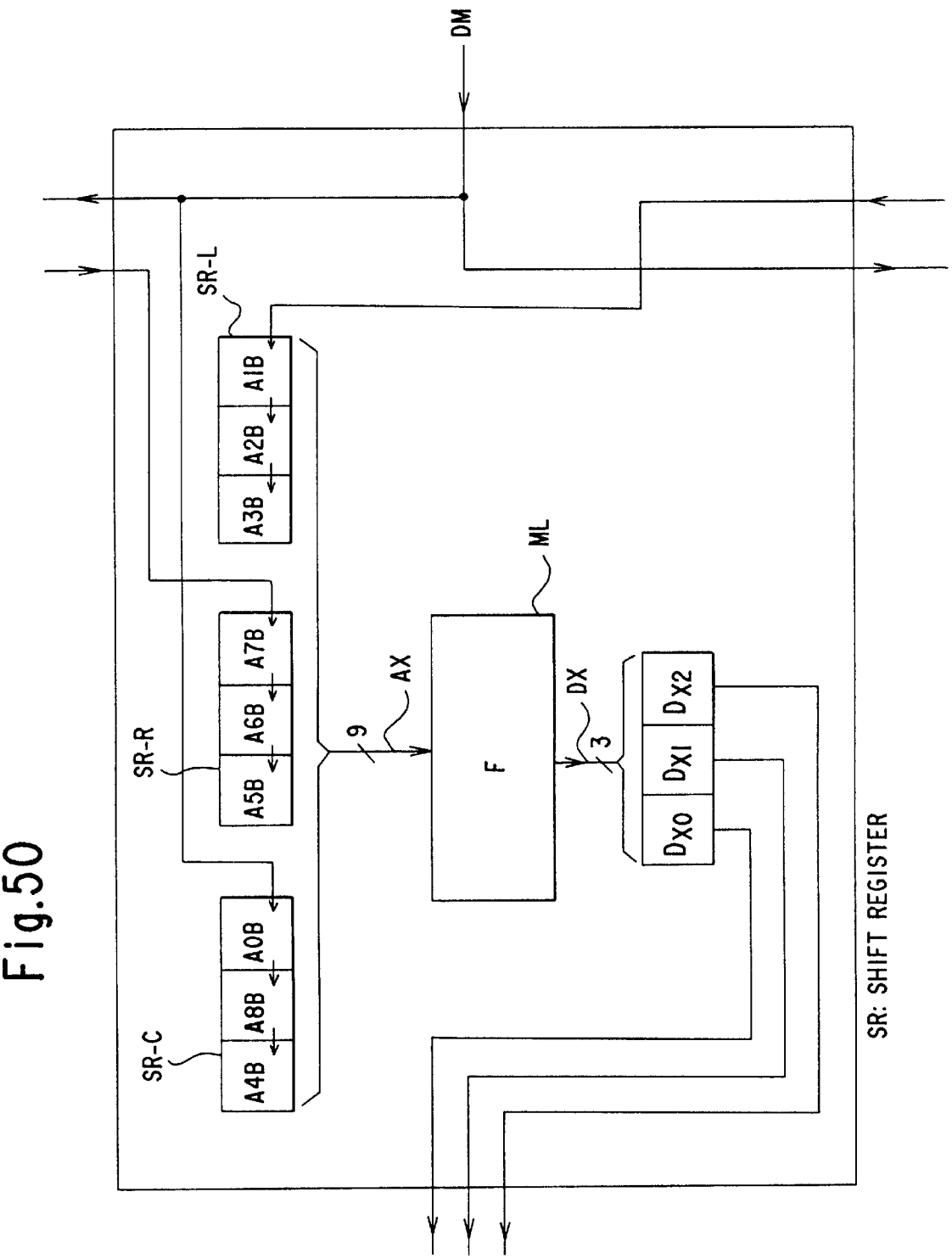
FIG. 50 shows the configuration of a stroking cell in the stroking module in its embodiment of this invention using an array.

FIG. 50 shows a configuration of a stroking cell in the stroking module 19 in its embodiment of this invention using an array.

Dot data for a character obtained at the line-narrowing module 18 are supplied to stroking cells SX1 through SXNE. That is, data D1 through DNE forming a dot row are respectively supplied to stroking cells SX1 through SXNE.

The stroking cells SX1 through SXNE simultaneously outputs the supplied data D1 through DNE to the neighboring cells. For example, the stroking cell SX2 simultaneously outputs data inputted to the stroking cells SX1 and SX3. In other words, each stroking cell are supplied from the neighboring cells with dots neighboring the dot of the corresponding position.

As shown in FIG. 50, respective stroking cells SX1 through SXNE comprise three shift registers SR-C, SR-R, SR-L, and dots supplied from the line-narrowing module 18 are inputted dot by dot to shift register SR-C as well as shift registers SR-R and SR-L in the neighboring cells. When data are supplied in dot-row units (or in dot-column units), shift register SR-C receives the dot datum corresponding to the cell, shift register SR-R receives the dot datum to the right of the center cell, and shift register SR-L receives the dot datum to the left of the center cell. When data of three dot rows are received, shift registers SR-L, SR-C and SR-R stores data A3B, A4B and A5B of the first dot row. Then, data A2B, A8B and A6B of the second dot row and then data A1B, A0B and A5B are stored in the third dot row.

Figures 51, 52:
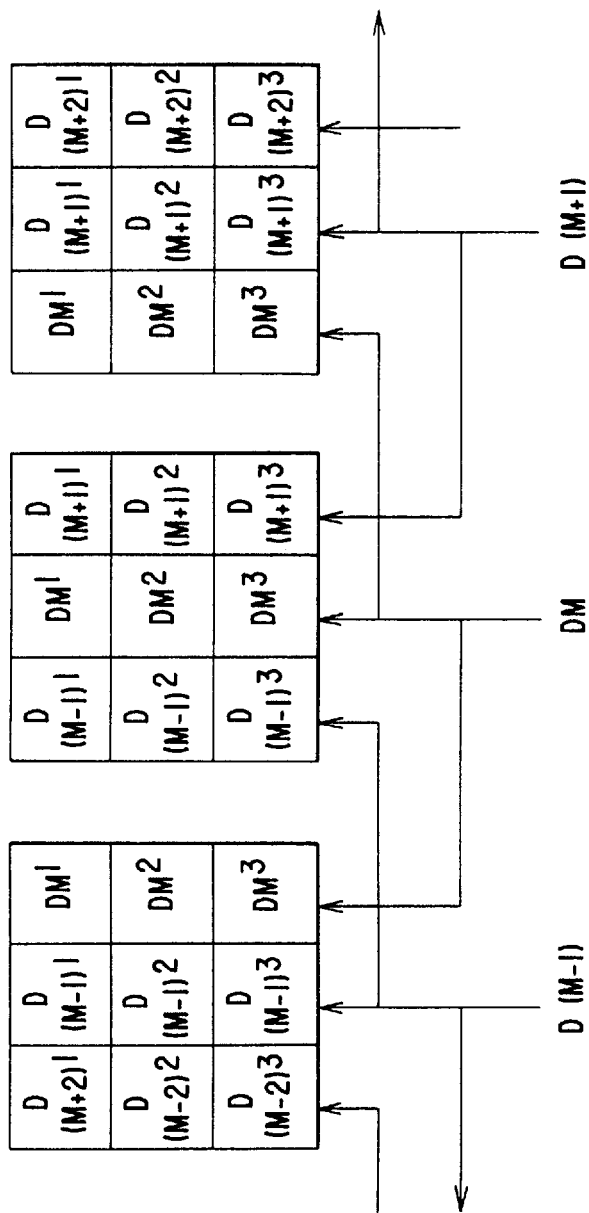
FIG. 51 shows a matrix of shift registers in the stroking module in its embodiment of this invention using an array.
FIG. 52 illustrates the operations in the stroking module in its embodiment of this invention using an array.

FIG. 51 shows a matrix of shift registers in the stroking module 19 in its embodiment of this invention using an array.

As shown in FIG. 51, the first, second and third lines of the stroking cell are respectively supplied with data A3B, A4B and A5b; A2B, A8B and A6B; A1B, A0B and A7B.

FIG. 52 illustrates the operations in the stroking module 19 in its embodiment of this invention using an array.

Neighboring stroking cells are explained, next. A stroking cell SXM supplied with data DM (refer to FIG. 52) receives its neighboring dot D(M−1) and D(M+1) through stroking cells SX(M−1) and SX(M+1). Therefore, shift registers SR-C in the stroking cell SXM supplied with dot DM memorizes data DM1, DM2 and DM3. Shift register SR-R for the right dot stores data D(M+1)1, D(M+1)2 and D(M+1)3. Shift register SR-L for the left dot stores data D(M−1)1, D(M−1)2 and D(M−1)3. Shift register SR-C in the stroking cell supplied with data D(M+1) stores data D(M+1)1, D(M+1)2 and D(M+1)3. Shift register SR-L stores data DM1, DM2 and DM3. Shift register SR-R stores data D(M+2)1, D(M+2)2 and D(M+2)3.

Through the above operations, shift registers SR-C, SR-R and SR-L store a total of 3*3 dot data corresponding to the stroking cell comprising a center dot and surrounding dots above, below, right and left.

Shift registers SR-C, SR-L and SR-R supply the data to addresses of memory M1 which outputs 3-bit data corresponding to the pattern and stored in advance.

FIG. 53 is a stroking table representing shift register values and an output in the stroking module 19 in its embodiment of this invention using an array.

A0B through A8B in the drawing respectively refer to addresses which correspond to the 3*3 dot data described earlier. When the values of data A8B and data A4B are both "1", since there is a case in which there is a dot above the center cell, the output is set to "010". When the value of data A8B and A6B are "1" and the value of data A4B is "0", it is judged to be horizontal, and the output DX is set to "111".

When data A8B and A5B are "1" and data A4B and A6B are "0", it is judged to be 45 degrees and the output DX is set to "110". When data A8B and A7B are "1" and data A4B, A5B and A6B are "0", it is 135 degrees and the output DX is set to "011". Since the cell data stored in shift registers centered around A8B are indicates the eight directions by the eight dot data, other than those four directions, the four directions opposite to the above four directions are judged by considering such as a downward direction in the vertical case and a left direction in the horizontal case.

Therefore, when data A0B and A8B are "1" and data A6B, A4B, A5B and A7B are "0", the vertical output DX is set to "010". Similarly, when data A2B and A8B are "1", and data A6B, A4B, A5B, A0B and A7B are "0", the horizontal output DX is set to "111". When data A1B and A8B are "1", and data data A2B, A6B, A4B, A5B, A0B and A7B are "0", the 45 degree output DX is set to "110". When data A3B and A8B are "1", and data A2B, A6B, A4B, A5B, A1B, A0B and A7B are "0", 135 degree output DX is set to "011". In the embodiment of this invention, other than the cases of 45 or 135 degrees vertically and horizontally, there are cases in which no picture element exists or one exists in a block. When the value of data A8B is "1" and all others are "0", the output DX is set to "100", and a code for expressing the existence of a dot only is outputted. When the value of data A8B is "0", it is considered that a picture element does not exist and "000" is outputted. When the values of data A2B, A8B, A6B, A4B and A0B are "1", the picture element is considered to be in the block, and "101" is outputted. When the value of data A3B, A5B, A1B, A7B and A8B are "1", it is considered to be a "cross" and "001" is outputted.

As stated above, data coded by respective 3*3 patterns are outputted from stroking cells SX1 through SXNE. Since stroking cells SX1 and SXNE are at the edges, terminals of SX1 and SXNE not shown are supplied with "0".

As described above, since the respective stroking cells are provided with tables, and neighboring dots are mutually added in a cell unit, each time one dot row is added in the line direction in the 3*3 dot pattern in a column or row unit, the dot unit is obtained.

FIG. 54 is a noise reduction table in the stroking module 19 in its embodiment of this invention using an array.

In the array shown in FIG. 49, by making the content of the memory M1 in a stroking cell shown in FIG. 50 as shown in FIG. 54, the noise reduction module 11 shown in FIG. 2A is configured.

When the value of data A8B is "1" and all others are "0", "0" is outputted. Similarly when the values of data A8B and A2B are "1" and all others are "0", when the values of data A8B and A6B are "1" and all others are "0", when the values of data A8B and A3B are "1" and all others are "0", when the values of data A8B and A4B are "1" and all others are "0", when the values of data A8B and A5B are "1" and all others are "0", when the values of data A8B and A4B are "1" and all others are "0", or when the values of data A8B and A7B are "1" and all others are "0", "0" is outputted. When the value of data A8B is "1", by making all others "1" except for the above patterns, noise can be reduced.

The embodiment of this invention above is explained by image data, but the application of this invention is not limited to image data, but can be similarly applied to other two dimensional data in finding their interrelations.

What is claimed is:

1. A data conversion system for converting two dimensional data having a first direction and a second direction and including a plurality of lines of data in the second direction utilizing a plurality of cells, each cell comprising:

shift register means for receiving a first line in the second direction and a second line in the second direction in parallel from an external source, the first and second lines belonging to the plurality of lines and at least one of the first and second lines being supplied to an adjacent cell from the external source, said shift register means also for sequentially shifting the first and second lines in parallel in a direction corresponding to the second direction, said shift register means having a first shift register which shifts the first line and a second shift register which shifts the second line;

a memory coupled to said shift registers, said memory containing predetermined values which are outputted when data in said shift register means are supplied as an address and used to determine a value of a center dot of a certain area, and an instruction signal which is outputted for determining the value of the center dot according to dot data outside of the certain area when data in the certain area are not in a pattern which is used to determine the value of the center dot of the certain area; and an operation means for selecting and outputting one of said predetermined values from said memory when no instruction signal is supplied from said memory and for outputting the value of the center dot determined from data outside the certain area per the instruction signal, thereby sequentially generating data for new lines in the first direction while said shift register means shifts the first and second lines.

2. The data conversion system according to claim 1 wherein:

said cell is connected to a neighboring cell and supplies a first datum to said neighboring cell and a plurality of data supplied to said neighboring cell comprises at least the first datum supplied from said cell and a second datum supplied directly to said neighboring cell.

3. The data conversion system according to claim 2 wherein:

said shift register supplies data in the certain area of 3*3 dots to said memory;

when said memory cannot determine the value of the center of said 3*3 dots to white or black, said memory supplies an instruction signal to the operation means in correspondence with the instruction dot for selecting dot data for dots outside said 3*3 dots; and said operation means turns an "AND" gate on by the instruction signal corresponding to the instruction dot for outputting dot data supplied to said "AND" gate turned on as finalized data.

4. A data conversion system for converting an input image data having a first direction and a second direction to a line-narrowed image data in a pattern recognition process, comprising:

a plurality of cells connected in parallel in a direction corresponding to the first direction for receiving a plurality of dot data representing the input image data, each cell being arranged corresponding to each line in the direction included in the input image data and adapted for receiving a plurality of lines of the input image data in parallel from an external source, said plurality of lines including at least a line corresponding to the cell and an adjacent line, each cell including:

shift register means supplied with said plurality of lines, for sequentially shifting said plurality of lines in parallel in the second direction; and memory means supplied with dot data in a certain area of the shift register means as an address for stored data to output a predetermined value corresponding to a pattern of the dot data in the certain area, said predetermined value being set to narrow a line in the input image data, said memory means for outputting said predetermined value, thereby generating data for a new line in the first direction while said shift register means shifts said part of the dot data.

5. A data conversion system according to claim 4, wherein said memory means outputs an instruction signal for determining the value of the center dot according to dot data outside of the certain area when data in the certain area are not in a pattern to determine the value of the center dot of the area; and said cell further includes operation means for selecting and outputting said predetermined value from said memory means when no instruction signal is supplied from said memory means and for outputting the value of the center dot by determining the value from data outside the certain area in accordance with the instruction signal.

6. A data conversion system according to claim 4, wherein:

each of said cells are connected to said neighboring cell and supplies a first datum to said neighboring cell and a plurality of data supplied to said neighboring cell comprises at least the first datum and a second datum supplied directly to said neighboring cell.

7. A data conversion system according to claim 5, wherein:

said shift register supplies data in the certain area of 3*3 dots to said memory;

when said memory cannot determine the value of the center of said 3*3 dots to white or black, said memory supplies an instruction signal to the operation means in correspondence with an instruction dot for selecting dot data for dots outside said 3*3 dots; and said operation means turns an "AND" gate on by the instruction signal corresponding to the instruction dot for outputting dot data supplied to said "AND" gate turned on as finalized data.

8. A data conversion system according to claim 4, wherein said shift register means comprises:

a first shift register comprising a register of n stages for supplying inputted data to the neighboring cells on both sides and for sequentially shifting said inputted data;

a second shift register comprising a register of n stages supplied with data from a neighboring cell for sequentially shifting the supplied data; and a third shift register comprising a register of n stages supplied with data from a neighboring cell for sequentially shifting the supplied data.

9. A data conversion system according to claim 8, wherein:

said first, second and third shift registers respectively comprise three stages.

10. A data conversion system according to claim 8, wherein:

said data are image data, and dot data in a row or column unit are simultaneously supplied to said respective cells in a sequence;

if a second shift datum of said first shift register represents a predetermined color;

when at least a first shift datum of said second shift register or a third shift datum of said third shift register represents said predetermined color, said memory outputs data representing a first direction;

when at least a third shift datum of said second shift register or a first shift datum of said third shift register represents said predetermined color, said memory outputs data representing a second direction;

when at least a first shift datum or a third shift datum of said first shift register represents said predetermined color, said memory outputs data representing a third direction; and when at least a second shift datum of said second shift register or a second shift datum of said third shift register represents said predetermined color, said memory outputs data representing a fourth direction.

11. A data conversion system according to claim 4, wherein said cell comprises:

a FIFO for memorizing data outputted from said memory and supplying said memorized data to a first stage of said shift register comprising a plurality of stages; and a detection circuit for detecting a change in data shifted in said plurality of shift registers and FIFO during a data circulation in a loop by comparing a part of data supplied to the addresses of said memory with an output from said memory.

12. A data conversion system according to claim 11, wherein:

said shift register comprising a plurality of stages has four (4) stages;

said memory comprises (n−2) pieces of RAM for (3*3+2) pieces of address inputs;

said shift registers respectively comprising four (4) stages sequentially shift 3*3+2 bits of data and supplying said 3*3+2 bits of data to (n−2) pieces of RAM addresses.

13. A data conversion system according to claim 12, wherein:

said data are character image data; and said RAM memorizes conversion data for narrowing a width of a character line.

14. A data conversion system for converting two dimensional data having a first direction and a second direction and including a plurality of lines of data in the second direction utilizing a plurality of cells, each cell comprising:

shift register means for receiving a first line in the second direction and a second line in the second direction in parallel from an external source, the first and second lines belonging to the plurality of lines and at least one of the first and second lines being supplied to an adjacent cell from the external source, said shift register means also for sequentially shifting the first and second lines in a direction corresponding to the second direction, said shift register means having a first shift register which shifts the first line and a second shift register which shifts the second line; and a memory coupled to said shift registers, said memory containing predetermined values which are outputted when data in said shift register means are supplied as an address and used to determine a value of a center dot of an area, said memory for outputting said predetermined values, thereby sequentially generating data for new lines in the first direction while said shift register means shifts the first and second lines.

15. The data conversion system according to claim 14, wherein:

said cell is connected to a neighboring cell and supplies a first datum to said neighboring cell and a plurality of data supplied to said neighboring cell comprises at least the first datum supplied from said cell and a second datum supplied directly to said neighboring cell.

16. The data conversion system according to claim 15, wherein:

said shift register supplies data in the certain area of 3*3 dots to said memory;

when said memory cannot determine the value of the center of said 3*3 dots to white or black, said memory supplies an instruction signal to the operation means in correspondence with the instruction dot for selecting dot data for dots outside said 3*3 dots; and said operation means turns an "AND" gate on by the instruction signal corresponding to the instruction dot for outputting dot data supplied to said "AND" gate turned on as finalized data.

17. A data conversion system for converting an input image data having a row direction and a column direction to a line-narrowed image data in a pattern recognition process, comprising:

a plurality of cells connected in parallel in a direction corresponding to the row direction for receiving a plurality of dot data representing the input image data, each cell being arranged corresponding to each line in the direction included in the input image data and adapted for receiving a plurality of lines of the input image data in parallel from an external source, said plurality of lines including at least a line corresponding to the cell and an adjacent line, each cell including:

shift register means supplied with said plurality of lines, for sequentially shifting said plurality of lines in parallel in the column direction; and memory means supplied with dot data in a certain area of the shift register means as an address for stored data to output a predetermined value corresponding to a pattern of the dot data in the certain area, said predetermined value being set to narrow a line in the input image data, said memory means for outputting said predetermined value, thereby generating data for a new line in the row direction while said shift register means shifts said part of the dot data.

18. A data conversion system for converting matrix data having a row direction and a column direction and including a plurality of lines of data in the column direction utilizing a plurality of cells, each cell comprising:

shift register means for receiving a first lines in the column direction and a second line in the column direction in parallel from an external source, the first and second lines belonging to the plurality of lines and at least one of the first and second lines being supplied to an adjacent cell from the external source, said shift register means also for sequentially shifting the first and second lines in parallel in a direction corresponding to the column direction, said shift register means having a first shift register which shifts the first line and a second shift register which shifts the second line; and a memory coupled to said shift registers, said memory containing predetermined values which are outputted when data in said shift register means are supplied as an address and used to determine a value of a center dot of an area, said memory for outputting said predetermined values, thereby sequentially generating data for new lines in the row direction while said shift register means shifts the first and second lines.

* * * * *